(12) United States Patent
Prakash et al.

(10) Patent No.: US 9,906,454 B2
(45) Date of Patent: Feb. 27, 2018

(54) SYSTEM AND METHOD FOR PROVIDING QUALITY OF SERVICE TO DATA CENTER APPLICATIONS BY CONTROLLING THE RATE AT WHICH DATA PACKETS ARE TRANSMITTED

(71) Applicant: Acelio, Inc., San Jose, CA (US)

(72) Inventors: Pawan Prakash, San Francisco, CA (US); Travis Newhouse, Encinitas, CA (US); Harshit Chitalia, Santa Clara, CA (US); Parantap Roy, Sunnyvale, CA (US); Sumeet Singh, Saratoga, CA (US)

(73) Assignee: APPFORMIX, INC., San Jose, CA (US)

( * ) Notice: Subject to any disclaimer, the term of this patent is extended or adjusted under 35 U.S.C. 154(b) by 373 days.

(21) Appl. No.: 14/617,876

(22) Filed: Feb. 9, 2015

(65) Prior Publication Data

US 2016/0080206 A1 Mar. 17, 2016

Related U.S. Application Data

(60) Provisional application No. 62/051,674, filed on Sep. 17, 2014.

(51) Int. Cl.
*H04L 12/851* (2013.01)
*H04L 12/801* (2013.01)
(Continued)

(52) U.S. Cl.
CPC ............ *H04L 47/18* (2013.01); *H04L 1/1832* (2013.01); *H04L 47/24* (2013.01); *H04L 69/16* (2013.01)

(58) Field of Classification Search
CPC ....... H04L 1/1832; H04L 47/18; H04L 47/24; H04L 69/16
(Continued)

(56) References Cited

U.S. PATENT DOCUMENTS 6,182,157 B1  1/2001  Schlener et al.
6,493,316 B1  12/2002  Chapman et al.
(Continued)

FOREIGN PATENT DOCUMENTS

WO      2009089051 A2    7/2009
WO   WO-2015048326 A1    4/2015

OTHER PUBLICATIONS

International Search Report and Written Opinion for PCT Application Serial No. PCT/US16/42606, dated Sep. 30, 2016, 12 pages.
(Continued)

*Primary Examiner* — Melvin Marcelo
*Assistant Examiner* — Natali N Pascual Peguero
(74) *Attorney, Agent, or Firm* — Shumaker & Sieffert, P.A.

(57) ABSTRACT

In various example embodiments, a system and method are presented for a bandwidth (BW) management system. The BW management system accepts, on behalf of a receiving host, data packets for a first individual flow at a flow rate sent by a sending host. The bandwidth management system manages bandwidth by traffic classes representing collections of flows associated with nodes in a hierarchical bandwidth tree (HBT). The first individual flow is included within the collection of individual flows associated with one or more of the traffic classes. The BW management system controls the rate at which the sending host is transmitting the data packets for the first individual flow using a sliding window protocol by managing the bandwidth utilization of the nodes to conform to bandwidth limits assigned to the (Continued)

nodes. The BW management system receives the data packets for the first individual flow at an adjusted flow rate based on the sliding window protocol.

19 Claims, 44 Drawing Sheets

(51) Int. Cl.
*H04L 1/18* (2006.01)
*H04L 29/06* (2006.01)

(58) Field of Classification Search
USPC .............................. 370/231, 229, 329, 468
See application file for complete search history.

(56) References Cited

U.S. PATENT DOCUMENTS

| | | | |
|---|---|---|---|
| 6,741,563 | B2 | 5/2004 | Packer |
| 6,754,228 | B1* | 6/2004 | Ludwig ............... H04L 47/10 370/231 |
| 7,389,462 | B1 | 6/2008 | Wang et al. |
| 7,433,304 | B1* | 10/2008 | Galloway ........... H04L 12/5695 370/229 |
| 8,102,881 | B1 | 1/2012 | Vincent |
| 9,385,959 | B2 | 7/2016 | Kompella et al. |
| 2002/0031088 | A1* | 3/2002 | Packer ................. H04L 1/0002 370/231 |
| 2004/0088412 | A1 | 5/2004 | John et al. |
| 2005/0091657 | A1 | 4/2005 | Priem |
| 2006/0101144 | A1 | 5/2006 | Wiryaman et al. |
| 2006/0271680 | A1 | 11/2006 | Shalev et al. |
| 2007/0014246 | A1 | 1/2007 | Aloni et al. |
| 2007/0024898 | A1 | 2/2007 | Uemura et al. |
| 2008/0222633 | A1 | 9/2008 | Kami |
| 2008/0253325 | A1* | 10/2008 | Park ................... H04W 72/1252 370/329 |
| 2008/0320147 | A1 | 12/2008 | Delima et al. |
| 2009/0028061 | A1 | 1/2009 | Zaencker |
| 2009/0183173 | A1 | 7/2009 | Becker et al. |
| 2010/0011270 | A1 | 1/2010 | Yamamoto et al. |
| 2011/0128853 | A1 | 6/2011 | Nishimura |
| 2012/0002669 | A1 | 1/2012 | Dietterle et al. |
| 2012/0054330 | A1 | 3/2012 | Loach |
| 2012/0096167 | A1 | 4/2012 | Free et al. |
| 2012/0131225 | A1 | 5/2012 | Chiueh et al. |
| 2012/0210318 | A1 | 8/2012 | Sanghvi et al. |
| 2012/0303923 | A1* | 11/2012 | Behera ................. G06F 9/455 711/170 |
| 2012/0311138 | A1 | 12/2012 | Inamdar et al. |
| 2013/0003553 | A1 | 1/2013 | Samuels et al. |
| 2013/0044629 | A1 | 2/2013 | Biswas et al. |
| 2013/0163428 | A1 | 6/2013 | Lee et al. |
| 2013/0205037 | A1 | 8/2013 | Biswas |
| 2014/0019807 | A1 | 1/2014 | Harrison et al. |
| 2014/0123133 | A1 | 5/2014 | Luxenberg |
| 2014/0189684 | A1 | 7/2014 | Zaslavsky et al. |
| 2014/0192639 | A1 | 7/2014 | Smirnov |
| 2014/0241159 | A1 | 8/2014 | Kakadia et al. |
| 2014/0258535 | A1 | 9/2014 | Zhang |
| 2014/0304320 | A1 | 10/2014 | Taneja et al. |
| 2014/0334301 | A1 | 11/2014 | Billaud et al. |
| 2015/0085665 | A1 | 3/2015 | Kompella et al. |
| 2015/0089500 | A1 | 3/2015 | Kompella et al. |
| 2015/0215214 | A1 | 7/2015 | Ng et al. |
| 2016/0080207 | A1 | 3/2016 | Prakash et al. |
| 2016/0269302 | A1 | 9/2016 | Kompella et al. |
| 2016/0277249 | A1 | 9/2016 | Singh et al. |
| 2017/0033995 | A1 | 2/2017 | Banka et al. |

OTHER PUBLICATIONS

Final Office Action for U.S. Appl. No. 14/149,621, dated Dec. 20, 2016, 23 pages.
Gamage, Sahan, et al., "Opportunistic flooding to improve TCP transmit performance in virtualized clouds", Proceedings of the 2nd ACM Symposium on Cloud Computing, (Oct. 26, 2011), 14 pgs.
Gamage, Sahan, et al., "Protocol Responsibility Offloading to Improve TCP Throughput in Virtualized Environments", ACM Transactions on Computer Systems, 31(3) Article 7, (Aug. 2013), pp. 7:1-7:34.
Kangarlou, Ardalan, et al., "vSnoop: Improving TCP Throughput in Virtualized Environments via Acknowledgement Offload", International Conference for High Performance Computing, Networking, Storage and Analysis (SC), (Nov. 2010), pp. 1-11.
Klien, Thierry E., et al., "Improved TCP Performance in Wireless IP Networks through Enhanced Opportunistic Scheduling Algorithms", IEEE Global Telecommunications Conference, vol. 5, (2004), pp. 2744-2748.
"U.S. Appl. No. 14/619,008, Preliminary Amendment filed Apr. 30, 2015", 4 pgs.
"International Application Serial No. PCT/US2014/057514, International Search Report dated Dec. 31, 2014", 2 pgs.
"International Application Serial No. PCT/US2014/057514, Written Opinion dated Dec. 31, 2014", 10 pgs.
"Transmission Control Protocol," DARPA Internet Program Protocol Specification, Sep. 1981, RFC 793, 90 pp.
Office Action for U.S. Appl. No. 14/149,621, dated May 6, 2016, 27 pages.
Office Action for U.S. Appl. No. 14/290,509, dated Nov. 10, 2015, 24 pages.
Notice of Allowance for U.S. Appl. No. 14/290,509, dated Mar. 9, 2016, 17 pages.
International Preliminary Report on Patentability from International Application No. PCT/US2015/050784, dated Mar. 30, 2017, 9 pp.
Office Action from U.S. Appl. No. 14/619,008, dated Jun. 5, 2017, 29 pp.
Response to Office Action dated Jun. 5, 2017, From U.S. Appl. No. 14/619,008, filed Oct. 4, 2017, 12 pp.
Notice of Allowance from U.S. Appl. No. 14/619,008, dated Nov. 7, 2017, 6 pp.

\* cited by examiner

500

TCP Header

| Offsets Octet | | 0 | | | | | | | | 1 | | | | | | | | 2 | | | | | | | | 3 | | | | | | | |
|---|---|---|---|---|---|---|---|---|---|---|---|---|---|---|---|---|---|---|---|---|---|---|---|---|---|---|---|---|---|---|---|---|
| Octet | Bit | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
| 0 | 0 | Source port | | | | | | | | | | | | | | | Destination port | | | | | | | | | | | | | | | |
| 4 | 32 | Sequence number  574 | | | | | | | | | | | | | | | | | | | | | | | | | | | | | | |
| 8 | 64 | Acknowledgment number (if ACK set)  571 | | | | | | | | | | | | | | | | | | | | | | | | | | | | | | |
| 12 | 96 | Data offset | | | | Reserved 0 0 0 | | | | N S | C W R | E C E | U R G | A C K | P S H | R S T | S Y N | F I N | Window Size  573 | | | | | | | | | | | | | | |
| 16 | 128 | Checksum  572 | | | | | | | | | | | | | | | | Urgent pointer (if URG set) | | | | | | | | | | | | | | |
| 20 | 160 | Options (if *data offset* > 5. Padded at the end with "0" bytes if necessary.) | | | | | | | | | | | | | | | | | | | | | | | | | | | | | | |
| ... | ... | | | | | | | | | | | | | | | | | | | | | | | | | | | | | | | | |

*FIG. 5A*

TABLE 525

| DATA SOURCE  521 | FILTERS  531 | |
|---|---|---|
| SYSTEM ATTRIBUTES | PHYSICAL PORT | ~532 |
| SYSTEM ATTRIBUTES | VIRTUAL PORT | ~533 |
| PACKET BITS | VLAN | ~534 |
| PACKET BITS | VN | ~535 |
| PACKET BITS FROM IPV4 HEADER | IP SOURCE | ~536 |
| PACKET BITS FROM IPV4 HEADER | IP DESTINATION | ~537 |
| PACKET BITS FROM IPV4 HEADER | PROTOCOL | ~538 |
| PACKET BITS FROM TCP HEADER | PORT SOURCE | ~539 |
| PACKET BITS FROM TCP HEADER | PORT DESTINATION | ~540 |

*FIG. 5B*

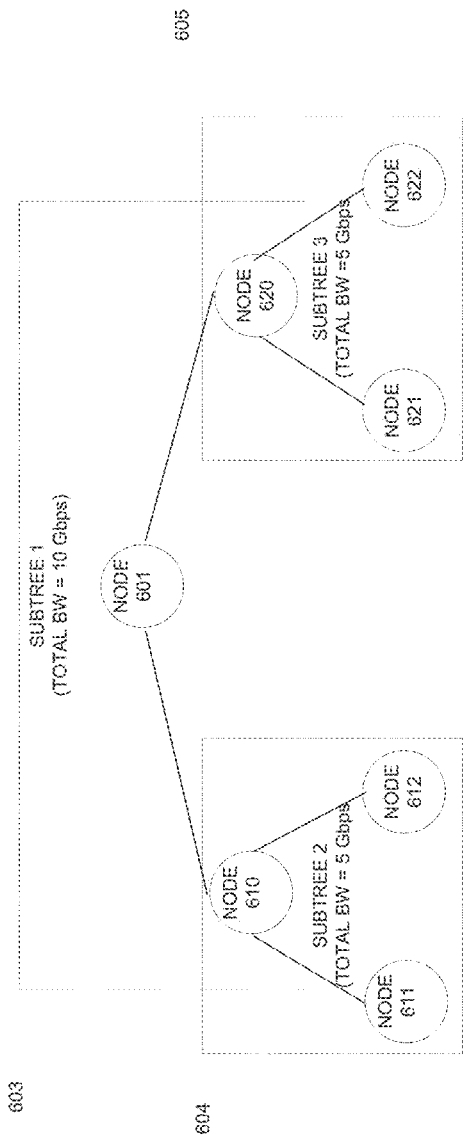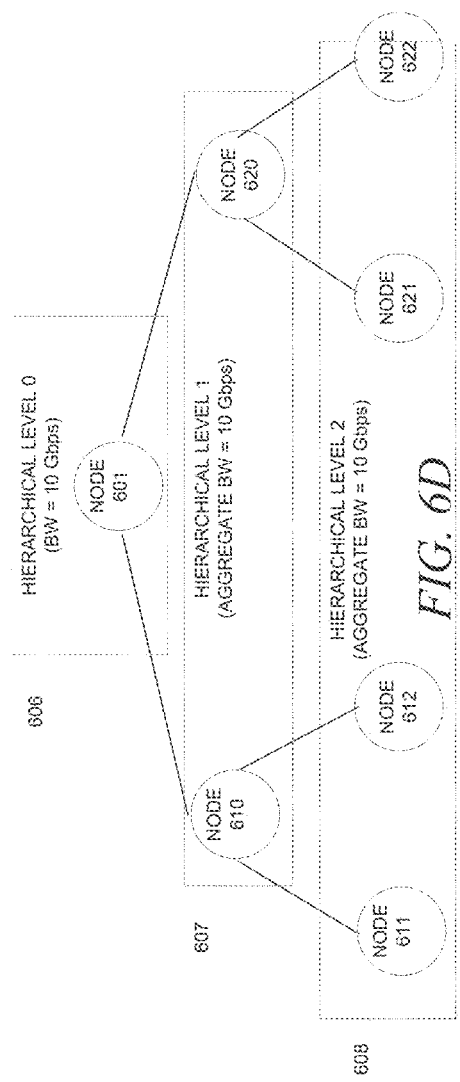
FIG. 6C
FIG. 6D

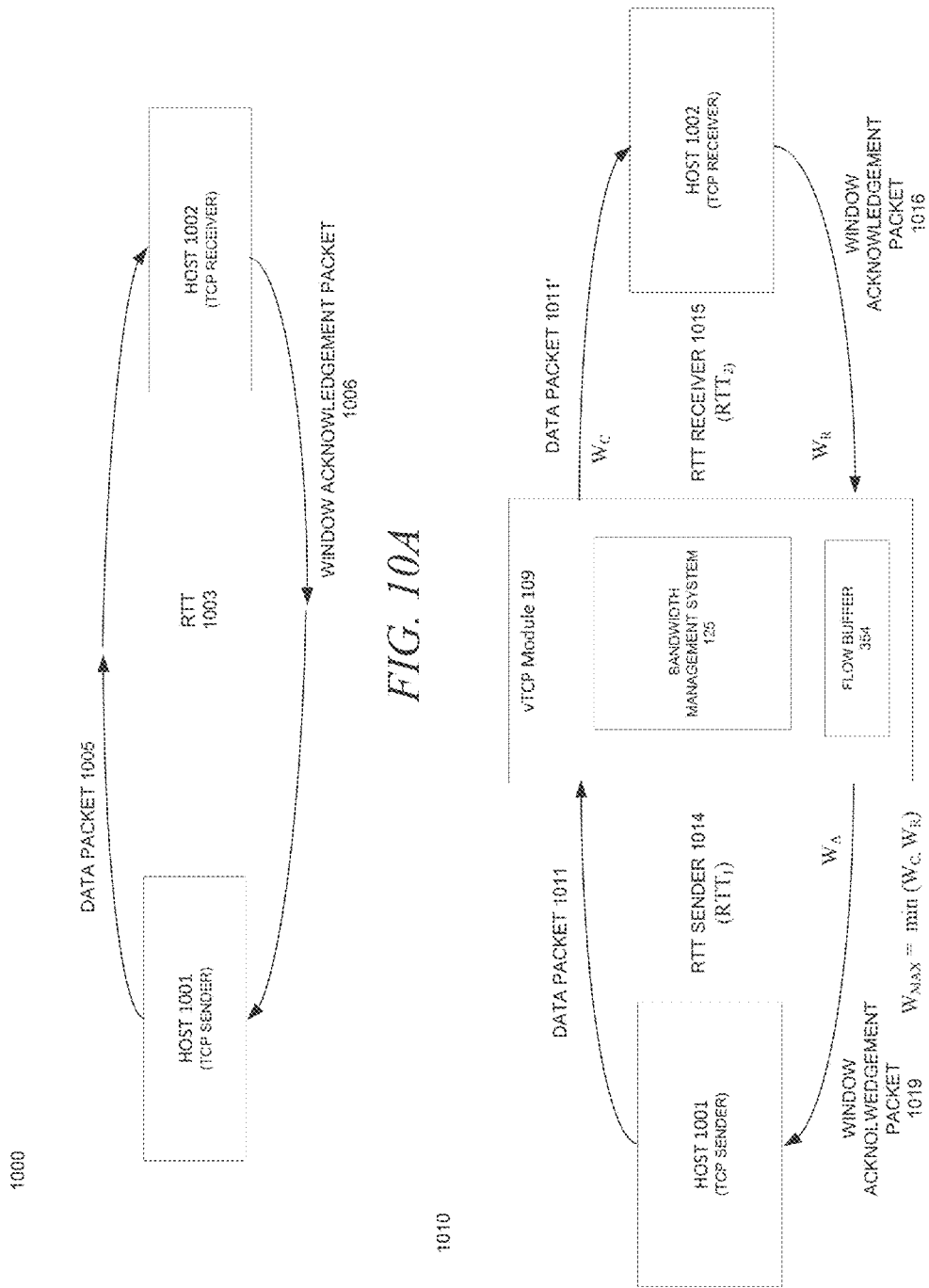

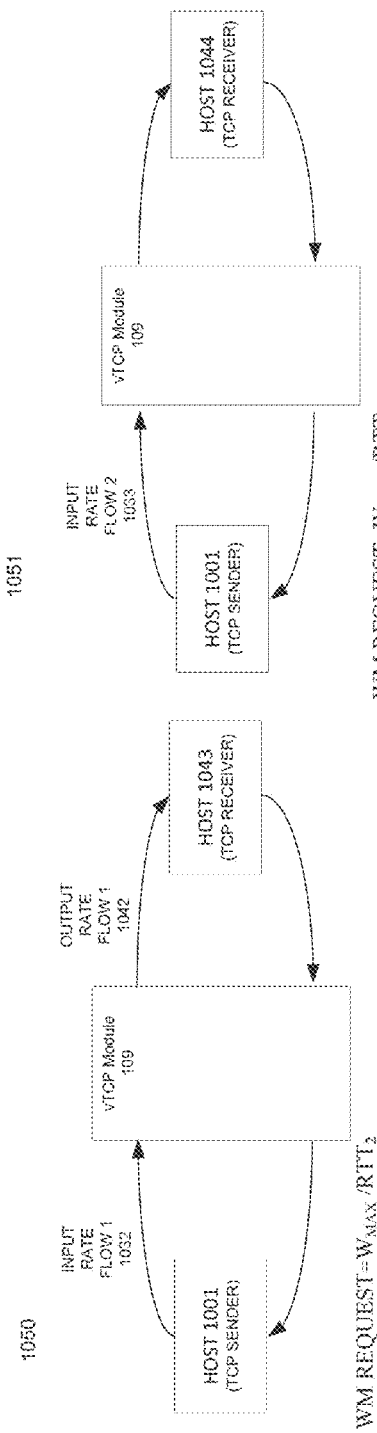
FIG. 10C
FIG. 10E
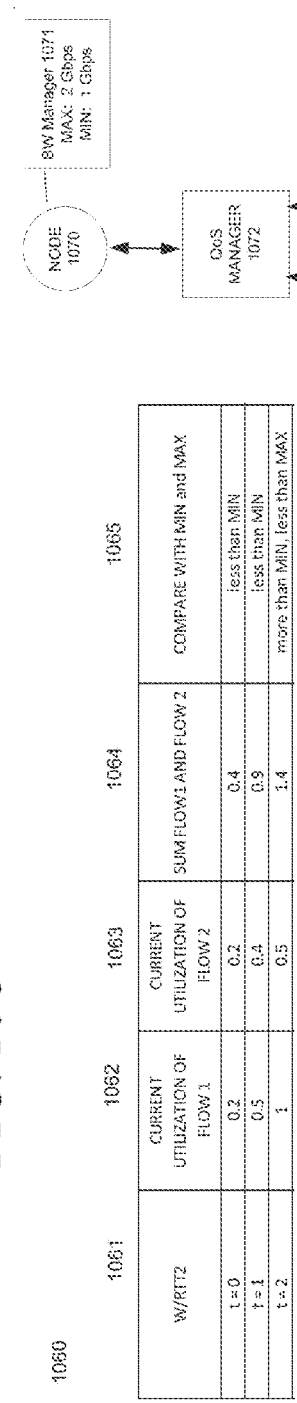
FIG. 10D
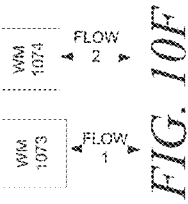
FIG. 10F

2

SYSTEM AND METHOD FOR PROVIDING QUALITY OF SERVICE TO DATA CENTER APPLICATIONS BY CONTROLLING THE RATE AT WHICH DATA PACKETS ARE TRANSMITTED

CLAIM OF PRIORITY

This application claims the priority benefit of U.S. Patent Application No. 62/051,674, entitled "SYSTEM AND METHOD FOR PROVIDING QUALITY OF SERVICE TO DATA CENTER APPLICATIONS BY CONTROLLING THE RATE WHICH DATA PACKETS ARE TRANSMITTED", filed Sep. 17, 2014, which is incorporated by reference herein in its entirety.

TECHNICAL FIELD

This application relates to a method and system for use in virtualized computing environments, according to one embodiment, and more specifically, for improving network protocol performance in virtualized computing environments.

BACKGROUND

Modern data centers have been moving into the realm of virtualization, where resources like CPU, memory, and disk are virtualized and shared among virtual machines. Typically, virtual machines are allocated fixed amounts of these resources in an effort to provide predictable and guaranteed performance. The network is one such resource where a lot of work has been done to provide performance isolation.

Software defined networking (SDN) has made long strides in virtualizing the network layer and providing better manageability of the control plane. But providing guarantees at the Internet Protocol (IP)/network layer (which generally does not have visibility of end-to-end connection semantics) does not necessarily translate into increases in the performance of data center applications, nor does it optimally utilize network resources of a data center. Ultimately, data center administrators are concerned about the performance of their applications and with providing performance guarantees to applications.

Existing network performance isolation mechanisms can be broadly categorized as rate-limiting techniques, which restrict the bandwidth of a given flow. Although these techniques can limit overall bandwidth usage, these techniques are unable to increase the bandwidth share of a flow, wasting network resources.

BRIEF DESCRIPTION OF THE DRAWINGS

The various embodiments are illustrated by way of example, and not by way of limitation, in the figures of the accompanying drawings, in which:

FIG. 5A illustrates TCP header fields, according to an example embodiment.

FIG. 5B illustrates examples fields used for classification of traffic, according to an example embodiment.

FIG. 6C illustrates the HBT shown in FIG. 6A subdivided into multiple sub-trees, according to an example embodiment.

FIG. 6D illustrates the HBT shown in FIG. 6A with multiple hierarchical levels, according to an example embodiment.

FIG. 10A illustrates TCP packets transmitted between two hosts.

FIG. 10B illustrates TCP packets transmitted between two hosts with the data flow managed by a hierarchical bandwidth manager, according to an example embodiment.

FIG. 10C illustrates TCP packets transmitted between two hosts for a flow 1, according to an example embodiment.

FIG. 10D illustrates TCP packets transmitted between two hosts for a flow 2, according to an example embodiment.

FIG. 10E illustrates a table with output flow rates for flows 1 and 2 as time increases, according to an example embodiment.

FIG. 10F illustrates a portion of a hierarchical bandwidth manager for a leaf node having flows 1 and 2, according to an example embodiment.

Figure 1A:
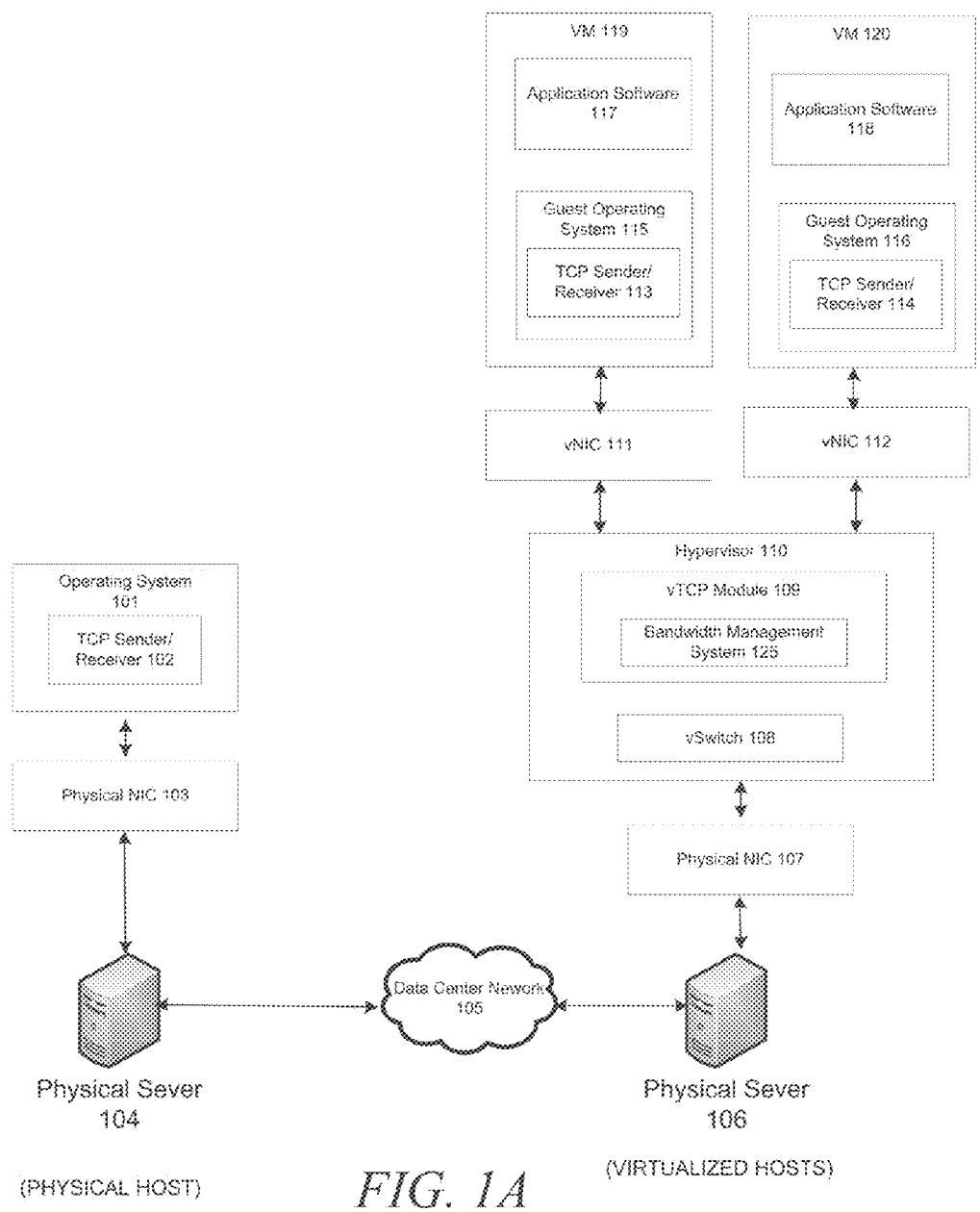
FIG. 1A illustrates a data center having multiple hosts for sending and receiving data packets, according to an example embodiment.

The headings provided herein are merely for convenience and do not necessarily affect the scope or meaning of the terms used.

DETAILED DESCRIPTION

The description that follows includes systems, methods, techniques, instruction sequences, and computing machine program products that embody illustrative embodiments of the present invention. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

Server virtualization is the process of abstracting IT hardware into virtual servers using virtualization software. A virtual server is created through virtualization software by allocating physical IT resources and installing an operating system. Virtual servers use their own guest operating systems, which are independent of the operating system in which they were created.

Methods and systems are described to provide transport layer (Layer 4) quality of service (QOS) to data center applications in a manner that efficiently uses network resources. In various example embodiments, a system and method are disclosed for controlling the rate of data packets transmitted by a TCP sender to a TCP receiver. A BW management system accepts packets from a TCP sender on behalf of a TCP receiver at a flow rate. The BW management system computes a window size $W_A$ to be advertised to the TCP sender based on an estimated rate at which the receiving host is receiving the accepted data packets from the BW management system. The BW management system advertises the window size $W_A$ to the TCP sender to control the flow rate of data packets transmitted by the TCP sender. The BW management system accepts packets from the TCP sender on behalf of a TCP receiver at an adjusted flow rate based on the advertised window size to the TCP sender.

In various embodiments, a system and method are disclosed for providing end-to-end QOS guarantees for applications by managing data flows between two hosts. A BW manager module manages the bandwidth of a collection of flows by traffic classes associated by assigning bandwidth limits to the traffic classes. A QOS manager module allocates application priority shares to the traffic classes and flow shares associated with the application priority shares based on the assigned bandwidth limits to the traffic classes. A WM module manages the bandwidth for the individual flows by adjusting a window size advertised to a first host. The advertised window size controls a rate at which the first host transmits data packets to a second host. The advertised window size is based on the allocated flow shares from the QOS manager.

Performance of applications running on virtual machines in data center networks relies on the availability of system and network resources. A large number of mechanisms have been developed to apportion system resources among competing applications to provide predictable performance. But that alone does not guarantee the desired QOS for the application. Intelligent management of network resources is needed to help the applications achieve their expected level of performance. Research and development in the field of software defined networking (SDN) improves the manageability of the control plane of the network layer, ensuring that hosts can communicate with each other. However, SDN solutions do not have the requisite information or mechanisms to provide application level QOS.

The network workload of data center applications is contained in flows. A flow is traditionally defined as a sequence of packets from a source to a destination, and is uniquely identified by the network addresses and port numbers of the source and destination. The source and destination may also be referred to as a sending host and a receiving host respectively. Most of these flows follow the TCP protocol for delivering data from a source (e.g., TCP sender) to a destination (e.g., TCP receiver). Operating at the network transport layer (for example, TCP/IP), which controls the end-to-end connection semantics; enables true QOS for data center applications. A protocol acceleration module (also referred to as a vTCP module or TCP acceleration module) is a network mechanism that provides end-to-end QOS guarantees for applications by actively managing the sessions for the lifetime of TCP and User Datagram Protocols (UDP) flows.

Example embodiments described herein provide systems and methods for transmitting data packets between a protocol sender and a protocol receiver in a cloud environment, having either the protocol sender or the protocol receiver residing within a virtualized host. For one embodiment, the data packets transmitted may be TCP data packets such that the protocol senders and receivers may be TCP protocol senders and receivers. A protocol acceleration module (also referred to as a vTCP module or TCP acceleration module in various embodiments), may be installed and maintained anywhere along the data path from the protocol sender/receiver within the guest OS to the physical network interface card (NIC). For some embodiments, the protocol acceleration module may plug into or be integrated within a hypervisor. In other embodiments, the vTCP module may be run within an operating system (either host OS or guest OS), run as an application, or deployed as a server. In example embodiments, the protocol acceleration module includes a BW management system for allocating bandwidth for a collection of flows associated with a physical server. The physical server may also be referred to as a server machine in various embodiments.

FIG. 1A illustrates a data center having multiple hosts for sending and receiving data packets, according to an example embodiment. The data center 100 includes a data center network 105 for transmitting data between two hosts. Each of the hosts may represent an endpoint in a data flow, also referred to as a flow. Within the data center network 105, flows represent a sequence of packets exchanged between two endpoints. Each endpoint contains the same unique address and ports in example embodiments. A traffic class represents a collection of flows. The collection of flows within a traffic class matches some user-defined classification rules (e.g., port number, IP addresses, VLAN, etc.).

A physical server 104 is in communication with the data center network 105 using a physical network interface card (NIC) 103, and the physical server 106 is in communication with the data center network 105 using a NIC 107. The physical server 104 with operating system 101 running on it may be referred to as a physical host. The physical host may be either a TCP sender or a TCP receiver, also referred to as TCP sender/receiver 102. In an example embodiment, the physical server 106 represents a single physical computer system which contains two instantiations of VMs, VM 119 and VM 120. In this embodiment, the physical server 106 has a software layer referred to as a hypervisor 110 installed on it, which provides a virtualization platform and may be used to manage and monitor the one or more instantiations of VMs 119 and 120. The physical server 106 with the virtualization software (e.g., hypervisor 110) may be referred to as a virtualized host with multiple instantiations of VMs. The hypervisor 110 is used to generate virtual server instances of the physical server 106. In an example embodiment, the hypervisor 110 is limited to one physical server and can therefore only create virtual images of the physical server 106.

The hypervisor 110, or other virtual machine management software (not shown), allows the creation of multiple virtual machines to run in isolation, side-by-side, on the same physical machine (i.e., physical server 106). Each virtual machine VM 119 and 120 has its own set of virtual hardware (RAM, CPU, NIC) upon which an operating system (e.g., guest operating systems 115 and 116) and fully configured applications (e.g., application software 117 and 118) are loaded.

The hypervisor 110 includes a vTCP module 109, also referred to as a protocol acceleration module or TCP acceleration module. In example embodiments, the vTCP module 109 may be used to accelerate the transmission of data packets between a TCP sender and a TCP receiver without altering the TCP configuration of the host sending the TCP packets.

Figure 1B:
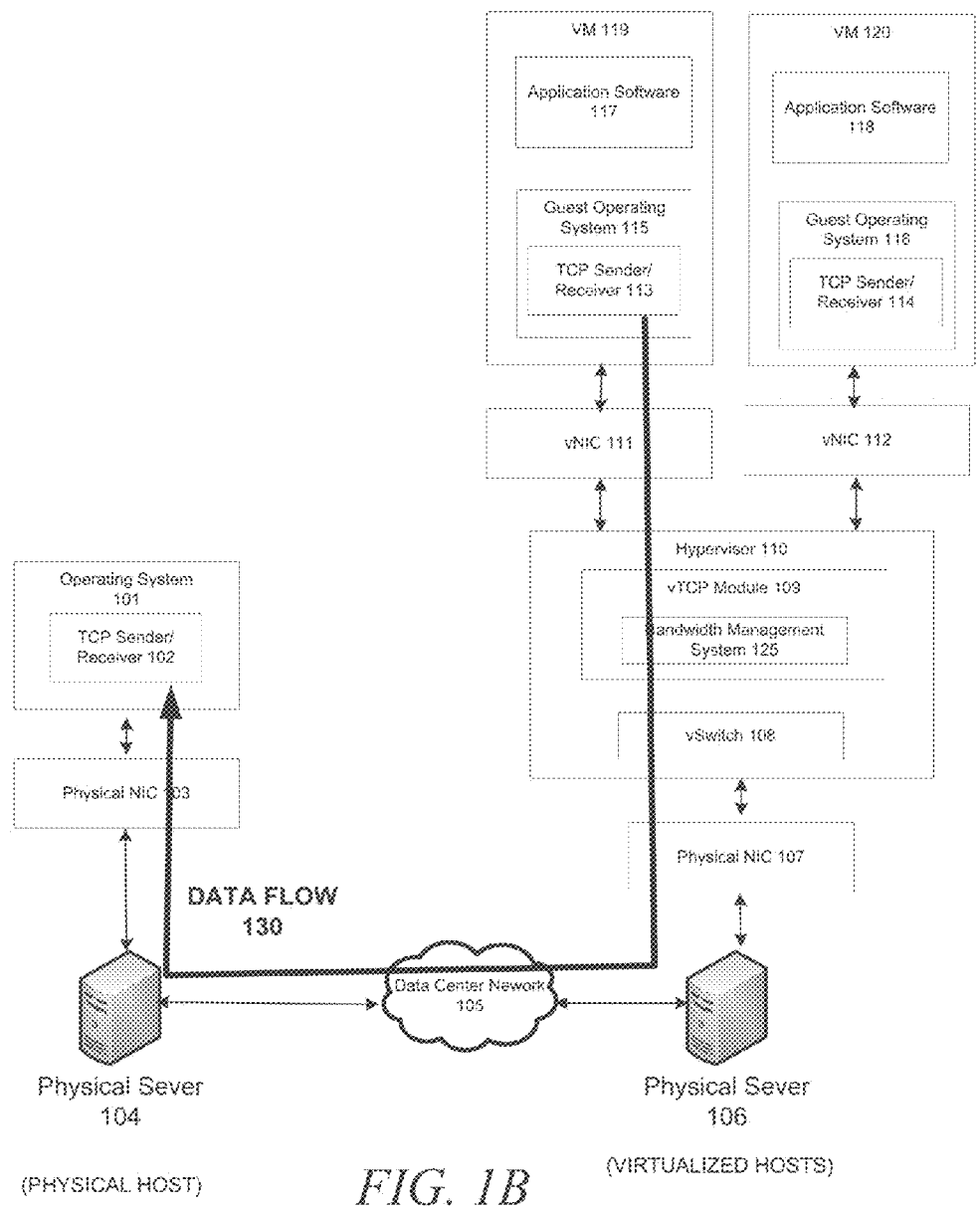
FIG. 1B illustrates a data center having a flow between a transport control protocol (TCP) sender residing on a virtualized host and a TCP receiver, according to an example embodiment.
Figure 1C:
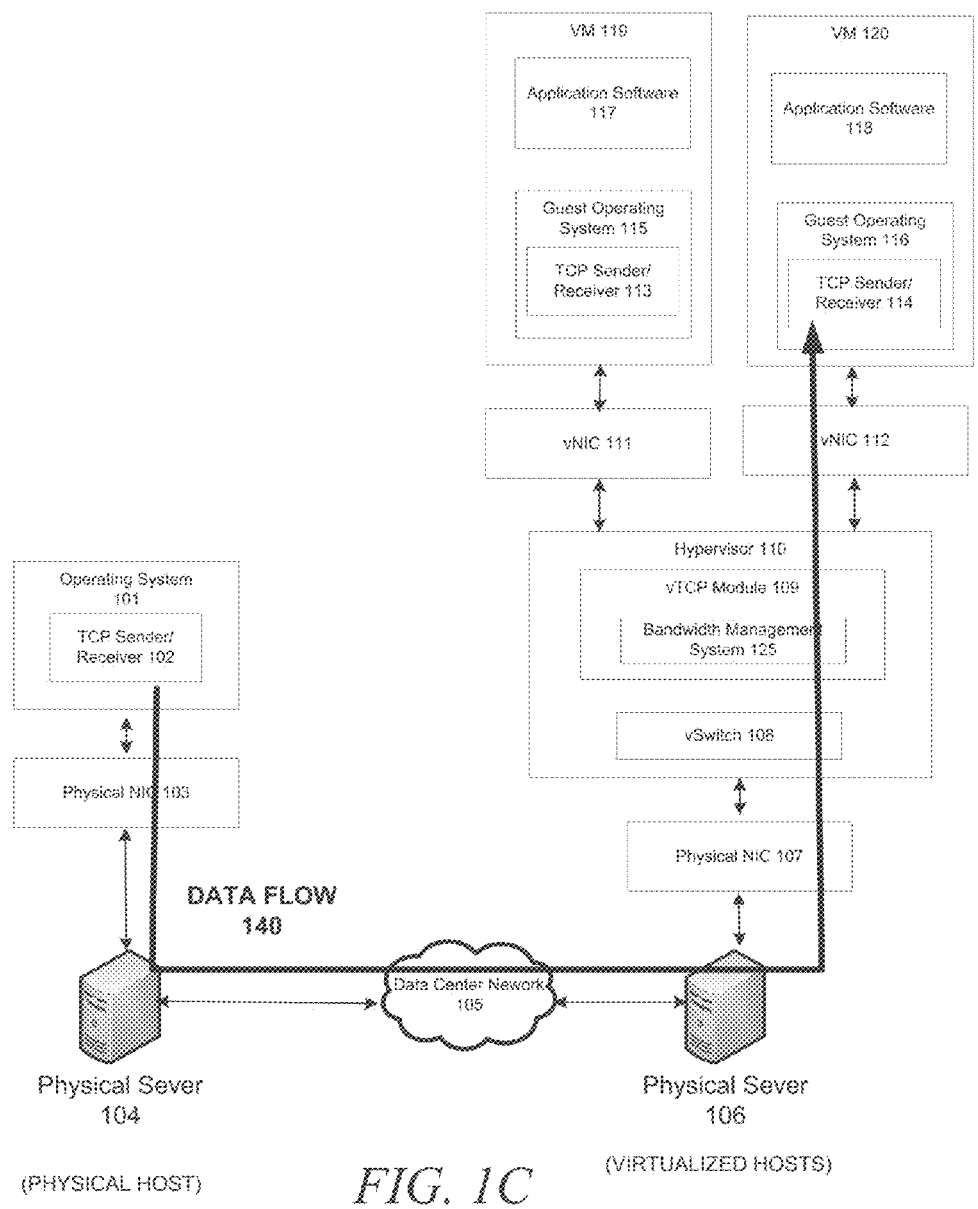
FIG. 1C illustrates a data center having a flow between a TCP sender and a TCP receiver residing on a virtualized host, according to another example embodiment.

In FIG. 1A, the vTCP module 109 includes a BW management system 125. The BW management system 125 is responsible for managing the bandwidth for the data flows associated with the physical server 106, or the virtualized host. Referring to FIG. 1B, a data flow 130 represents an end-to-end connection between VM 119 running on the physical server 106 and the physical server 104. More specifically, FIG. 1B shows the TCP sender/receiver 113 transmitting TCP packets to the TCP sender/receiver 102. Referring to FIG. 1C, a data flow 140 represents an end-to-end connection between VM 120 running on the physical server 106 and the physical server 104. More specifically, FIG. 1C shows the TCP sender/receiver 102 transmitting TCP packets to the TCP sender/receiver 114. In alternative embodiment, both the TCP sender and the TCP receiver may reside on a virtualized host.

Figure 6A:
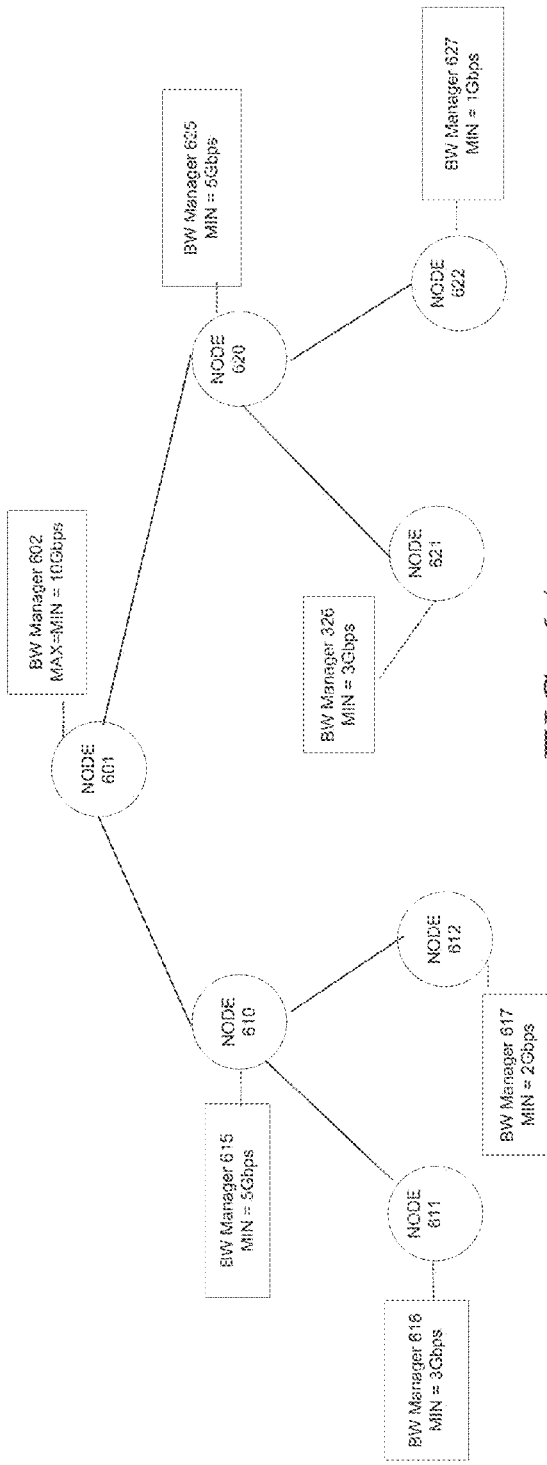
FIG. 6A illustrates a hierarchical bandwidth tree (HBT) for displaying bandwidth shares allocated by a hierarchical bandwidth manager, according to an example embodiment.
Figure 6B:
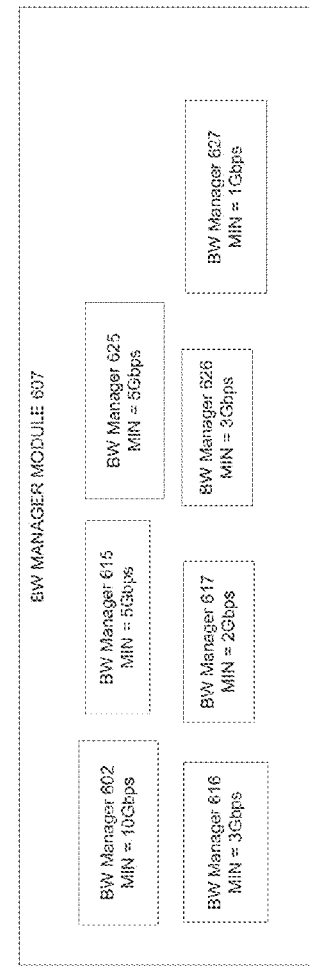
FIG. 6B illustrates a BW manager module corresponding to the HBT of FIG. 6A, according to an example embodiment.

Referring back to FIG. 1A, the data flows associated with a physical server may be referred to as a universal traffic class. For an example embodiment, the physical server may be the physical server 106. In alternative embodiments, the BW management system 125 may not be associated with a virtualized host. The universal traffic class refers to all the flows for a physical server. The bandwidth for a physical server is limited by the entire link capacity of that server in some embodiments. In other words, the maximum bandwidth for the data flows associated with the physical server 106 is determined by the maximum capacity of the data link between the physical NIC 107 and the physical server 106. A HBT is used to illustrate how the BW management system 125 manages the bandwidth for the flows of a physical server. FIGS. 6A-6B illustrate examples of a HBT. The root node represents the physical server 106 and all the flows associated with a server (also referred to as a universal traffic class). The other nodes represent traffic classes associated with virtual resources associated with the physical server 106. The virtual resources may represent a single VM or multiple VMs, which are referred to as a tenant or pool of VMs. Examples of virtual resources are shown in FIGS. 4A, 4C, and 4D. The HBT represents a universal traffic class of flows that may be filtered by different traffic classes at different levels. The BW management system 125 and the HBT will be described in further detail below. The various components and modules within the BW management system 125 are discussed in several other figures described below, for example FIGS. 3A-3F.

A virtual NIC (vNIC) 111 logically connects VM 119 to the hypervisor 110, and a vNIC 112 logically connects VM 120 to the hypervisor 110. A first virtual data path includes vNIC 111, vTCP module 109, and vSwitch 108. A second virtual data path includes vNIC 112, vTCP module 109, and vSwitch 108. In alternative embodiments, the vTCP module 109 may be located elsewhere along the virtual data path. In further embodiments, the vTCP module 109 may operate as an application running on a VM (see FIG. 2B), reside within a host operating system (see FIG. 2C), reside within a guest operating system (see FIG. 2D) or be deployed as a server (see FIG. 2E). In yet other embodiments, the BW management system 125 may not reside within a vTCP module 109. In another embodiment, the BW management system 125 may not be associated with virtualized hosts.

The TCP sender and/or receiver 102 of the physical server 104 reside in operating system 101. A TCP sender and/or receiver 113 resides in a guest operating system 115 and a TCP sender and/or receiver 114 resides in a guest operating system 116. Data packets such as TCP packets are transmitted and received from the hosts shown in FIG. 1A. Although two VMs are shown in FIG. 1A, alternative embodiments may include any number of VMs. In further embodiments, data packets may be transmitted between two virtualized hosts or two physical hosts. In other embodiments, data packets using other protocols, such as UDP, may be transmitted.

Figures 1D, 1E, 1F:
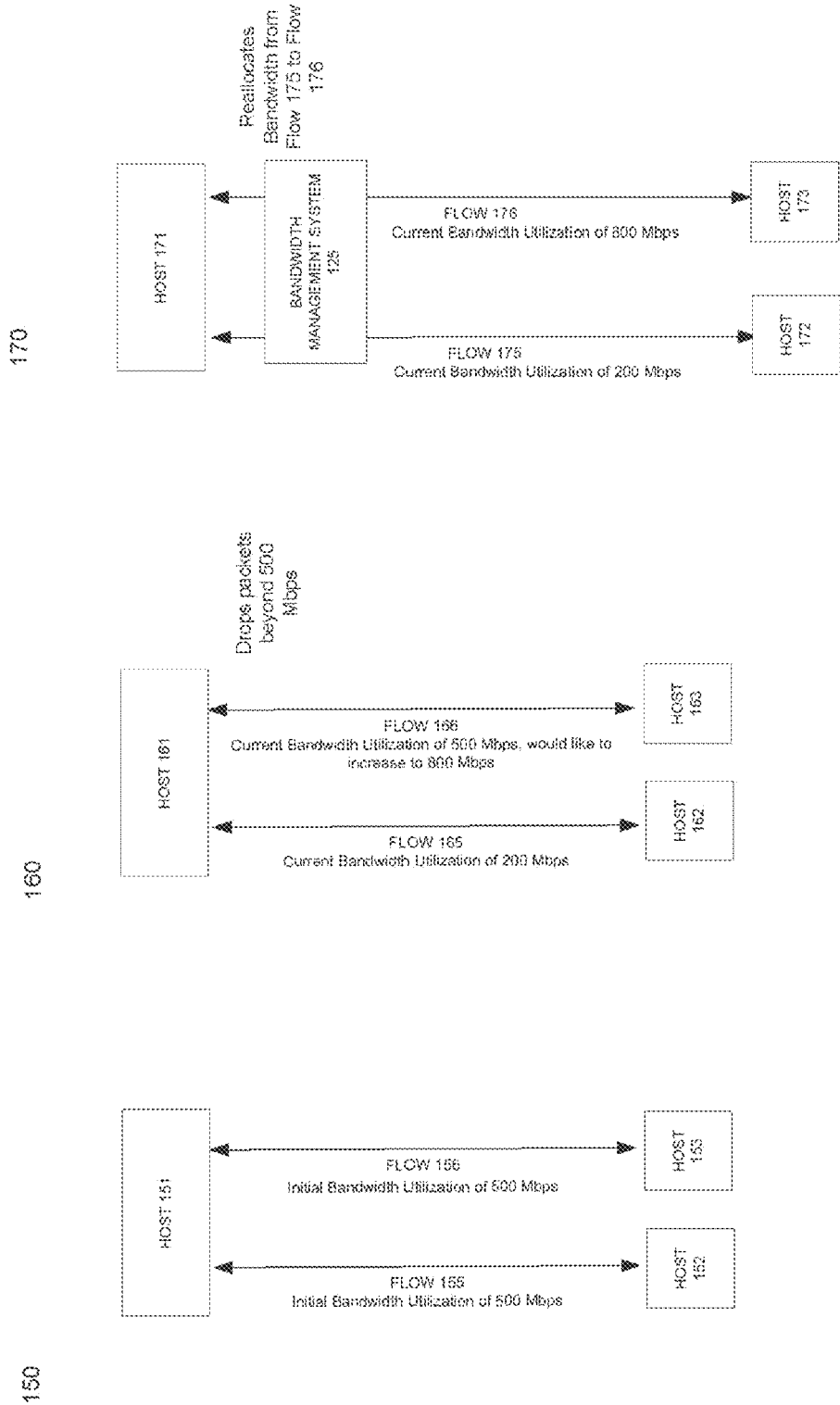
FIG. 1D illustrates an initial bandwidth utilization of two flows without a hierarchical bandwidth manager, according to an example embodiment.
FIG. 1E illustrates a current bandwidth utilization of two flows without a hierarchical bandwidth manager, according to an example embodiment.
FIG. 1F illustrates a current bandwidth utilization of two flows with additional bandwidth allocated from a hierarchical bandwidth manager, according to an example embodiment.

FIG. 1D illustrates an initial bandwidth utilization of two flows. The system 150 illustrates two flows, each with an initial bandwidth utilization of 500 Mbps. A flow 155 is between a host 151 and a host 152, and a flow 156 is between the host 151 and a host 153.

FIGS. 1E and 1F illustrate the same two flows as shown in FIG. 1D, except that the flow 155 has reduced its current bandwidth utilization to 200 Mbps and the flow 156 has an increased bandwidth rate of 800 Mbps. The system 160 shown in FIG. 1E does not have a BW management system; the system 170 shown in FIG. 1F includes a BW management system 125. Because the system 160 does not have a BW management system 125 to reallocate assigned bandwidth among flows 155 and 156 (shown in FIG. 1E as flows 165 and 166), the flow 165 operates at 200 Mbps and the flow 166 operates at 500 Mbps and drops the packets received after the current utilization is at 500 Mbps. On the other hand, the BW management system 125, shown in FIG. 1F, is able to allocate bandwidth from flow 155, shown in FIG. 1F as flow 175, which is under-utilizing its initial bandwidth allocation of 500 Mbps, to flow 156, shown in FIG. 1F as flow 176, which is over-utilizing its initial bandwidth allocation of 500 Mbps.

Figure 2A:
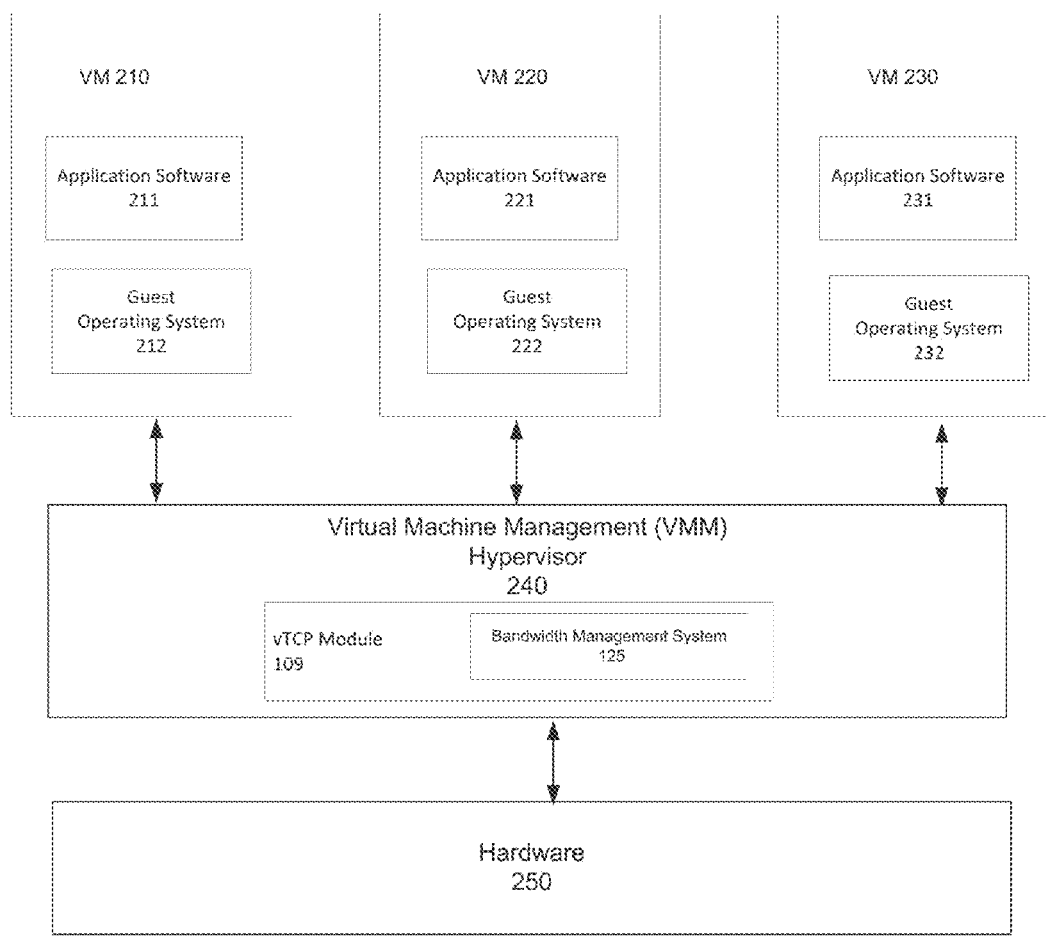
FIG. 2A is a block diagram illustrating a virtual transport control protocol (vTCP) module operating on top of a virtual machine management (VMM) within a virtualized system, according to an example embodiment.

FIG. 2A is a block diagram illustrating an example embodiment of a hardware-based virtualized system 200. In this embodiment, a single physical computer system, referred to as hardware 250, may contain one or more instantiations of virtual machines (VMs), such as VMs 210, 220 and 230. In this embodiment, the hardware 250 has a software layer called a hypervisor 240 (may also be referred to VMM installed on the hardware 250, which provides a virtualization platform. The hypervisor 240 may be used to manage and monitor the one or more instantiations of VMs 210, 220 and 230 on the hardware 250. In this example, the hypervisor 240 is installed directly on the native hardware of the hardware 250; however, hypervisors may also be installed as a software layer in a native operating system, known as a host operating system. A BW management system (not shown) is part of the vTCP module 109 and runs on the hypervisor 240.

In this embodiment, the hypervisor 240 has three instantiations of VMs (e.g., VMs 210, 220 and 230) installed on the hardware 250. Respective VMs 210, 220, 230 have operating systems, such as guest operating systems 212, 222, and 232, and various program applications, such application software 211, 221 and 231. In various embodiments, the operating systems 212, 222, 223 and application software 211, 221, 231 run substantially isolated from the other VMs co-located on the same physical hardware 250.

Figure 2B:
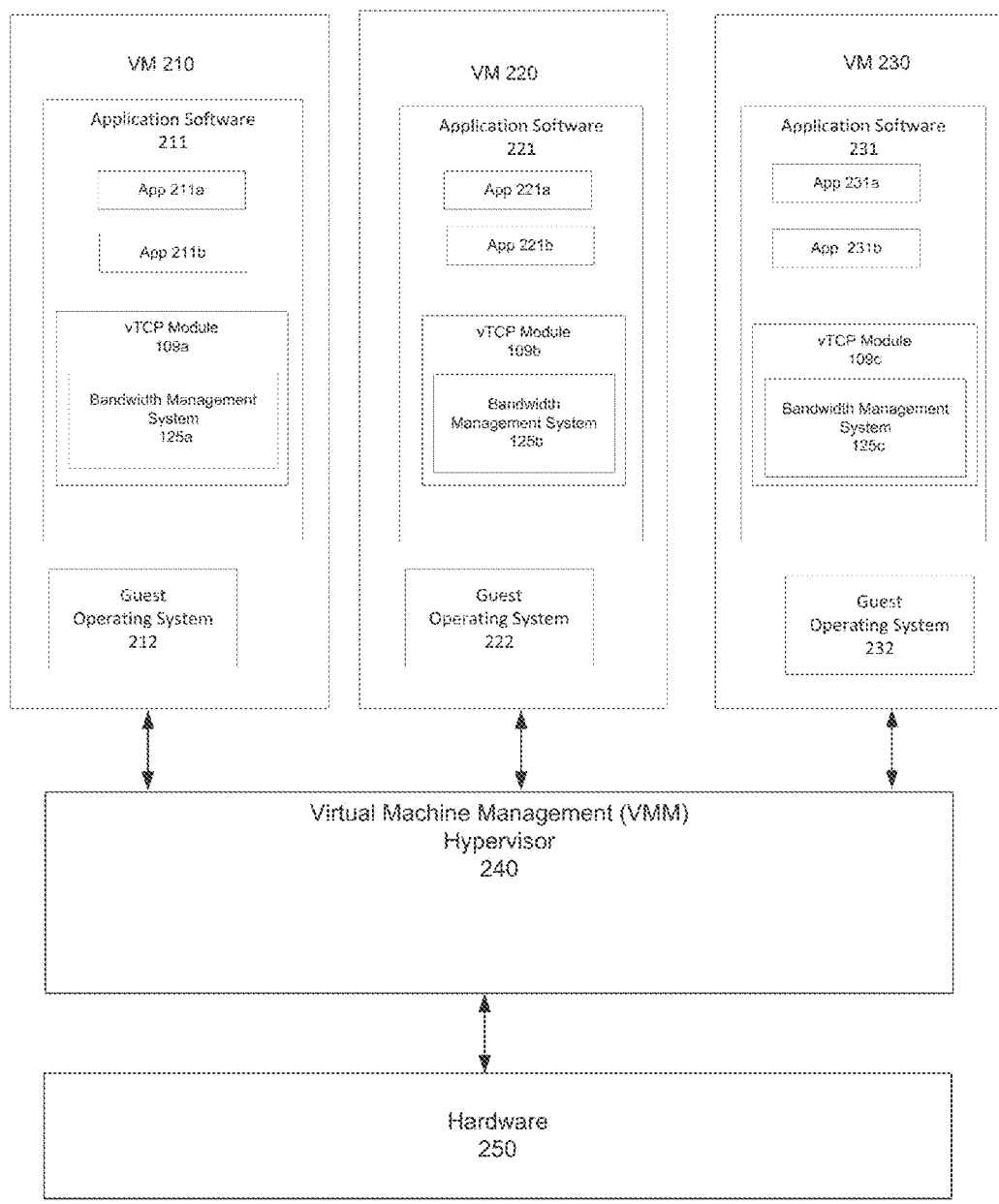
FIG. 2B is a block diagram illustrating a vTCP module operating as an application within a virtualized system, according to an example embodiment.

FIG. 2B is a block diagram illustrating vTCP modules 109a-109c operating as an application software within a virtualized system, according to an example embodiment. In FIG. 2B, each of the VMs (210, 220, 230) within system 201 includes a vTCP module (109a, 109b, 109c, respectively) operating as a software application. The VM 210 includes application software 211 with Apps 211a, 211b and vTCP module 109a. The VM 220 includes application software 221 with Apps 221a, 221b and vTCP module 109b. The VM 230 includes application software 231 with Apps 231a, 231b and vTCP module 109c. The BW management systems 125a, 125b, and 125c reside within the vTCP modules 109a, 109b, and 109c, respectively.

Figure 2C:
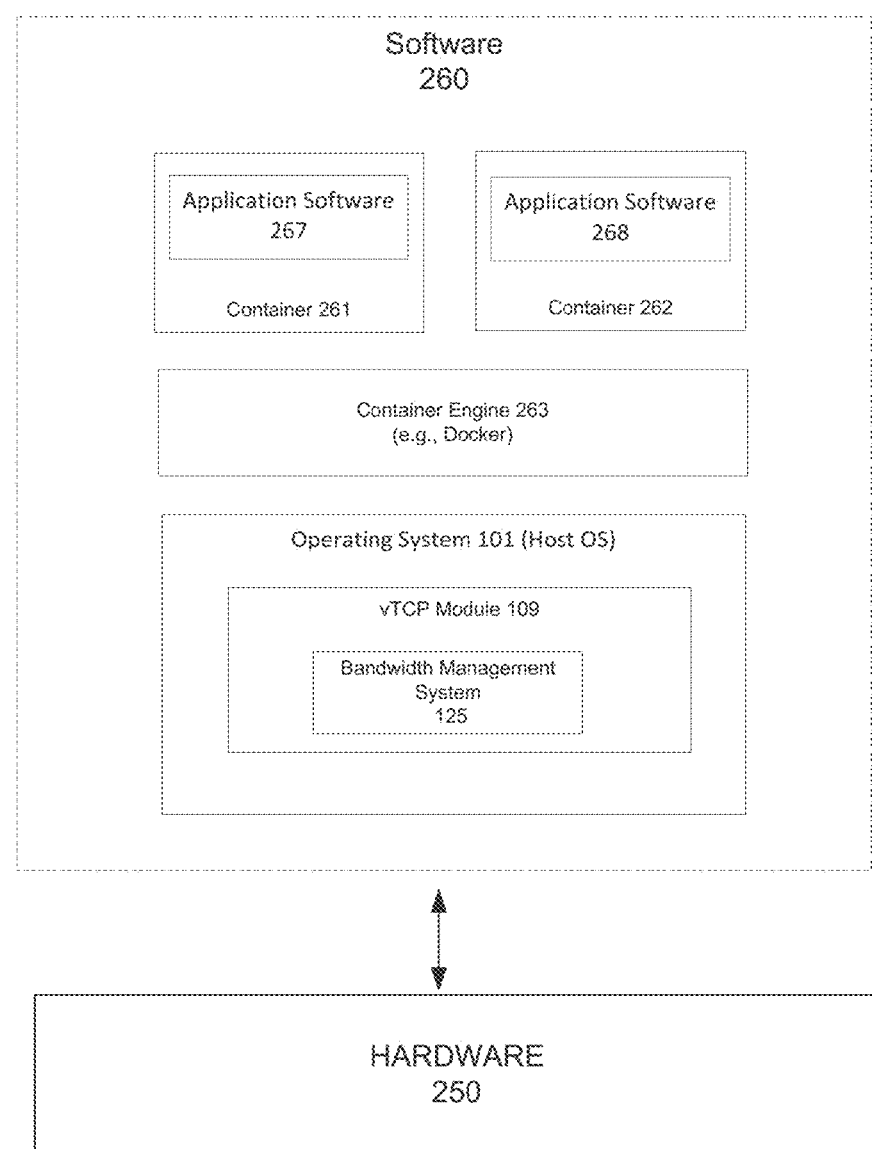
FIG. 2C is a block diagram illustrating a vTCP module operating as a container within a host operating system, according to an example embodiment.

FIG. 2C is a block diagram illustrating the vTCP module 109 residing within a host operating system 101, according to an example embodiment. The system 202 includes the hardware 250 and software 260 running on the hardware 250. The software 206 includes the operating system 101 (also referred to as the host OS), a container engine 263 (e.g., a docker), multiple containers (e.g., containers 261 and 262). In an example embodiment, a docker (i.e., a container engine) may be used to automate the deployment of applications inside software containers by providing an additional layer of abstraction and automation of operating system level virtualization (e.g., on Linux). As a result, the overhead of starting VMs may be avoided or minimized. Referring to FIG. 2C, within each container 261, 262 is the application software 267, 268, respectively. Application software 267 is included within a container 261, and application software 268 is included within a container 262. The vTCP module 109 sits within the operating system 101 (i.e., the host OS). In an example embodiment, the BW management system 125 is a component with the vTCP module 109.

Figure 2D:
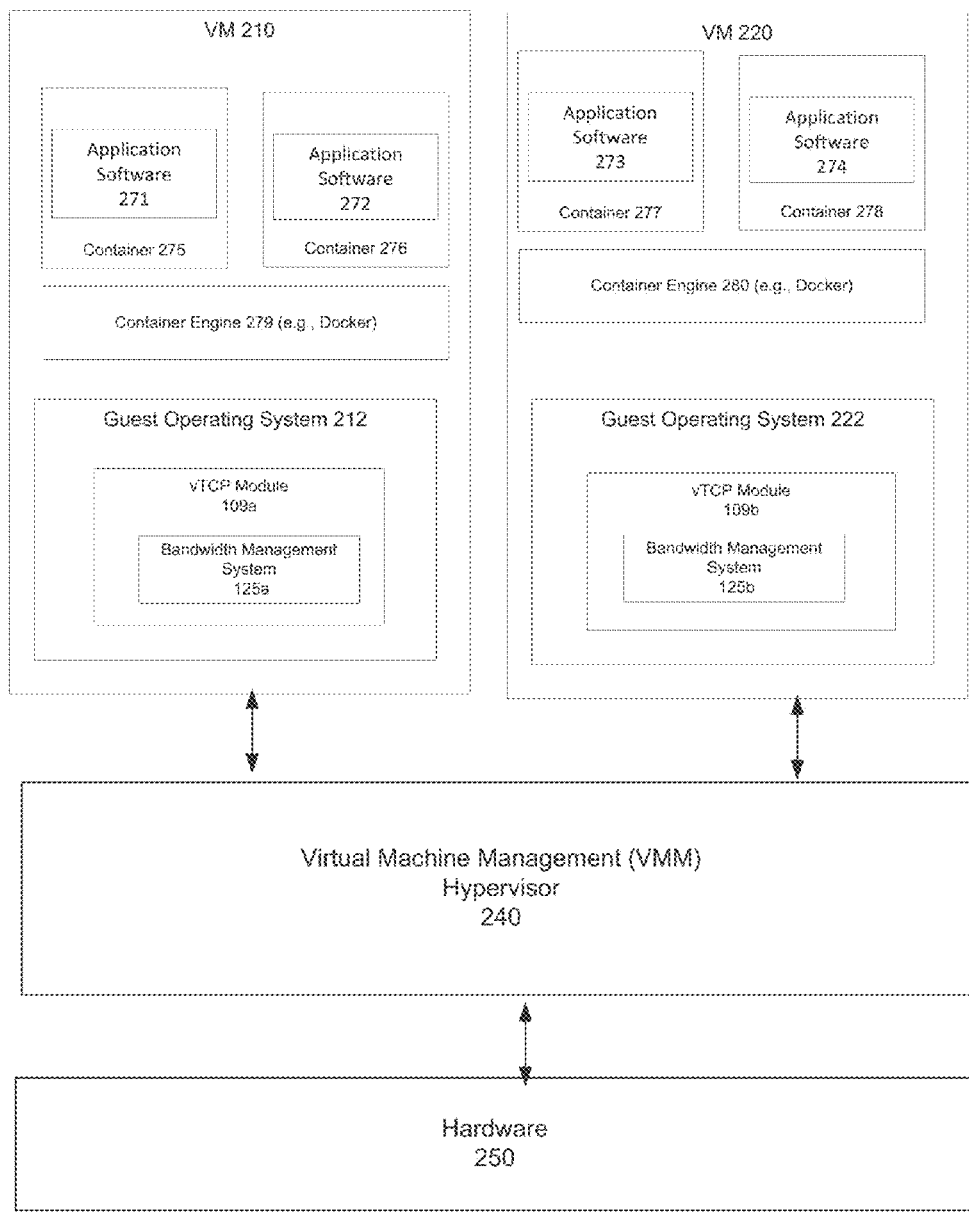
FIG. 2D is a block diagram illustrating a vTCP module operating as a container within a guest operating system within a virtualized system, according to an example embodiment.

FIG. 2D is a block diagram illustrating vTCP modules 109a, 109b residing within a guest operating system 212, 222, respectively, within a virtualized system. A vTCP module 109a resides within a guest operating system 212 and a vTCP module 109b resides within the guest operating system 222. In this embodiment, the hypervisor 240 has two instantiations of VMs (e.g., VMs 210 and 220) installed on the hardware 250. The vTCP modules 109a and 109b each include a BW management system 125a and 125b, respectively, in various embodiments. The VM 210 includes a guest operating system 212, a container engine 279, a container 275 (which includes application software 271) and a container 276 (which includes application software 272). The VM 220 includes a guest operating system 222, a container engine 280, a container 277 (which includes application software 273), and a container 278 (which includes application software 274). The user may set the minimum bandwidth reservation and/or maximum bandwidth capacity on a per container basis by creating a class of traffic filtered by IP address and/or a protocol-port number.

Figure 2E:
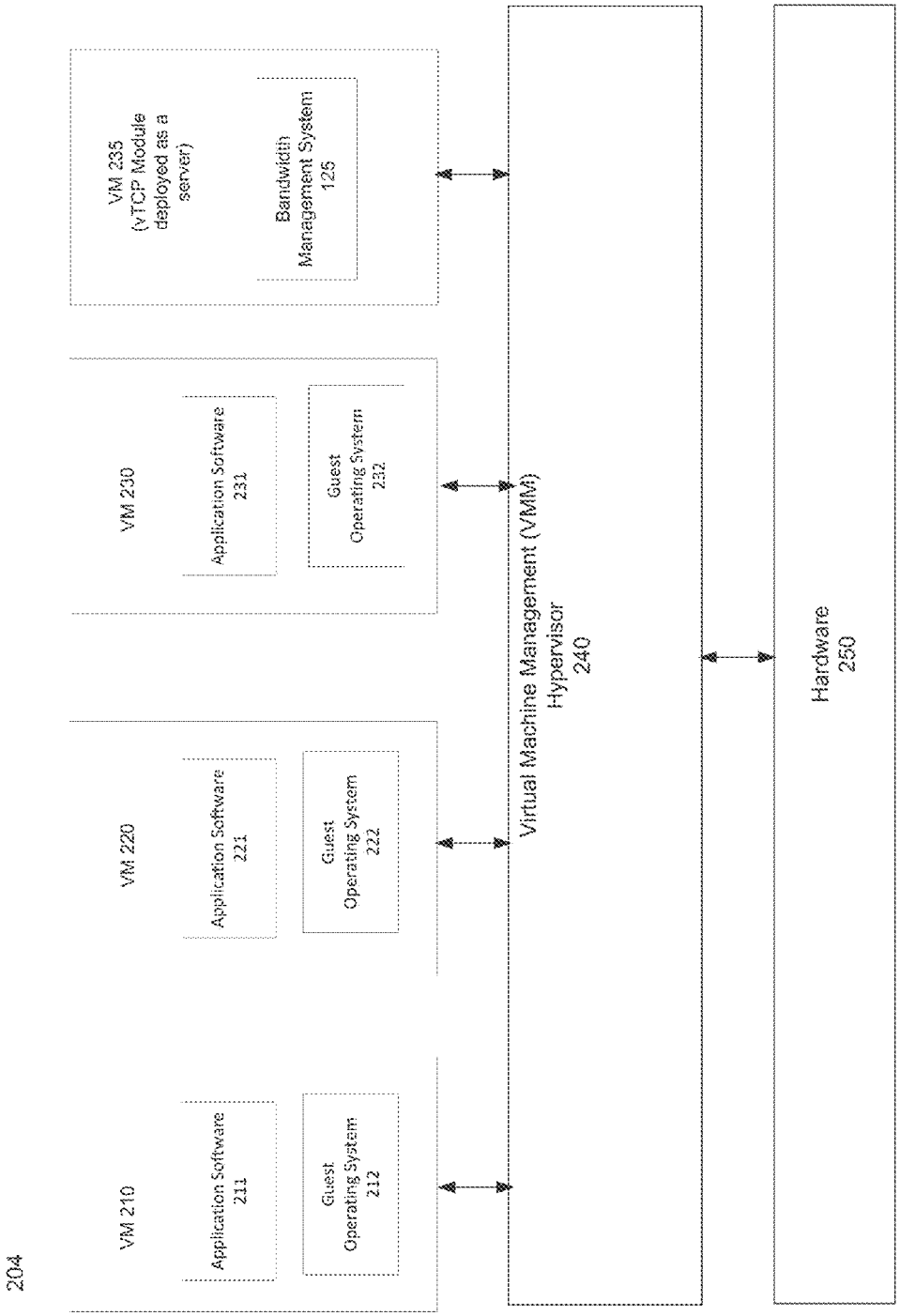
FIG. 2E is a block diagram illustrating a vTCP module operating as a virtual machine within a virtualized system, according to an example embodiment.

FIG. 2E is a block diagram illustrating a vTCP module operating as a VM and deployed as a server, according to an example embodiment. In the embodiment shown in system 204, the hypervisor 240 has four instantiations of VMs installed on the hardware 250. The four VMs include VM 210, VM 220, VM 230, and VM 235, which is referred to as a vTCP module deployed as a server.

Figure 3A:
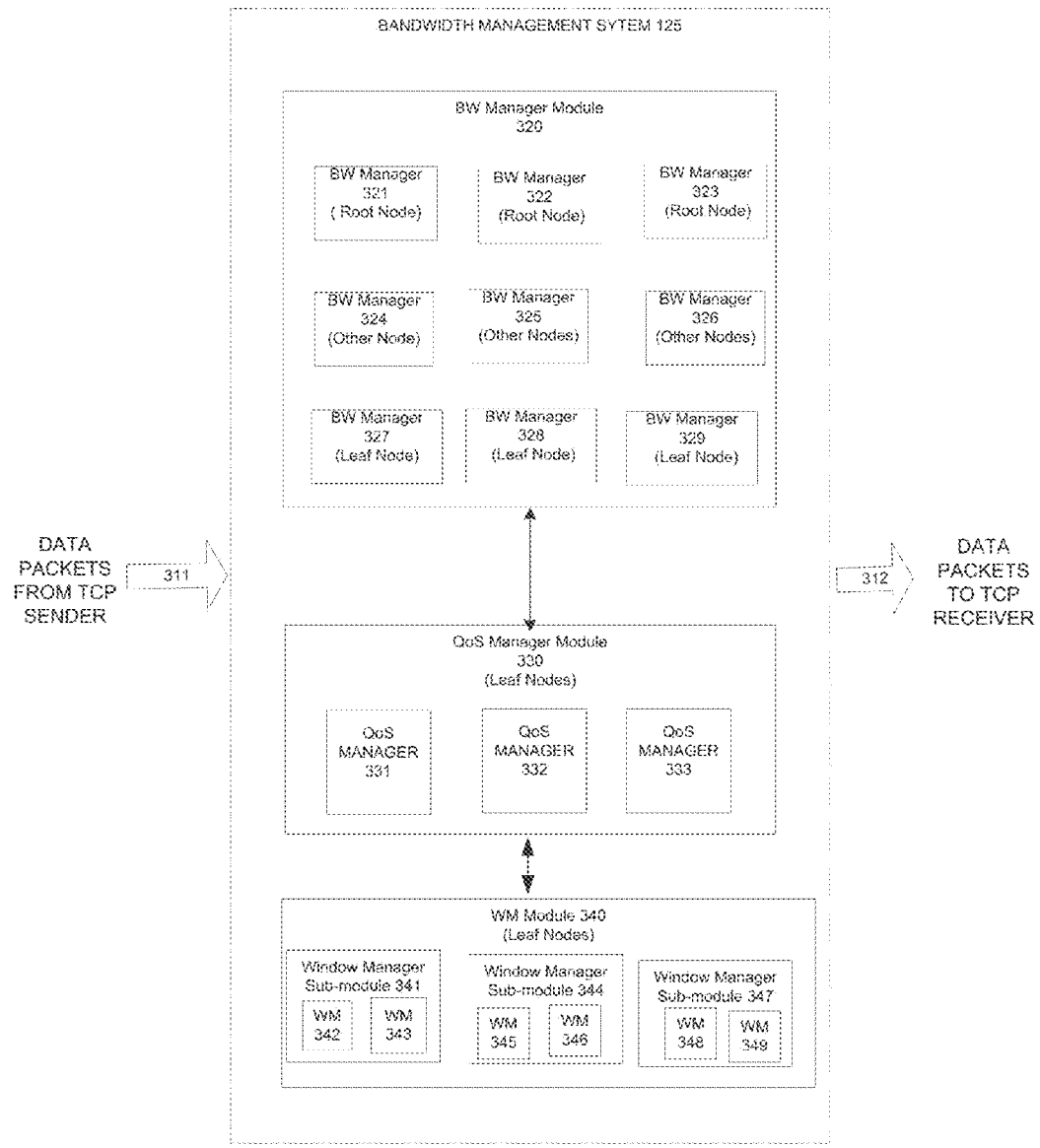
FIG. 3A illustrates is block diagram of a bandwidth (BW) management system, according to an example embodiment.
Figure 4A:
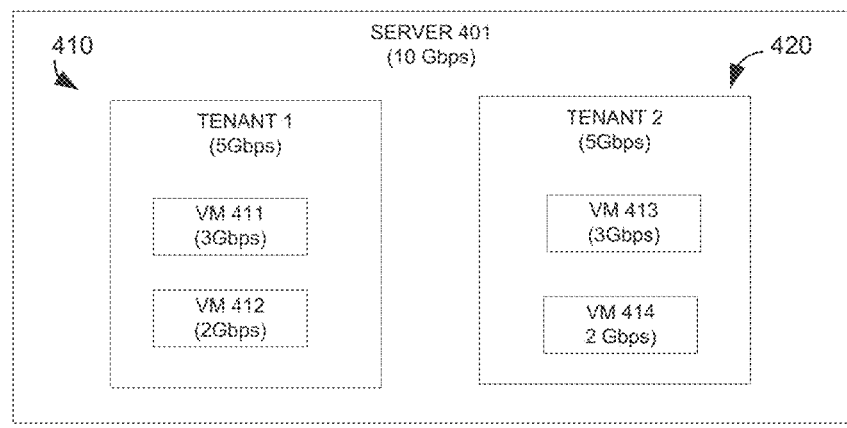
FIG. 4A illustrates a block diagram of a server having multiple tenants with multiple virtual machines (VMs), according to an example embodiment.

FIG. 3A illustrates the BW management system 125, according to example embodiments. The BW management system 125 is implemented in the vTCP module 109 in various embodiments. In alternative embodiments, the BW management system 125 may reside in other types of accelerated protocol modules. For example, the protocol acceleration module may not be limited to TCP protocols or used in a virtualized environment. As shown in FIGS. 2A-2E, the vTCP module 109 may reside within a VMM hypervisor 240, VM (e.g., VM 210, VM 220, or VM 230), host operating system 101, guest operating system 212 or 222, or VM 235 having the vTCP module 109 deployed as a server. In some embodiments, the BW management system 125 is configured to accept data packets from a sending host (e.g., data packets from a TCP sender at 311 in FIG. 3A). The BW management system 125 accepts the data packets on behalf of the receiving host (e.g., data packets to a TCP receiver at 312). The data packets accepted by the BW management system 125 may be temporarily stored by the BW management system 125 before the BW management system 125 forwards the data packets to the receiving host.

The BW management system 125 may be referred to as a network mechanism that provides end-to-end quality of service (QOS) guarantees for applications by actively managing the session for the lifetime (or at least a portion of the lifetime) of TCP flows, and flows using other protocols, such User Datagram Protocols (UDP) flows. In various embodiments, flows of traffic (also referred to as "traffic classes" or "traffic classes of flows" or "traffic subclasses") may be classified to organize the data packets with different characteristics into different classes using certain criteria. A traffic class that is filtered by another parameter may be referred to as a traffic subclass.

FIG. 5B provides some examples of filters that may be used to classify traffic classes of flows. The table 525 for classifying traffic includes a column 521 for providing the data sources corresponding to the filters in column 531. The filters in column 531 represent traffic classification parameters that may be used to configure the traffic classes associated with nodes in a HBT. Examples of HBTs are shown in FIGS. 6A-6G. The filters shown in FIG. 5B include the following filters in column 531: a physical port 532, a virtual port 533, a VLAN 534, a VN 535, an IP source 536, an IP destination 537, a protocol 538, a port source 539, and a port destination 540. Other example embodiments, may classify traffic using other filters.

The BW management system 125 addresses the QOS by rate-limiting the inbound and outbound data flow (associated with a class of traffic) for software applications running on server machines. In example embodiments, the server machines may reside in a cloud computing environment with virtualized resources. In other embodiments, the server machines may not represent virtualized resources. The BW management system 125 may be used to control the inbound rate of traffic for a traffic class by influencing control over the amount of data a sending host (e.g., TCP sender) may transmit to a receiving host (e.g., TCP receiver). In various embodiments, the rate that data packets are sent from a sending host is controlled by a parameter, such as a window size for TCP data packets. In other embodiments using non-TCP protocols, other parameters may be used to control the rate that data packets are sent from a sending host. Various sliding window protocols may be used to control the rate at which data packets are transmitted by sending hosts.

Referring again to FIG. 3A, the BW management system 125 manages bandwidth for all flows for a physical server using a three component structure, which includes a BW manager module 320, a QOS manager module 330 and a WM module 340 in example embodiments. In alternative embodiments, the modules 320, 330, and 340 may be used alone, or in various combinations together, to implement a BW management system 125. The flows associated with a physical server may be referred to as a collection of flows represented by a universal traffic class in various embodiments.

The BW manager module 320 assigns bandwidth reservations (also referred to as MIN values) to traffic classes in example embodiments. In further embodiments, the BW manager module assigns MAX values for defining a limit on the maximum bandwidth that can be achieved by the traffic classes. Sub-classification of a traffic class can further divide a bandwidth reservation (MIN value) and the limit on the maximum bandwidth that can be achieved (MAX value) in a hierarchical manner (as shown by the HBTs in FIGS. 6A-6G). The sub-classification may be done by filtering a traffic class by one or more parameters. In various embodiments, sub-classification of traffic classes may also be referred to as traffic subclasses. In various embodiments manager module 320 actively manages an individual flow by controlling the bandwidth utilization of the collection of individual flows associated with the universal traffic class to conform to bandwidth limits assigned to the nodes in the HBT.

The QOS manager module 330 communicates with the BW manager module 320 associated with the leaf nodes in a HBT. The QOS manager module 330 also communicates with the WM module 340. More specifically, the QOS manager module 330 receives bandwidth requests per flow from the WM module 340 and provides bandwidth responses per flow to the WM module 340. The QOS manager module 330 sends bandwidth requests for a collection of flows associated with a traffic class to the BM manager module 320 and receives bandwidth responses from the BM manager module 320 for a collection of flows associated with a traffic class. The communications between the various modules 320, 330 and 340 are described in further detail below in conjunction with FIG. 3B.

The WM module 340 makes bandwidth requests on a per flow basis to the QOS manager module 330 and receives bandwidth responses on a per flow basis from the QOS manager module 330 to manage the bandwidth on a per flow basis. This BW management system 125 can help to achieve the desired bandwidth at both the individual flow level and the traffic class level by using these three components—the BW manager module 320, the QOS manager module 330, and the WM module 340. In various embodiments, a data center administrator may use the BW management system 125 to configure the QOS for multiple applications in a network running on multiple hosts.

In example embodiments, the BW management system 125 is arranged with the BW manager module 320 at the top, the QOS manager module 330 below the BW manager module 320, and the WM module 340 at the bottom, as shown in FIG. 3A. The BW manager module 320 allocates and manages the bandwidth limits for the various traffic classes associated with nodes in the HBT. The QOS manager module 330 applies the QOS policy to flows in traffic classes based on application priorities, in example embodiments. The WM module 340 controls the bandwidth for individual flows using a sliding window protocol in example embodiments. Each of these modules 320, 330 and 340 will also be discussed in further detail below.

In example embodiments, the BW manager module 320 creates a bandwidth manager for each node in a HBT. For various embodiments, the HBT represents a collection of flows associated with a physical server or server machine. As mentioned above, a node may be a representation of a collection of flows filtered by one or more flow classification parameters, also referred to as a traffic class or traffic subclass.

The BW manager module 320 shown in FIG. 3A includes nine BW managers 321-329. The BW managers 321-323 are associated with root nodes, the BW managers 324-326 are associated with other nodes (i.e., not root nodes or leaf nodes), and the BW managers 327-329 are associated with leaf nodes. The BW manager module 320 may include a node creation module (not shown) for creating traffic classes (and sub-classification of traffic classes referred to as traffic subclasses) representing nodes, for one or more HBTs. Each traffic class and subclass may represent a node in a HBT. For the example shown in FIG. 3A, the BW manager module 320 may manage the bandwidth for the collection of flows associated with three physical severs and represented by three individual HBTs. The BW managers 321, 322 and 323 each correspond to the root nodes of different HBTs.

In various embodiments, the BW manager module 320 is configured to manage the bandwidth of a collection of flows associated with a server machine by traffic classes. The traffic classes are arranged in a HBT with the collection of flows representing a universal traffic class at the highest level. The root node in the HBT represents the universal traffic class. The collection of flows associated with the universal traffic class is divided into smaller collections representing traffic classes. The leaf traffic classes represent the traffic classes at the lowest level of the HBT. Each of the leaf traffic classes are filtered by at least one traffic class parameter. The flows in a traffic class represent an end-to-end connection between two hosts. In some embodiments, at least one of the hosts represents a virtualized host. In other embodiments, none of the hosts represent a virtualized host.

Examples of a HBT are described in conjunction with FIGS. 6A-6G. The BW management system 125, shown in FIG. 3A, illustrates the BW manager module 320, the QOS manager module 330 and the WM module 340 each having multiple components referred to as managers (e.g., BW managers, QOS managers, and WMs). In various embodiments, the modules 320, 330 and 340 may be considered to operate independently from each other even though they are in communication with each other.

In the example shown in FIG. 3A, the BW manager module 320 includes multiple BW managers 321-329, each of which are associated with the various nodes (e.g., root node, leaf node, or other node). The QOS manager module 330 includes QOS managers 331-333. The WM module 340 includes WMs 342-343, 345-346, and 348-349 arranged within WM sub-modules 341, 344, and 347, respectively. The BW manager modules associated with the leaf nodes (e.g., 327-329) communicate with QOS managers and WMs. In some embodiments, each of the leaf nodes is associated with a BW manager. Associated with the BW managers at the leaf nodes are a QOS managers and WMs. An example embodiment of a BW manager is shown in FIG. 3D, an example embodiment of a QOS manager is shown in FIG. 3E, and an example embodiment of a WM is shown in FIG. 3F. Further details regarding the BW manager, the QOS manager and WM will be discussed below together with FIGS. 3D-3F. It is understood that the number of managers included within a BW manager module 320, a QOS manager module 330, and a WM module 340 may vary depending on the number of flows in the collection of flows associated with one or more universal traffic class and how a universal traffic class is filtered into traffic classes represented by nodes.

Figure 3B:
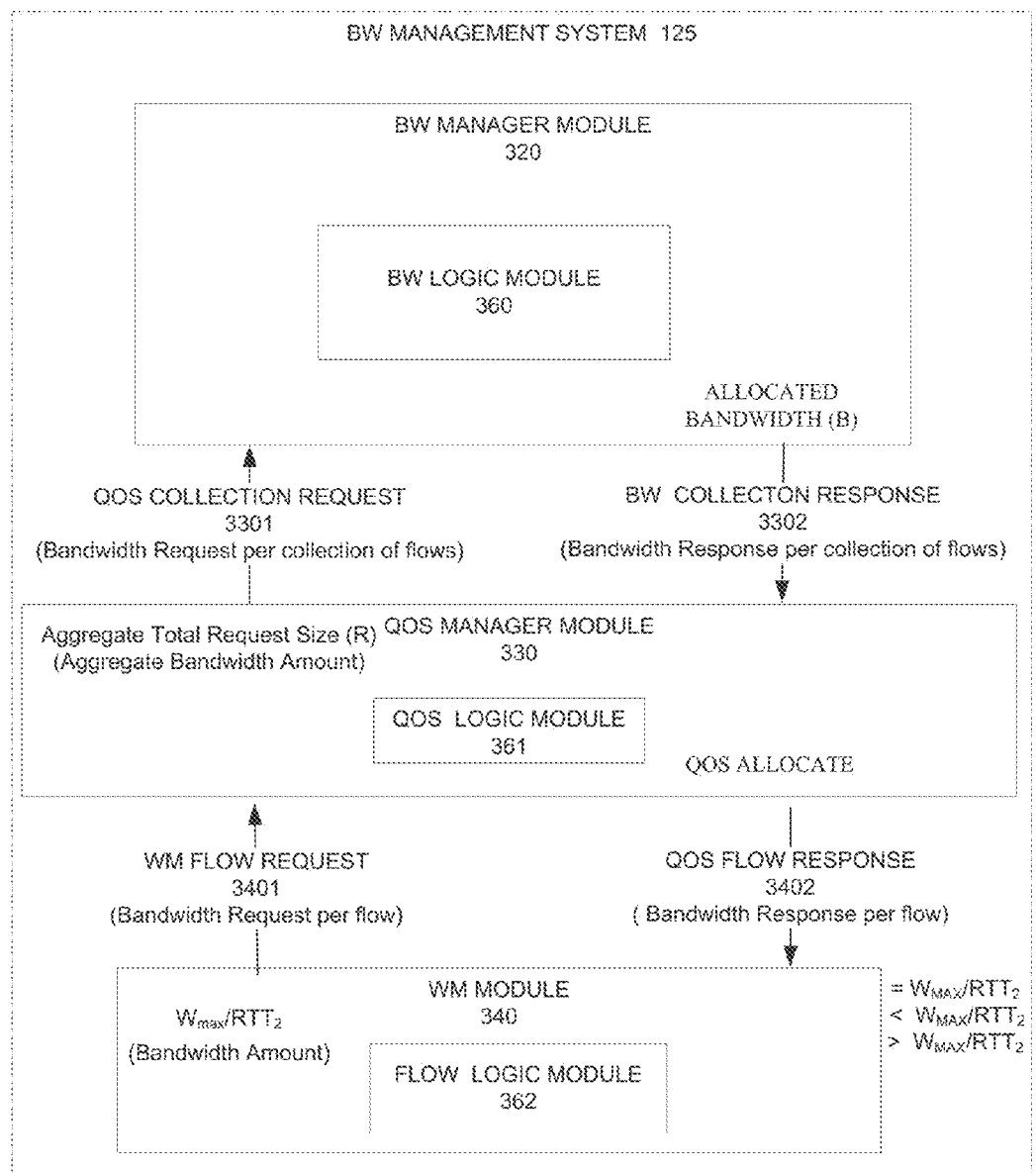
FIG. 3B illustrates is block diagram of a BW management system, according to another example embodiment.

FIG. 3B illustrates another embodiment of the BW management system 125. The BW management system 125 shown in FIG. 3B illustrates an example of the communication and interaction between the BW manager module 320, the QOS manager module 330, and the WM module 340. In various embodiments, communications are sent from the WM module 340 to the QOS manager module 330, from the QOS manager module 330 to the BW manager module 320, and then from the BW manager module 320 to the QOS manager module 330, from the QOS manager module 330 to the WM module 340, as packets are sent from a sending host. The BW management system 125 actively manages the collection of flows associated with a universal traffic class by controlling the rate that data packets are transmitted for the individual flows in the collection of flows. In example embodiments, the communications between the modules 340, 330 and 320 include a WM FLOW REQUEST 3401, a QOS COLLECTION REQUEST 3301 (in response to the WM FLOW REQUEST 3401), a BW COLLECTION RESPONSE 3302 (in response to the QOS COLLECTION REQUEST 3301), and a QOS FLOW RESPONSE 3402 (in response to the WM FLOW REQUEST 3302).

In some embodiments the QOS FLOW RESPONSE 3402 is almost instantaneous after a WM FLOW REQUEST 3401 is received by the QOS manager module 330. In various example embodiments, the request includes a bandwidth request amount on a per flow basis or for a collection of flows. The WM FLOW REQUEST 3401 represents a bandwidth request per flow. The QOS COLLECTION REQUEST 3301 represents a bandwidth request for a collection of flows associated with a traffic class. In other example embodiments, the responses may include an allocated bandwidth amount on a per flow basis or for a collection of flows. The QOS FLOW RESPONSE 3402 represents a bandwidth response per flow. The BW COLLECTION RESPONSE 3302 represents a bandwidth response for a collection of flows associated with a traffic class.

In example embodiments, the flow of communication between the modules 340, 330 and 320 may be communications between multiple WMs and a QOS manager associated with a BW manager which is associated with traffic class representing a leaf node in a HBT. For example, referring to FIG. 7B, the WMs 775-780 and the QOS manager 331 are associated with the BW manager 327, which is associated with a traffic class represented by a leaf node 327. The requests (3401 and 3301) and responses (3402 and 3302) are communicated between the managers (WMs 775-780, QOS manager 331, and BW manager 327) associated with a collection of flows associated with the leaf node 720 in an example embodiment shown in FIG. 7B.

The BW manager module 320 includes a BW logic module 360, the QOS manager module 330 includes a QOS logic module 361, and the WM module 340 includes a flow logic module 362. In various embodiments, the BW logic module 360 may be distributed among one or more BW managers 321-329. The BW managers 321-329 may communicate with one another to manage the bandwidth limits of the various traffic classes associated with the nodes in a HBT. For various embodiments, the bandwidth limits may be referred to as the MIN and MAX values assigned the various nodes in a HBT.

For an example embodiment, the QOS logic module 361 may represent the QOS logic modules 3610 included in the QOS managers 331-333. For example, a QOS logic module 3610 included within QOS manager 331 is shown in FIG. 3E. In various embodiments, the QOS managers within a QOS manager module do not communicate with each other.

For an example embodiment, the flow logic module 362 may represent one or more flow logic modules 3620 within the WMs 342-343, 345-346, and 348-349. In various embodiments, the WMs do not communicate with each other. FIG. 3F illustrates an example of a flow logic module 3620 in the WM 342. The function of the logic modules 360, 361, and 362 will also be described in further detail below in conjunction with FIGS. 3D, 3E and 3F, respectively.

The WM module 340 sends WM FLOW REQUESTS 3401, representing bandwidth requests per flow, to the QOS manager module 330. The flow logic module 362 determines the amount of bandwidth to be requested in the WM FLOW REQUEST 3401. In various embodiments, the amount of bandwidth requested in a WM FLOW REQUEST 3401 equals $W_{MAX}/RTT_2$ for an individual flow. In various embodiments, computing the bandwidth request of $W_{MAX}/RTT_2$ for the first individual flow is based on an estimated rate at which a receiving host is receiving data packets from the BW management system 125 for an individual flow.

The formula for $W_{MAX}/RTT_2$ is described in further detail with respect to FIGS. 10A-10F. The QOS logic module 361 processes the WM FLOW REQUEST 3401 and computes a QOS COLLECTION REQUEST 3301 representing an aggregate bandwidth amount for a collection of flows associated with a traffic class. The QOS logic module 361 aggregates the total request size (referred to as R) for an application priority class across all application priority classes which are associated with a collection flows associated with a traffic class. The aggregate total request size R represents the aggregate bandwidth amount requested or indicated in the QOS COLLECTION REQUEST 3301. In some embodiments, the QOS logic module 361 tracks the bandwidth amount for the WM FLOW REQUESTS 3401 by each application priority class (for a collection of flows associated with a traffic class) and then aggregates the bandwidth requested per flow across all application priority classes (for the collection of flows associated with a traffic class) to compute R.

In an example embodiment, there may be three application priority classes referred to as P1, P2 and P3. P1 may represent a high application priority class, P2 may represent a medium priority class and P3 may represent a low application priority class. Each priority application class has an aggregate total request size referred to as P1 for $R_{P1}$, P2 for $R_{P2}$ and P3 for $R_{P3}$, where the aggregate total request size R across all three application priority classes equals $R_{P1}+R_{P2}+R_{P3}$. FIG. 7C illustrates an example of a portion of a QOS manager 331 having three application priority classes P1, P2, and P3.

The BW logic module 360 processes the QOS COLLECTION REQUEST 3301 received by the BW manager module system 320. In various embodiments, multiple communications may be sent between the BW managers (e.g., 321-329) associated with a HBT before the BW manager module 320 sends a BW COLLECTION RESPONSE 3302 in response to the QOS COLLECTION REQUEST 3301.

In various examples, the BW logic module 360 is responsible for controlling the bandwidth utilization of the collection of individual flows associated with the universal traffic class by controlling the bandwidth utilization of the collection of individual flows associated with each of the traffic classes such that each of the traffic classes conforms to the bandwidth limits assigned to the node representing the traffic class. In various embodiments the bandwidth amount specified in a WM FLOW REQUEST 3401 represents the current utilization of an individual flow at a specific point in time, and the aggregate bandwidth request amount specified in the QOS COLLECTION REQUEST 3301 represents the current utilization of a collection of flows for a traffic class at a specific point in time, where the traffic class represents a node having assigned bandwidth limits.

The QOS COLLECTION REQUEST 3301 and the BW COLLECTION RESPONSE 3302 represent communications associated with a collection of flows associated with traffic classes (or traffic subclasses of the universal traffic class). The BW logic module 360 determines the amount of bandwidth to allocate in the BW COLLECTION RESPONSE 3302 and sends the BW COLLECTION RESPONSE 3302 to the QOS manager module 330. The amount of bandwidth allocated by the BW manager module 320 to the QOS manager module 330 is referred to as the ALLOCATED BANDWIDTH (B). The BW COLLECTION RESPONSE 3302 specifying the ALLOCATED BANDWIDTH (B) received by the QOS manager module 330 is processed by the QOS logic module 361 based on application priority information. In various embodiments, the user configures or assigns the application priorities, for example, high priority, medium priority or low priority. Generally, the flows associated with the higher priority applications are allocated a larger share of the ALLOCATED BANDWIDTH (B). The QOS logic module 361 determines the allocation for the application priority shares and the flow shares. In various embodiments, the portion of the ALLOCATED BANDWIDTH (B) assigned to each of the application priority classes may be referred to as the percentage share of the ALLOCATED BANDWIDTH (B). The allocation of percentage shares will be discussed further with FIG. 7C.

In various embodiments, the percentage share of the allocated bandwidth limit for each priority application class (also referred to as the application priority share) is a dynamic value that may be modified as new data packets are received by the BW management system 125. In various embodiments, the QOS logic module 361 is responsible for allocating flow shares to the individual flows of the application priority shares. In some embodiments, the QOS FLOW RESPONSE 3402 specifies a flow share having a bandwidth amount of QOS ALLOCATE. The various factors in determining the amount of bandwidth to allocate to each flow share is discussed further in conjunction with FIG. 3E.

The QOS manager module 330 provides a QOS FLOW RESPONSE 3402 to the WM module 340 for the flows from the collection of flows associated with the traffic class. The QOS FLOW RESPONSES 3042 specify the bandwidth allocated to the flows in a collection of flows associated with a traffic class. The allocated bandwidth for the flow shares may be referred to as QOS ALLOCATE, as shown in FIG. 3B.

The QOS FLOW RESPONSE 3402 is received by the WM module 340. In example embodiments, for TCP flows, the flow logic module 362 determines the window size $W_A$, on a per flow basis, advertised to a sending host (e.g., TCP sending host) to control the rate at which packets are sent to the receiving host (and accepted by the BW management system 125) on behalf of the receiving host. As shown in FIG. 3B, the QOS FLOW RESPONSE 3402, represents a bandwidth response per flow indicating a bandwidth value referred to as QOS ALLOCATE. The QOS ALLOCATE amount may be equal to, greater than, or less than the WM FLOW REQUEST 3401 amount.

The bandwidth amount indicated in a WM FLOW REQUEST 3401 may be represented by the equation $W_{MAX}/RTT_2$. As discussed above the QOS ALLOCATE is computed in response to the bandwidth amount ($W_{MAX}/RTT_2$) indicated in the WM FLOW REQUEST 3401. The QOS ALLOCATE (representing the bandwidth amount indicated in the QOS FLOW RESPONSE 3402) is used to calculate the advertised window size $W_A$. In various embodiments, the advertised window size $W_A$ is equal to QOS ALLOCATE*$RTT_1$. The flow of data between two hosts, and the calculations of the WM FLOW REQUEST 3401 $W_{MAX}/RTT_2$ and the window size $W_A$ is discussed in further detail below in conjunction with FIGS. 10A-10F.

In various embodiments, the communications between the modules 320, 330 and 340 are between the managers which are associated. For example, in one embodiment each leaf node (representing a collection of flows for a traffic class at the lowest level in a HBT) is associated with a BW manager. Each of the BW managers associated with a leaf node is also associated with a QOS manager and multiple WMs. Each of the WM managers is associated with an individual flow from the collection of flows associated with a traffic class.

Figure 7A:
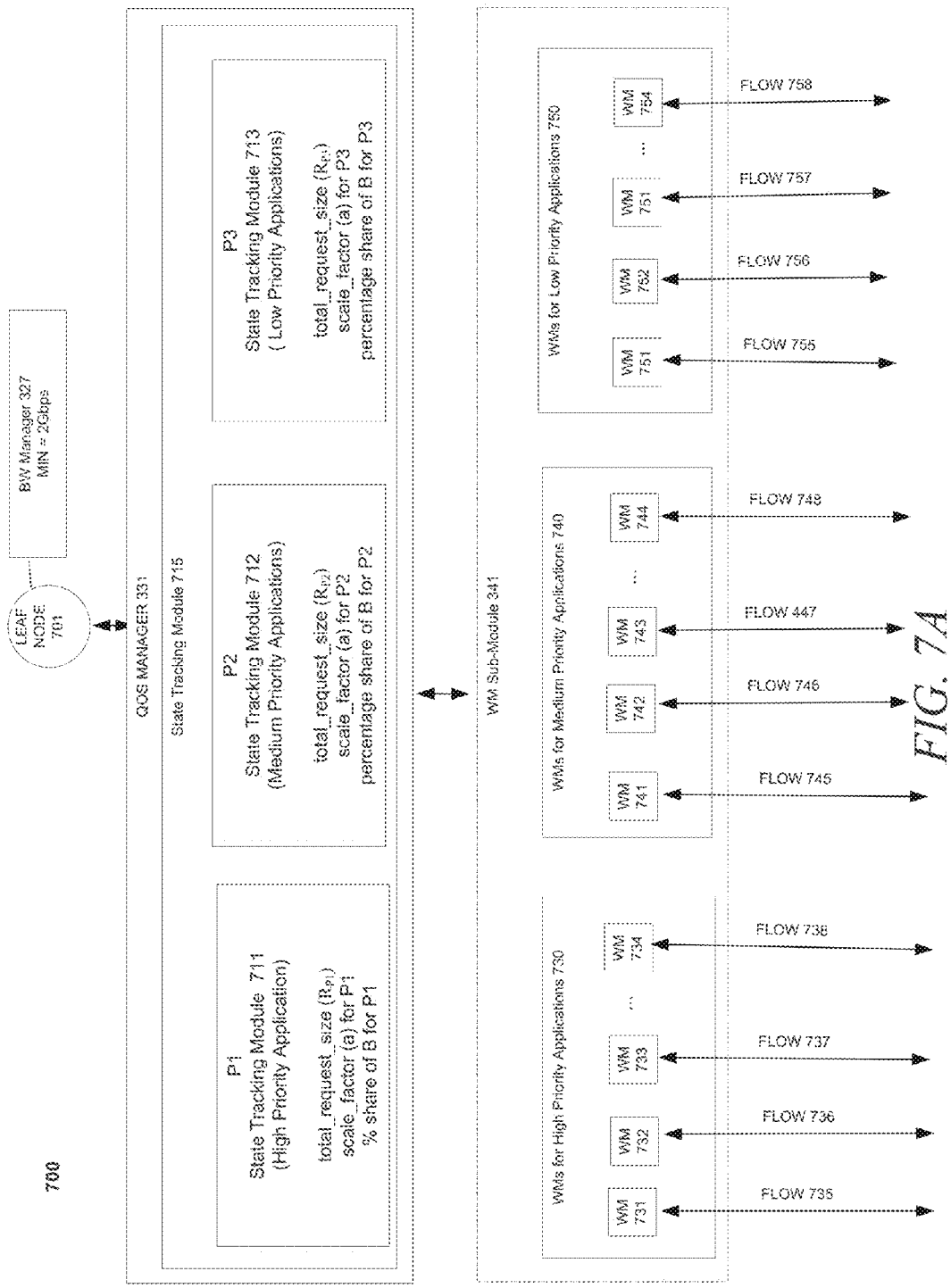
FIG. 7A illustrates a portion of a BW management system associated with a leaf node, according to an example embodiment.

For example, referring to FIG. 7A, a leaf node 701 is associated with a BW manager 327 and a collection of flows 735-738, 745-748 and 755-758 for a traffic class. The QOS manager 331 is associated with the BW manager 327 and the collection of flows 735-738, 745-748 and 755-758 for the traffic class. The WMs 731-734, WMs 741-744, and WMs 751-754 are each associated with an individual flow from the collection of flows 735-738, 745-748 and 755-758 for the traffic class.

For various embodiments, the BW management system 125 accepts, on behalf of a receiving host, data packets for a first individual flow at a flow rate sent by a sending host. The BW management system 125 is configured to manage bandwidth by traffic classes representing collections of flows associated with nodes in a hierarchical bandwidth tree (HBT). The first individual flow is included within the collection of individual flows associated with one or more of the traffic classes. In further embodiments, the BW management system 125, controls the rate at which the sending host is transmitting the data packets for the first individual flow using a sliding window protocol by managing the bandwidth utilization of the nodes to conform to bandwidth limits assigned to the nodes. The BW management system 125 receives data packets for the first individual flow at an adjusted flow rate based on the sliding window protocol.

In other embodiments, The method of claim 1, wherein controlling by the BW management system 125 controls the rate at which the sending host is transmitting the data packets for the first individual flow using a sliding window protocol by managing the bandwidth allocation associated with the traffic classes based on application priority classifications assigned to the individual flows in the collection of individual flows associated with the traffic classes.

In some embodiments, the traffic classes include a plurality of traffic classes representing collections of individual flows associated with a plurality of nodes from the nodes in the HBT and a universal traffic class represents a root node from the nodes in the HBT. In further embodiments, the universal traffic class represents the root node having a collection of flows associated with a server machine. The universal traffic class is divided into the plurality of traffic classes represented by the plurality of nodes. The plurality of nodes representing subsets of the collection of individual flows associated with the universal traffic class.

In some embodiments, the receiving host represents a transmission control protocol (TCP) receiver and the sending host represents a TCP sender.

In example embodiments, the BW management system 125 controls the rate at which the sending host is transmitting the data packets for the first individual flow using the sliding window protocol by computing, by the BW management system, a window size to be advertised to the sending host, the advertised window size is based on a bandwidth response to a bandwidth request for the first individual flow.

In yet further embodiments, the BW management system 125 computes the a window size to be advertised to the sending host by computing the bandwidth request for the first individual flow based on an estimated rate at which the receiving host is receiving the accepted data packets from the BW management system for the first individual flow.

In some embodiments, the estimated rate at which the receiving host is receiving the accepted data packets is based on the minimum of the congestion window which the BW management system 125 is using to send the accepted data packets to the receiving host and the window advertised by the receiving host, and a round trip time between the BW management system 125 and the receiving host for the first individual flow.

In other embodiments, the BW management system 125 transmits an acknowledgment data packet to the sending host where the acknowledgement data packet includes the computed window size; and receives data packets for the first individual flow at an adjusted flow rate based on the computed window size.

In various example embodiments, the BW management system 125 includes a window manager (WM) module 320, a quality of service (QOS) manager module 330, and a bandwidth (BW) manager module 340. The BW management system 125 controls the rate at which the sending host is transmitting the data packets for the first individual flow using the sliding window protocol further by having the WM module 340 generate bandwidth requests indicating bandwidth amounts for the individual flows in the collection of individual flows associated with the traffic class. The bandwidth amount is based on an estimated rate at which the receiving host is receiving the accepted data packets from the BW management system 125 for one of the individual flows. The QOS manager module 330 sends the bandwidth requests indicating the bandwidth amounts.

In another example embodiment, the QOS manager module 330 receives the bandwidth requests indicating the bandwidth amounts; aggregates the bandwidth amounts for the individual flows in the collection of individual flows associated with the traffic class to create an aggregated bandwidth amount; and sends, to the BW manager module 320, a bandwidth request indicating the aggregated bandwidth amount.

In a further example embodiment, the BW manager module 320 receives the bandwidth request indicating the aggregate bandwidth amount; determines available bandwidth for the collection of individual flows associated with the traffic class based on the bandwidth utilization of the collection of individual flows associated with the traffic class and the bandwidth limits assigned to the root node and the plurality of nodes in the HBT; and allocates bandwidth to the collection of individual flows associated with the traffic class based on the available bandwidth for the collection of individual flows associated with the traffic class. The BW manager module 320 sends to the QOS manager module, a bandwidth response indicating the bandwidth allocated.

In yet a further example embodiment, the QOS manager module 330 receives the bandwidth response indicating the bandwidth allocated; allocates percentage shares of the bandwidth allocated to the collection of the individual flows associated with the traffic class based on application priority classifications associated with the individual flows from the collection of individual flows associated with the traffic class; and allocates flow shares from the allocated percentage shares to the individual flows from the collection of individual flows associated with the traffic class. The WM module sends bandwidth responses indicating the allocated flow shares.

In another example embodiment, the QOS manager module 320 allocates the flow shares from the allocated percentage shares to the individual flows from the collection of individual flows associated with the traffic class by determining a mode of operation of the individual flows in the collection of individual flows associated with the traffic class; and allocating the flow shares based on the mode of operation.

In other example embodiments, the WM module 340 receives the bandwidth responses indicating the allocated flow shares; and generates, for the first individual flow, the window size to be advertised to the sending host based on the allocated flow share of the first individual flow.

In some embodiments, the WM manager 340 generates for the first individual flow, the window size to be advertised to the sending host based on the allocated flow share of the first individual flow by generating, for the first individual flow, the widow sized based on the bandwidth response indicating the allocated flow share for the first individual flow and a round trip time between the sending host and the BW management system for the first individual flow.

In various embodiments, at least one of the sending host and the receiving host represents a virtualized resource associated with the server machine. In other embodiments, at least one of the sending host and the receiving host represents docker instances.

In various example embodiments, the BW management system 125 accepts on behalf of a receiving host, data packets for a first individual flow at a flow rate sent by a sending host, the bandwidth management system configured to manage bandwidth by traffic classes representing collections of flows associated with nodes in a hierarchical bandwidth tree (HBT). The first individual flow is included within the collection of individual flows associated with one or more of the traffic classes. The BW management system 125 controls the rate at which the sending host is transmitting the data packets for the first individual flow using a sliding window protocol by managing bandwidth allocation of the individual flows associated with traffic classes based on application priority classifications assigned to the individual flows in the collection of individual flows associated with the traffic classes and receives the data packets for the first individual flow at an adjusted flow rate based on the sliding window protocol. In yet another embodiment, the BW management system 125, controls the rate at which the sending host is transmitting the data packets for the first individual flow using the sliding window protocol by controlling the rate at which the sending host is transmitting the data packets for the first individual flow by managing the bandwidth utilization of the nodes to conform to bandwidth limits assigned to the nodes.

Figure 3C:
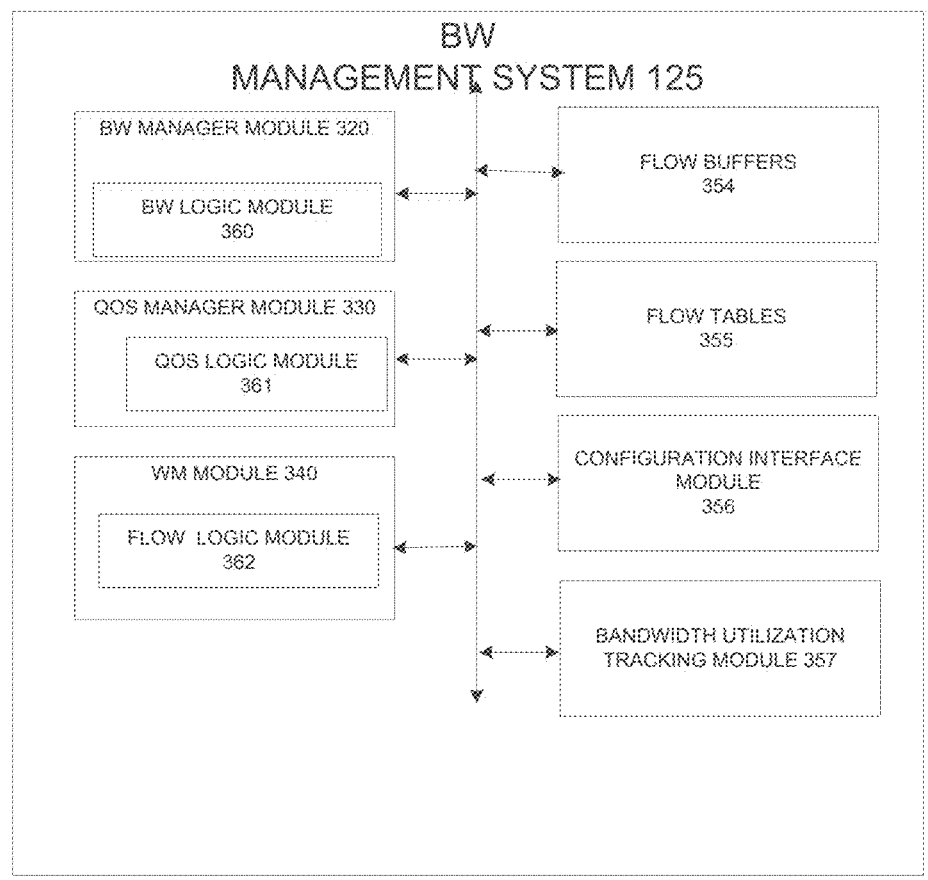
FIG. 3C illustrates a block diagram of a BW management system, according to example embodiments.
Figure 3D:
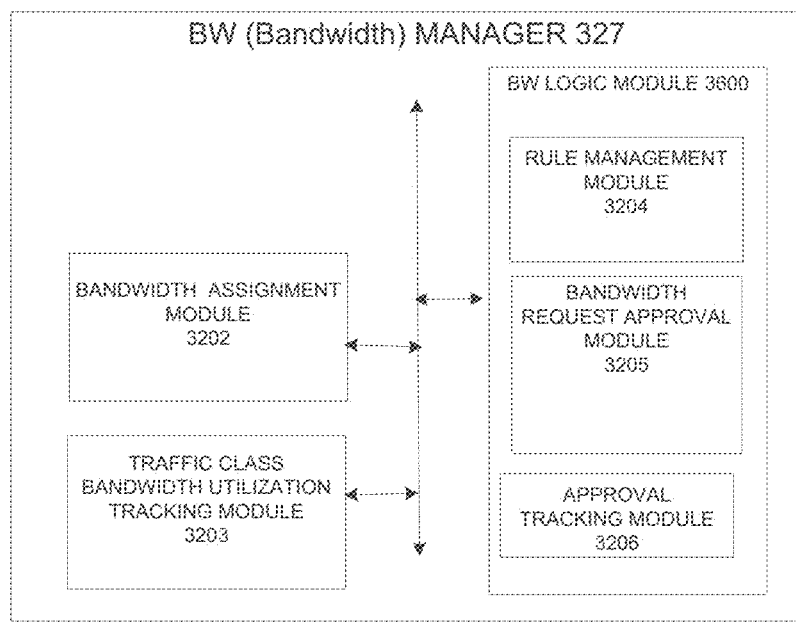
FIG. 3D illustrates a block diagram of a BW manager, according to example embodiments.
Figure 3E:
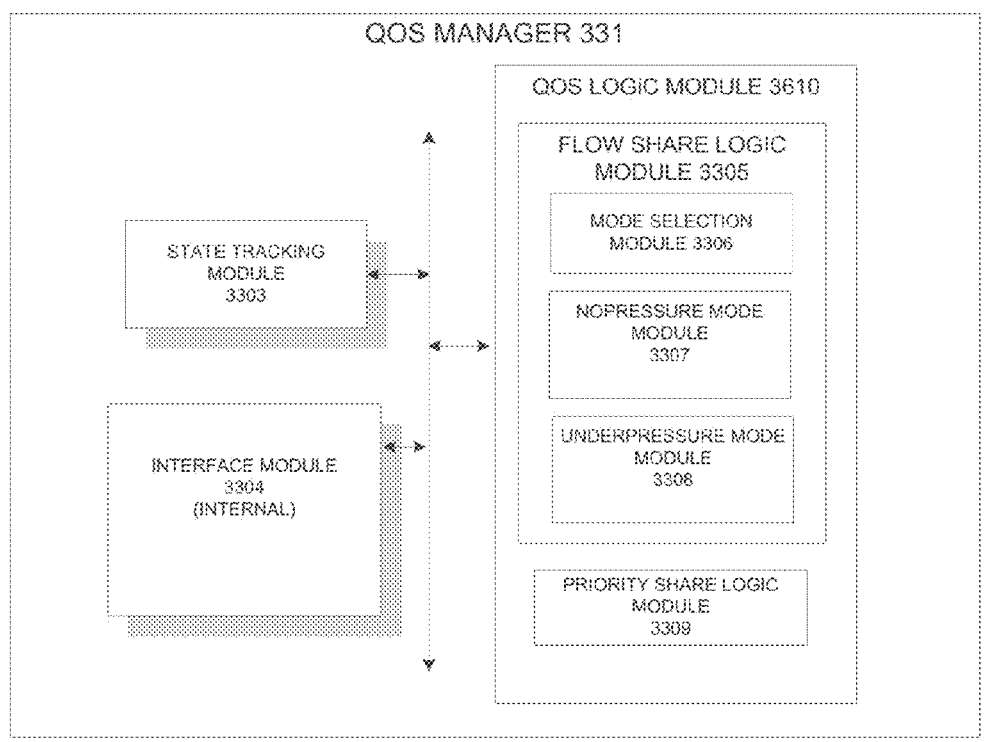
FIG. 3E illustrates a block diagram of a quality of service (QOS) manager, according to example embodiments.
Figure 3F:
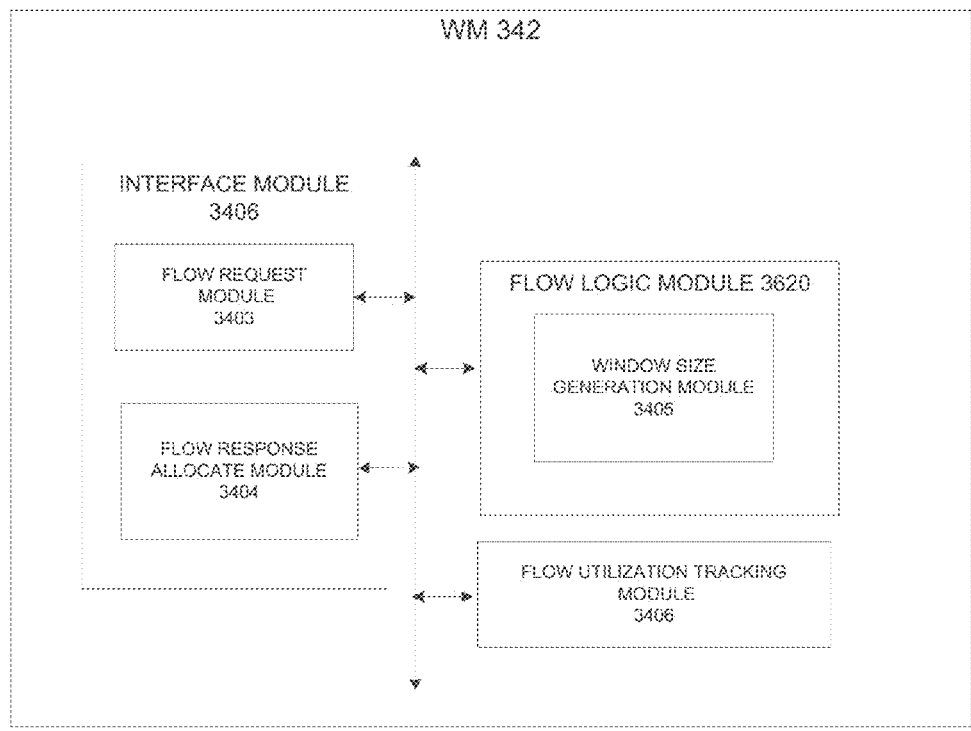
FIG. 3F illustrates a block diagram of a window manager (WM), according to example embodiments.

FIG. 3C illustrates another embodiment of the BW management system 125. The BW management system 125, shown in FIG. 3C, includes the BW manager module 320, the QOS manager module 330, the WM module 340, flow buffers 354, flow tables 355, a configuration interface module 356, and a bandwidth utilization tracking module 357. The BW management system 125 may be hosted on dedicated or shared server machines that are communicatively coupled to enable communications between server machines. The server machines may also be referred to as one or more physical servers. The components themselves are communicatively coupled (e.g., via appropriate interfaces) to each other and to various data sources, so as to allow information to be passed between the components or so as to allow the components to share and access common data. Furthermore, the components may access one or more database(s) via the database server(s) (not shown).

It will be appreciated that each module of the modules shown in FIG. 3C may be implemented as a single module, combined into other modules, or further subdivided into multiple modules. For example, the BW manager module 320 may include BW managers 321-329, the QOS manager module 330 may include the QOS managers 331-333, and the WM module 340 may include the WMs 342-343, the WMs 345-346, and the WMs 348-349 in an example embodiment. It will further be appreciated that one or more of the modules or functionality of the BW management system 125 may be implemented in the vTCP module 109. In other embodiments, the BW management system 125 may be configured to manage the bandwidth associated with one or more physical servers or server machines. Other modules not pertinent to example embodiments may also be included, but are not shown.

For various embodiments, the BW manager module 320 includes BW logic module 360, the QOS manager module 330 includes QOS logic module 361, and the WM module 340 includes flow logic module 362. These logic modules are typically event-driven in nature. The logic for the BW management system 125 may include one or more of the following modules: the BW logic module 360, the QOS logic module 361, and the flow logic module 362, in example embodiments. Other logic may be included within the BW management system 125 that is not shown in FIG. 3B in some embodiments.

During configuration of the BW management system 125, one function of the BW logic module 360 is to assign MIN values, MAX values, or MIN and MAX values to the various nodes within a HBT. If the MIN and MAX values are configured by a user, then those values are assigned to the nodes. If the MIN and MAX values are not configured, then the BW manager module 320 assigns a 0 to the MIN values and assigns the MAX value inherited from the parent node. In an example embodiment shown in FIG. 3D, the bandwidth logic module 3600 in combination with the bandwidth assignment module 3202 may be used to assign the bandwidth limits of MIN values and MAX values to the various nodes in a HBT. Referring back to FIG. 3C, there are a number of rules that the BW logic module 360 implements to help manage the bandwidth allocated to the nodes in the HBT.

The BW logic module 360 may implement various other rules during configuration of the BW management system 125, for example, a first rule may be described as: the sum of the assigned MIN values of the child nodes in a sub-tree is equal to or less than the assigned MIN values of the parent node in the sub-tree; and a second rule may be described as: the assigned MAX value of a child node in a sub-tree is equal to or less than the assigned MAX value of the parent node in the sub-tree. These rules will be discussed in further detail with reference to FIG. 3D.

Once the BW management system 125 has been configured, the MIN value assigned to a node represents the reserved bandwidth such that the node is guaranteed the reserved bandwidth. Bandwidth beyond the MIN value is not guaranteed at a node. While the BW manager module 320 is actively managing the bandwidth of a collection of flows associated with a traffic class, the BW manager module 320 may make its best effort to provide additional bandwidth up to the MAX value, but it is not guaranteed by the BW manager module 320. For example, one or more nodes may be requesting the same available bandwidth. The flow of traffic (for a particular server) may be improved (or performance related to the flow of traffic improved) if available bandwidth within a server can be reallocated to a node that requests additional bandwidth (i.e., bandwidth above its MIN value). In some embodiments, the BW logic module 360 may determine the bandwidth available to allocate to the nodes.

Below is an example of a rule implemented by the BW logic module 360 to allocate bandwidth to requesting nodes while the BW logic module 360 is actively managing a collection of flows associated with one or more nodes. This rule may be referred to as the current utilization rule. In various embodiments, the current utilization rule states that the sum of the current bandwidth utilization at the child nodes in a sub-tree cannot exceed the MAX value of the parent node in the sub-tree. In various embodiments, the BW logic module 360 may be used to implement the current utilization rule.

In other embodiments, the BW logic module 360 may be used to determine the available bandwidth at a node (referred to as a parent node) associated with a traffic class of flows. For example, the parent node has an associated BW manager which receives a bandwidth request (also referred to as an aggregate bandwidth request B) from a requesting node (which is child node of the parent node) that is below the assigned MIN value at that parent node. The BW manager associated with the parent node knows how much of the MIN value it has allocated to its child nodes and can determine that there is available bandwidth. On the other hand, if the bandwidth request from the requesting node to the parent node is above the MIN value assigned to the parent node, the BW manager associated with the parent node makes a request to its parent node for available bandwidth from its parent node. The request up the parent nodes in HBT continues up as long as the parent nodes have exceeded its assigned MIN values and another parent node is available to receive the bandwidth request.

One of the functions of the QOS logic module 361 is to define a threshold (in terms of the fraction of the ALLOCATED BANDWIDTH (B)) in various embodiments. The QOS manager module 330 receives the ALLOCATED BANDWIDTH B from the BW manager module 320 in the BW COLLECTION RESPONSE 3302. The user may provide configuration information which may be used by the QOS logic module 361 to compute the threshold value in some embodiments. The configuration information may include the percentage assigned to the various application priority classes. During operation, the QOS logic module 361 determines which mode (NoPressure or UnderPressure mode) should be active based on the threshold value. The threshold determines which mode of operation may be used to allocate flow shares. Based on the mode of operation, the QOS logic module 361 applies different rules to the BANDWIDTH ALLOCATE B specified in the BW COLLECTION RESPONSE 3302 during the allocation of flow shares by the QOS logic module 361. Another function of the QOS logic module 361 is to allocate bandwidth for priority application shares and individual flow shares based on the application priority class or classification. FIGS. 7C-D illustrate examples of application priority shares and flow shares being allocated by the QOS manager module 330. The QOS logic module 361 receives a BW COLLECTION RESPONSE 3302 from the BW manager module 320. As described above with FIG. 3B, the BW COLLECTION RESPONSE 3302 provides the bandwidth amount allocated (also referred to as ALLOCATED BANDWIDTH (B)) by the BW manager module 320 to the QOS manager module 330 at a particular point in time for the collection of flows associated with the BW manager module 320 and the QOS manager module 330. The bandwidth amount allocated by the BW manager module 320, is a calculated amount that varies over time based on the QOS COLLECTION REQUEST 3301 received by the BW manager module 320 from the QOS manager module 330.

As discussed above, the QOS logic module 361 determines the allocation for the priority application shares and the flow shares based on the priority application classification of the flows (for a traffic class). In example embodiments, the BW COLLECTION RESPONSE 3302 assigns an amount referred to as the ALLOCATED BANDWIDTH (B) to the QOS manager module 330, and the QOS logic module 361 divides the ALLOCATED BANDWIDTH (B) among the various application priority classes by assigning application priority % shares (to each of the application priority classes). The portion (or the % share assigned to an application priority class) of the ALLOCATED BANDWIDTH (B) assigned to each of the application priority classes may be referred to as the application priority share. In various embodiments, the % share of B for each priority application share is a dynamic value that may be modified as new data packets (associated with the collection of flows for the traffic class or subclass) are received by the BW management system 125. Once the application priority shares have been allocated, the QOS logic module 361 then determines the amount of bandwidth to be allocated to each of the flow shares associated with the application priority shares. As mentioned above, the allocation of flow shares is based on the mode of operation of an individual flow, for example NoPressure mode or UnderPressure mode. Different rules or formulas may be used to compute the flow shares based on the mode of operation associated with the individual flows.

The various factors used in determining the amount of bandwidth to allocate to each flow share is discussed with FIGS. 8A-B and 9A-B. The QOS manager module 330 provides a QOS FLOW RESPONSE 3402 to one or more flows with the allocated flow shares. The allocated bandwidth for the flow shares may be referred to as QOS ALLOCATE, as shown in FIG. 3B. The QOS logic module 361 for a QOS manager 330 will be discussed further with reference to FIG. 3E and FIGS. 7A-7D, FIGS. 8A-8B, and FIGS. 9A-9B.

One of the primary functions of the flow logic module 362 is to determine the window size that the BW management system 125 desires to advertise to a TCP sender. In various embodiments, the flow logic module 362 computes the WM FLOW REQUEST 3401 and the window size to be advertised to the sending host $W_A$ for the individual flows. The amount of bandwidth for individual flows requested by the WM FLOW REQUEST 3401 is represented by the equation $W_{MAX}/RTT_2$. Once $W_{MAX}/RTT_2$ is computed for the individual flows by the flow logic module 362, the BW management system 125 computes the QOS ALLOCATE for the individual flows. The QOS ALLOCATE may be used by the flow logic module 362 to compute the advertised window $W_A$. FIGS. 10B-F illustrate diagrams used by the WM module 340 to compute the WM FLOW REQUEST 3401 (shown in FIG. 3B).

The BW manager module 320, the QOS manager module 330 and WM module 340 are in communication with one another to actively manage the bandwidth for a collection of flows. The collection of flows may represent one or more traffic classes or sub-classes of traffic (also referred to as traffic subclasses). The example described in FIG. 3B may illustrate various communications between modules 320, 330 and 340 to manage a traffic sub-class representing a collection of flows associated with a leaf node in a HBT. The communications include WM FLOW REQUEST 3401, QOS COLLECTION REQUEST 3301, BW COLLECTION RESPONSE 3302 and QOS FLOW RESPONSE 3402 in example embodiments.

In example embodiments, these communications related to bandwidth requests (for individual flows and collections of flows) represent the requested bandwidth or allocated bandwidth at a particular point in time. In one embodiment, the bandwidth requests change as each of the flows in the collection of flows associated with traffic sub-class changes. In some embodiments, the responses (based on the requests) are generated almost instantaneously. Once the communications are received by the modules 320, 330 and 340, their respective logic modules 360, 361, and 362 performs processes the requests and generates responses. In various example embodiments, the flow logic module 362 associated with the WM module 340 computes the WM FLOW REQUESTS 3401. The computations performed by the QOS logic module 361 and the BW logic module 360 are used to generate the QOS FLOW RESPONSES 3402, in response to the WM FLOW REQUESTS 3401. The flow logic module 362 receives the QOS FLOW REPONSES 3402, which may be a value equal to, less than, or greater than the WM FLOW REQUESTS 3401. The QOS ALLOCATE, which represents the bandwidth allocated to the individual flows from the QOS RESPONSES 3402 is used by the flow logic module 362 to compute the window size $W_A$ advertised to the sending host.

Figure 6E:
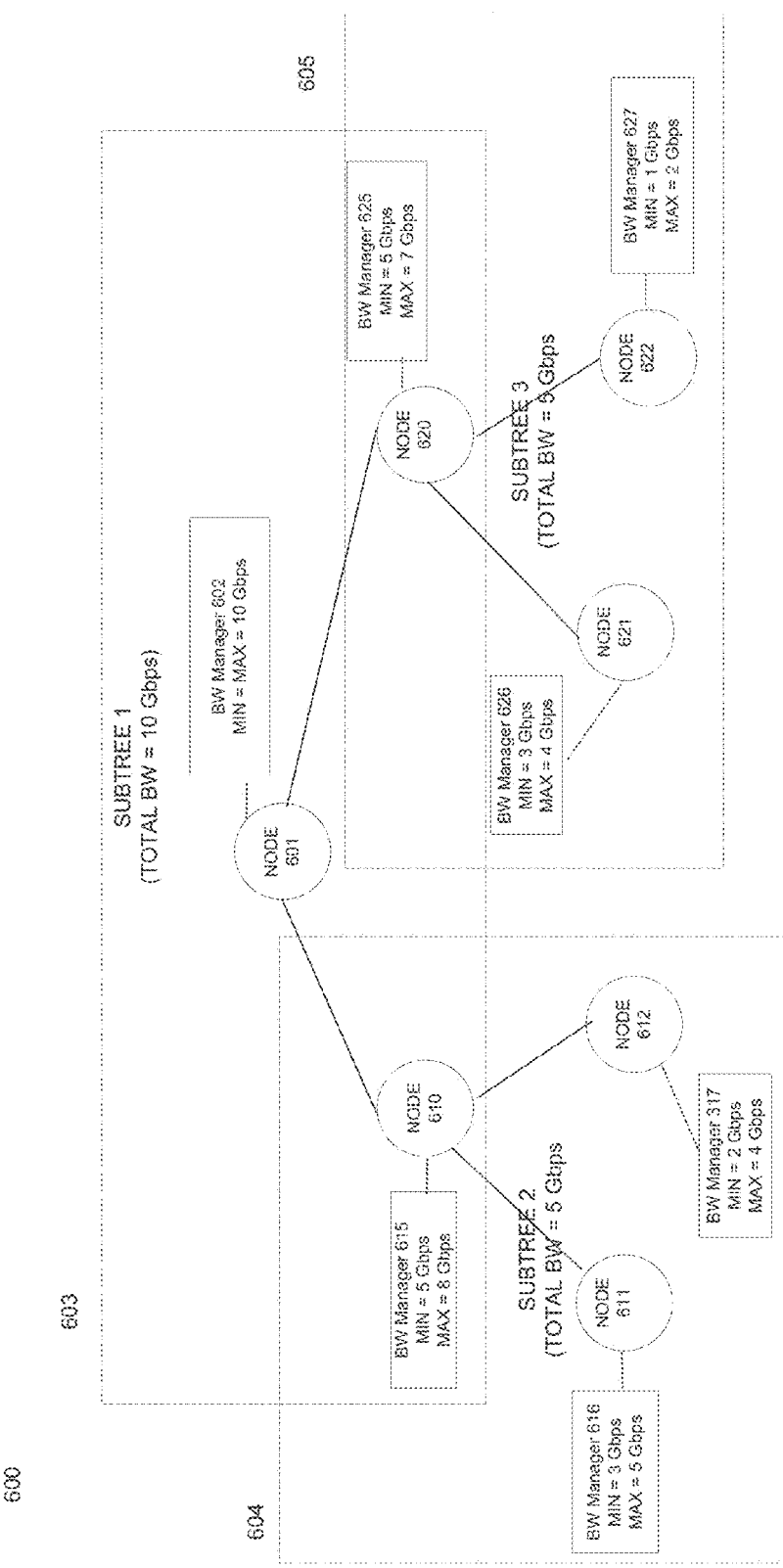
FIG. 6E illustrates the HBT shown in FIG. 6A having bandwidth shares allocated by a BW manager module, according to an example embodiment.

More specifically, as described in FIG. 3B, the WM FLOW REQUEST 3401 sends a request to the QOS manager module 330 for a bandwidth amount of $W_{MAX}/RTT_2$ for the individual flows associated with a traffic subclass. This bandwidth requested for individual flows associated with the traffic subclass may be accelerated or decelerated by the QOS logic module 361, and then aggregated in the QOS COLLECTION REQUEST 3301 sent to the BW manager module 320. The QOS COLLECTION REQUEST 3301 represents a total bandwidth request for a collection of flows for a traffic subclass. The BW logic module 360 computes a BW COLLECTION RESPONSE 3302 based on MIN and MAX values assigned to one or more nodes in the BW management system 125. As described above, the BW manager associated with a collection of flows from traffic subclass requests permission from its parent node if the MIN value is being exceeded or anticipated to be exceeded. The BW managers evaluate the aggregate bandwidth request (for the collection of flows associated with a traffic subclass) from the QOS COLLECTION REQUEST 3301 to determine whether or not the relevant BW manager is to request permission from its parent node. Similar criteria is then used to determine whether its parent node is to request permission from its parent node and so forth. The various BW managers communicate with each other to allocate bandwidth to requesting nodes while the BW manager module 320 is actively managing bandwidth of a collection of flows associated with one or more nodes. As described above, one rule may be the sum of the current bandwidth utilization at the child nodes in a sub-tree cannot exceed the MAX value of the parent node in the sub-tree. Some examples of sub-trees are shown in FIGS. 6C and 6G.

In example embodiments, the QOS COLLECTION REQUEST 3301 (which represents the aggregate bandwidth requested for a collection of flows for a traffic subclass) may also represent the sum of the current bandwidth utilization of a child node. The BW managers, alone or in communication with other BW managers, may determine whether or not there is available bandwidth associated with one 3301 or more parent nodes. The BW logic module 360 then computes the BW COLLECTION RESPONSE 3302 based on the available bandwidth of one or more parent nodes of the requesting node, which is a child node associated with a collection of flows for a traffic subclass.

The BW COLLECTION RESPONSE 3302 is received by the QOS Manager module 330 and represents an amount referred to as ALLOCATED BANDWIDTH (B). The ALLOCATED BANDWIDTH (B) represents the bandwidth assigned to the collection of flows for a traffic subclass by the BW manager module 320. The QOS logic module 361 then allocates shares of the ALLOCATED BANDWIDTH (B) to the various application priority classes for the collection of flows in the traffic subclass. The allocated shares may be referred to as percentage share for a priority application class for an application priority share. The QOS logic module 361 then allocates shares from the percentage share for a priority application class (associated with an application priority class) to the individual flows in the collection of flows in the traffic subclass.

In further embodiments, the QOS manager module 330 sends QOS FLOW RESPONSES 3402 to the WM module 340 for the individual flows within the collection of flows for a traffic subclass. The amount of allocated bandwidth to the individual flows in a QOS FLOW RESPONSE 3402 is referred to as QOS ALLOCATE. In various embodiments, the advertised window size $W_A$ is equal to QOS ALLOCATE*$RTT_1$. The value $RTT_1$ represents the round trip time between a sending host and the BW management system 125.

As discussed above, the BW COLLECTION RESPONSE 3302 is a dynamic value that changes over time as the WM FLOW REQUESTS 3401 changes. In example embodiments, the QOS FLOW RESPONSE 3402 is also a dynamic value that changes over time. In various embodiments, the QOS FLOW RESPONSE is based on the bandwidth $W_{MAX}/RTT_2$ requested in the WM FLOW REQUEST 3401, which may be modified by the QOS manager module 330, or the BW manager module 320, or both the QOS manager module 330 and the BW manager module 320. In some embodiments, the QOS ALLOCATE may be equal to, less than or greater than the bandwidth $W_{MAX}/RTT_2$ requested in the WM FLOW REQUEST 3401. In various embodiments, the BW management system 125 advertises the desired window size $W_A$ to the TCP sender such that TCP packets sent from the TCP sender and TCP receiver are sent at a rate desired by the BW management system 125. The rate desired by the BW management system may represent a rate that is likely not to drop TCP packets. The flow logic module 362 for a WM will be discussed further with reference to FIG. 3F.

The flow buffers 354 may include a receive-side buffer (not shown) and a transmit-side buffer (not shown). In some embodiments, the receive-side buffers may hold all packets for each and every TCP connection that needs to be accelerated by the vTCP module 109 or managed by the BW management system 125. The receive-side buffer holds packets along the receive path (from the network 105 to a guest OS). In other embodiments, the transmit-side buffers apply to packets that are sent from a guest OS towards the network 105. The guest OS may be the guest OS 115 or 116 shown in FIG. 1A.

The flow tables 355 may represent one or more tables that store the TCP connection information and state for each and every connection. In various embodiments, the TCP connection information and state for the TCP connections may be defined by the data in one or more of the TCP header fields. In further embodiments, the flow tables 355 may store additional TCP connection and state information which are not included in the data from the TCP header fields, such as location information for the copy of TCP data packets stored in the flow buffers 354. In various embodiments, the vTCP module 109 receives and stores a copy of the TCP packet data (in buffers 354 and/or flow tables 355), and further allows changes to be made to the copy of the TCP header information stored in the flow tables 355, without altering the actual TCP packet data, which will be received by a TCP receiver.

The vTCP module 109, in various embodiments, may override the TCP stack configuration information, such as the window size, of the TCP sender, while TCP data packets are transmitted between the vTCP module 109 and the TCP receiver. One or more TCP header values may be overridden by modifying, adding, or deleting the TCP header values of the data packets transmitted between a portion of the data path between the vTCP module 109 and a TCP sender. In some embodiments, the one or more header values may be overridden for TCP data packets on a per flow basis or a per VM basis. This TCP header information (including window size) may be stored in the flow tables 355.

The configuration interface module 356 is configured to provide an interface to a user to configure the various configurable parameters used by the BW management system 125. The configuration interface module 356 receives configured parameters or settings from a user. The configurable TCP parameters or settings can be configured by a user on a per-virtual machine, per-flow basis, or on a per-application basis, where a flow can be any combination (including wild cards) of fields from the packet, including source IP address, destination IP address, ports and other protocol fields. In addition, the configured values of these knobs can be changed one or more times during the lifetime of a TCP connection, for example, during the beginning of the connection, or for the first megabyte (MB) of data transfer, or any such arbitrary period within the connection's lifetime.

The configuration interface module 356 receives the configured parameters and then stores these parameters or makes them accessible to the relevant logic within the BW management system 125 for further processing.

One example of configurable parameters includes the MIN value and the MAX value for each of the nodes in a HBT. In various embodiments, the MIN value and the MAX values are configured parameters which are used by the BW logic module 360 for assigning MIN and MAX values to the various nodes.

Another example of configurable parameters includes the assignment of priority class to applications running on a server machine. The application priority class parameters are used by the QOS manager module 330 to allocate shares of bandwidth among various flows associated with leaf nodes based on the application priority class of flows. For example, a flow from an HTTP application may be prioritized higher than a flow from an FTP application. As a result, the flows associated with the HTTP application gets a larger share of the bandwidth of the leaf node than the flows associated with the FTP application. Some other configurable parameters used by the QOS manager module 330 include the scale factor (a), which dictates that if there is some spare capacity, how fast to accelerate or decelerate the flow belonging to a given priority class. The QOS manager module 330 can also be configured with the percentage of the bandwidth assigned to the application priority shares. This assigned bandwidth dictates the share of total bandwidth that should be allocated to flows of a given application priority class.

In various embodiments, the configuration interface module 356 may include tables for storing configured parameters. In alternative embodiments, the configured parameters may be stored in the flow tables 355.

FIGS. 10A-10F provide examples of flows between two hosts. In various examples, the vTCP module 109 or the BW management system 125 accepts packets from the sending host on behalf of the receiving host. As shown in FIGS. 2A-2E, and with reference to FIG. 3C, the BW management system 125 (or 125a-125c) resides in various locations along the data path between the hosts. When a data packet is sent from a sending host to a receiving host, the data packet is accepted by the BW management system 125 and stored, at least temporarily, in the flow buffers 354 before the BW management system 125 sends the data packet to the receiving host. The flow tables 355 are configured to store data packet information and other configuration information related to the data packets in the flow buffers 354. The configuration interface module 356 is configured to receive configuration information and settings from users.

In various embodiments, the bandwidth utilization tracking module 357 of FIG. 3C is configured to track the bandwidth utilization of a collection of flows. The bandwidth utilization tracking module 357 may include the traffic class bandwidth utilization tracking module 3203 (shown in FIG. 3D), or at least a portion of the state tracking module 3303 (shown in FIG. 3E), or a flow utilization tracking module 3406 (shown in FIG. 3F). The bandwidth utilization tracking module 357 tracks the bandwidth utilization of the collection of flows for a server. These tracking values may represent an estimated or actual value.

The bandwidth utilization may also be tracked at various levels, for example tracked per flow, per collections of flow based on application priorities, per collection of flows based on traffic sub-classes, or per collection of flows based on traffic classes. In example embodiments, the flow utilization tracking module 3406 resides within the WM 342 (shown in FIG. 3F) and tracks the current utilization of the individual flows. In various embodiments, the current bandwidth utilization is represented by $W_{MAX}/RTT_2$. The bandwidth request amount of $W_{MAX}/RTT_2$ may represent a bandwidth utilization value at a certain point in time. The current bandwidth utilization may refer to an estimated or actual bandwidth value. The current bandwidth utilization changes over time as the rate at which data packets are sent from a sending host changes in example embodiments. In other embodiments, the state tracking module 3303 resides within the QOS manager 331 (shown in FIG. 3E) and tracks the current utilization of a collection of flows by application priority classes. In some embodiments, the state tracking module 3303 tracks the current utilization before and after the QOS logic module 361 scales the individual flows and then aggregates the scaled values by application priority classes and then totals the application priority classes together into the QOS COLLECTION REQUEST 3301. The scaled values may represent scaling the WM FLOW REQUESTS 3401 by the scaling factor or adjusting based on the distribution type of proportional_share or equal_share.

In various embodiments, the BW manager module 320 tracks the current utilization of a collection of flows associated with a server at the various levels within a HBT at the node level Each of the nodes within the HBT represents a collection of flows for a traffic class or sub-class. The BW manager module 320 uses this bandwidth utilization tracking information to determine whether or not to reallocate bandwidth to a node requesting bandwidth.

In various embodiments, the bandwidth utilization tracking module 357 includes or has access to tracking tables for tracking current bandwidth utilization In various embodiments, the BW manager module 320 is configured to manage the bandwidth of a collection of flows associated with a server by traffic classes associated with virtual resources by assigning bandwidth limits to the traffic classes. The traffic classes are arranged in a HBT with the collection of flows representing a universal traffic class at the highest level. The root node in the HBT represents the universal traffic class. The collection of flows associated with the universal traffic class is subdivided into smaller collections representing traffic classes also referred to as leaf traffic subclasses. The leaf traffic subclasses represent the traffic classes at the lowest level of the HBT. Each of the leaf traffic subclasses are filtered by at least one traffic class parameter. The flows in a traffic class represent an end-to-end connection between two hosts.

In some embodiments, the QOS manager module 330 is configured to allocate application priority shares for the leaf traffic subclasses and flow shares for the application priority shares based on the assigned bandwidth limits to the traffic classes. The application priority shares represent bandwidth shares allocated to priority groups of flows based on application priority levels. The flow shares represent bandwidth shares allocated to individual flows for the priority groups of flows based on a selected mode of operation. FIGS. 7C-7D provide an example of allocated priority shares and allocated flow shares.

In example embodiments, a WM 342 (shown in FIG. 3A and further illustrated in FIG. 3F) is configured to manage bandwidth for the individual flows by adjusting a window size advertised to the first host. The advertised window size controls the rate at which the first host transmits data packets to the second host. The advertised window size is based on the allocated flow shares from the QOS manager module 330.

FIG. 3D illustrates a block diagram of a bandwidth manager, according to example embodiments. The BW manager 327 shown in FIG. 3D is associated with a node in a HBT. The BW manager 327 includes a bandwidth assignment module 3202, a traffic class bandwidth utilization tracking module 3203, a BW logic module 3600, and an approval tracking module 3206. The BW logic module 3600 includes one or more of the following modules: a rule management module 3204, a bandwidth request approval module 3205, and the approval tracking module 3206. In various embodiments, the BW logic module 3600 provides functionality to manage the bandwidth of the flows associated with the traffic class represented by a leaf node, also referred to as a traffic subclass. Although the BW manager 327 represents a leaf node, the BW manager of other nodes and root nodes may also include one or more of the modules or components shown in FIG. 3D.

In an example embodiment, a node creation module (not shown) is configured to create a plurality of nodes. Each of the nodes in a HBT represents one of the traffic classes in the HBT. The HBT includes at least one sub-tree having a parent node from the plurality of nodes, and at least one child node from the plurality of nodes. In further embodiments, the node creation module 3201 is configured to create a BW manager associated with each of the plurality of nodes.

In various embodiments, the BW logic module 3600 is configured to apply various rules based on the MIN values and the MAX values to control the bandwidth of the collection of flows associated with the traffic classes at the nodes.

In some embodiments, a bandwidth assignment module 3202 is configured to assign MIN values to the nodes in the HBT during configuration of the HBT. The MIN values represent bandwidth reservations assigned to the collection of flows associated with the traffic class at the nodes. In other embodiments, the bandwidth assignment module 3202 is configured to assign MAX values to the nodes, the MAX values representing a maximum capacity available to the collection of flows associated with the traffic class at the nodes. The assignment of the MIN and MAX values by the bandwidth assignment module 3202 may be used to implement an aggregate sum assigned MIN value rule and a configured MAX value rule.

In further embodiments, a subclass bandwidth utilization tracking module 3203 is configured to compare current utilization of the collection of flows associated with the traffic class at the nodes with the MIN values assigned to the nodes. The traffic class bandwidth utilization tracking module 3203 is also configured to identify when the current utilization of the collection of flows associated with the traffic class at the nodes is expected to exceed the MIN values assigned to the nodes. The traffic class bandwidth utilization tracking module 3203 may be used to implement a current utilization rule. In various embodiments, the traffic class bandwidth utilization tracking module 3203 and the bandwidth assignment module 3202, in combination with the rule management module 3204, may be used to implement the first, second and third rules described above.

In an example embodiment, the BW logic module 3600 includes a rule management module 3204 configured to receive, by a BW manager associated with a parent node in a first sub-tree, a first bandwidth request from a BW manager associated with a child node in the first sub-tree. The rule management module 3204 is further configured to determine, by the BW manager associated with the parent node in the first sub-tree, if the first bandwidth request from the child node in the first sub-tree does not increase an aggregate sum of MIN values of all child nodes in the first sub-tree to above a MIN value of the parent node in the first sub-tree. The BW logic module 3600 may also include a bandwidth request approval module 3205 configured to approve a bandwidth value, by the BW manager associated with the parent node in the first sub-tree, for the first bandwidth request from the child node in the first sub-tree. The bandwidth request approval module 3205 may also be configured to communicate the approved bandwidth value to the BW manager associated with the child node in the first sub-tree. The BW logic module 3600 may also include an approval tracking module 3206 configured to update allocated bandwidth by the parent node in the first sub-tree with the approved bandwidth value.

In another example embodiment, the BW logic module 3600 includes a rule management module 3204 configured to receive, by an BW manager associated with a parent node in a first sub-tree, a first bandwidth request (e.g., QOS COLLECTION REQUEST 3301) from a BW manager associated with a child node in the first sub-tree. The rule management module 3204 may also be configured to determine, by the BW manager associated with the parent node in the first sub-tree, if the first bandwidth request from the child node in the first sub-tree increases an aggregate sum of MIN values of all child nodes in the first sub-tree to above a MIN value of the parent node in the first sub-tree. The BW logic module 3600 may include a bandwidth request approval module 3205 configured to send a second bandwidth request to a parent node of the parent node in the first sub-tree. The parent node of the parent node in the first sub-tree represents a child node in a second sub-tree. The bandwidth request approval module 3205 may be configured to determine, by the BW manager associated with the parent node of the second sub-tree, if the second bandwidth request from the child node of the second sub-tree does not increase the aggregate sum of the MIN values of all child nodes in the second sub-tree above a MIN value of the parent node in the second sub-tree. The bandwidth request approval module 3205 may also be configured to approve a bandwidth value, by the BW manager associated with the parent node in the second sub-tree, for the second bandwidth request from the child node in the second sub-tree. The bandwidth request approval module 3205 may also be configured to communicate the approved bandwidth value to the BW manager associated with the child node in the second sub-tree and the child node in the first sub-tree. The BW logic module 3600 may also include an approval tracking module 3206 configured to update allocated bandwidth by the parent node in the second sub-tree with the approved bandwidth value of the parent node in the first sub-tree.

FIG. 3E illustrates a block diagram of a QOS manager 331, according to example embodiments. The QOS manager 331 includes a state tracking module 3303, an interface module 3304, and a QOS logic module 3610. In an example embodiment, the QOS logic module 3610 includes a flow share logic module 3305 and a priority share logic module 3309.

The state tracking module 3303 is configured to track the state of the application priority classes (e.g., P1, P2, and P3). For an example embodiment, the state tracking module 3303 tracks the states for each of the application priority classes (e.g., high priority applications, medium priority applications and low priority applications). In various embodiments, the state tracking module 3303 tracks the total_request_size $R_{PX}$, the scale_factor (a) and the percentage (%) share of B (allocated bandwidth to a collection of flows associated with a traffic class) for by priority application classes. For various embodiments, these three parameters are referred to as state tracking information or parameters. In some embodiments, the application priority classes are each associated with a priority level, for example, P1 representing high priority applications, P2 representing medium priority applications or P3 representing low priority applications. FIG. 7A illustrates a state tracking module 715, which may be implemented using the state tracking module 3303 in an example embodiment.

The state tracking module 3303 will be discussed in further detail below with the description of FIGS. 7A-7D, 8A-8B (NoPressure mode), and 9A-9B (UnderPressure mode). The interface module 3304 is described further with the description of FIGS. 8A-8B and FIGS. 9A-9B. The QOS logic module 3610, in combination with the state tracking module 3303, will be discussed in further detail below with FIGS. 8A-8B (NoPressure mode) and FIGS. 9A-9B (UnderPressure mode). FIG. 7C illustrates a portion of a HBT 703 which includes a priority share logic module 3309 for allocating bandwidth among priority application classes. FIG. 7D illustrates a portion of a HBT 704 which includes a flow share logic module 3305 for allocating bandwidth among flow shares in a priority application class. The flow shares are allocated based on a mode of operation, such as NoPressure mode or UnderPressure mode. Different rules may apply to the different modes in various embodiments when allocation flow shares.

Referring again to FIG. 3E, the interface module 3304 is configured to provide an interface for the QOS manager module 330 to communicate with the BW manager module 320 and the WM module 340. Referring to FIG. 3B, for example, the interface module 3304 may receive a WM FLOW REQUEST 3401 from the WM module 340 and send a QOS FLOW RESPONSE 3402 (in response to receiving the WM FLOW REQUEST 3401) to the WM module 340. In another example, the interface module 3304 may receive a BW COLLECTION RESPONSE 3302 and send a QOS FLOW RESPONSE 3402 (in response to receiving the BW COLLECTION RESPONSE 3302). In one example, the flow share logic module 3305 includes at least one of a mode selection module 3306, a NoPressure mode module 3307, and an UnderPressure mode module 3308. The mode selection module 3306 determines whether to apply a first mode of operation (e.g., NoPressure mode) or a second mode of operation (e.g., UnderPressure mode). In one embodiment, the NoPressure mode is selected if the total_request_size (R) is less than or equal to a threshold value and the UnderPressure mode is selected if the total_request_size (R) is greater than a threshold value. If the mode selection module 3306 determines a NoPressure mode applies, then the NoPressure mode module 3307 applies a first set of mode operation rules. If the mode selection module 3306 determines an UnderPressure mode applies, then the UnderPressure mode module 3308 applies a second set of mode operation rules. The NoPressure mode and the UnderPressure mode are described in further detail below in conjunction with FIGS. 8A-8B and FIGS. 9A-9B, respectively.

For various embodiments, the priority share logic module 3309 determines the allocated bandwidth for application priority shares and the flow share logic module 3305 determines the allocated bandwidth for flow shares. FIG. 7D illustrates an example of allocated bandwidth for application priority shares and allocated bandwidth for flow shares for one of the application priority shares.

FIG. 3F illustrates a block diagram of a WM 342, according to an example embodiment. The WM 342 includes an interface module 3406 and a flow logic module 3620. The interface module 3406 provides functionality for the WM 342 to provide and receive communications between the WM 342 and its associated QOS manager (e.g., QOS manager 331). The interface module 3406 may include a flow request module 3403 and a flow response allocate module 3404. In an example embodiment, the flow request module 3403 provides a WM FLOW REQUEST (e.g., WM FLOW REQUEST 3401 shown in FIG. 3B), and the flow response allocate module 3404 provides a QOS FLOW RESPONSE (e.g., QOS FLOW RESPONSE 3402 shown in FIG. 3B), and the flow response allocate module 3404 provides a QOS FLOW RESPONSE (e.g., QOS FLOW RESPONSE 3402 shown in FIG. 3B). In example embodiments, a QOS FLOW RESPONSE is generally provided for every WM FLOW REQUEST sent to the QOS manager module 330. In various embodiments, the interface module 3406 provides communications on a per flow basis.

The flow logic module 3620 includes a window size generation module 3405. In various embodiments, the WM module 340 includes a plurality of WMs (e.g., WM 342). Each of the WMs may include a window size generation module 3405 configured to generate the window size $W_A$ advertised by the BW management system 125 to the sending host (e.g., TCP sender) of the individual flows. In various embodiments, the flow logic module 362 computes the WM FLOW REQUEST 3401 and the window size to be advertised to the sending host $W_A$ for the individual flows. The amount of bandwidth for individual flows requested by the WM FLOW REQUEST 3401 is represented by the equation $W_{MAX}/RTT_2$. Once $W_{MAX}/RTT_2$ is computed for the individual flows by the flow logic module 362, the BW management system 125 computes the QOS ALLOCATE for the individual flows. The QOS ALLOCATE may be used by the flow logic module 362 to compute the advertised window $W_A$. The flow logic module 3620 including the window size generation module 3405 is described in further detail with FIGS. 10A-10F.

In example embodiments, the WM module 340 includes a plurality of WMs 342. Each of the WMs 342 includes a window size generation module 3405 configured to: generate the window size advertised by the BW management system 125 to the TCP sender of the individual flows based on an estimated rate at which the TCP receiver is receiving data packets for the individual flows and a round trip time between the first host and the system for the individual flows.

In further embodiments, each WM 342 includes an interface module 3406 configured to: send WM flow requests for estimated current flow utilization based on the window size advertised to the TCP sender; and receive QOS flow responses to the WM flow requests indicating the allocated flow shares.

A HBT may be used to visually explain how the BW management system 125 provides QOS for flows associated with a server based on traffic classes. An example of a HBT 600 is shown in FIG. 6A. In an example embodiment, each HBT (e.g., HBT 600) corresponds to a physical server (such as server 106 shown in FIG. 1A) running virtualization software to create multiple instances of VMs. In alternative embodiments, such as a docker environment, virtualization software may not be used to create multiple instances of VMs.

The nodes within a HBT (except for the root node) represent traffic classes associated with virtualized resources in example embodiments. In other embodiments, the traffic classes may represent resources which are not virtualized. For example, the virtual resources may be a VM, a tenant having one or more VMs, or a pool of VMs. FIG. 4A illustrates a server 401 having two tenants 410 and 420, with each tenant 410, 420 having two VMs each. The highest level in the HBT, as represented by a root node, represents a universal traffic class of flows of the server 401, as shown in FIG. 4A. The virtual resources associated with the server 401 are subdivided into two tenants 410 and 420. In this example, each of the tenants 410, 420 is allocated bandwidth of 5 Gpbs. The tenants 410, 420 may represent entities or organizations with one or more VMs assigned to it. For example, the VM 411 is allocated 3 Gbps and VM 412 is allocated 2 Gbps from the total of 5 Gbps assigned to tenant 410. Additionally, the VM 413 is allocated 3 Gbps and VM 414 is allocated 2 Gbps from the total of 5 Gbps assigned to tenant 420. Each of the VMs is represented by a leaf node in FIG. 4A. It is possible that not all the virtual resources of a server may be assigned resources. Those resources may be available for future tenants. It is understood that the number of tenants and VMs associated with a server may vary.

Referring to FIGS. 4A and 6A, in one example, the server 401 corresponds to a root node 601. The tenant 410 corresponds to a node 610, and the tenant 420 corresponds to a node 620. A VM 411, a VM 412, a VM 413, and a VM 401 each corresponds to nodes 611, 612, 621, and 622, respectively. The nodes 611, 612, 621, and 622 are each leaf nodes. Leaf nodes represent the nodes at the lowest level in the HBT. Each of the nodes below the root node 601 corresponds to one or more virtualized resources.

Figure 4B:
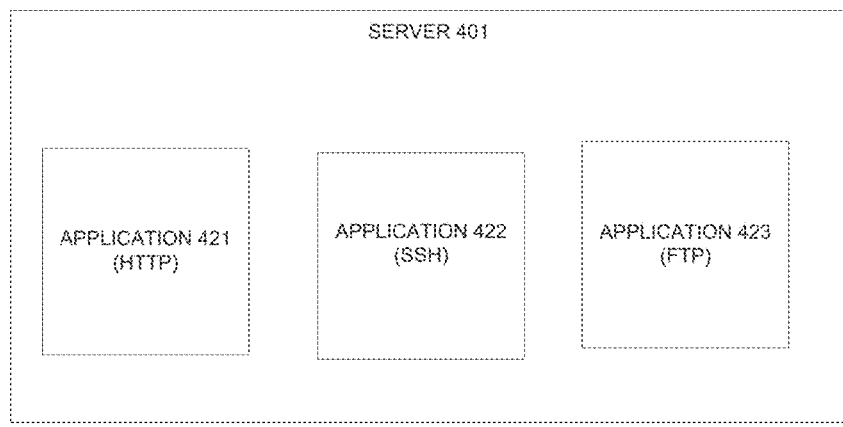
FIG. 4B illustrates a block diagram of a server running multiple applications, according to an example embodiment.
Figure 4C:
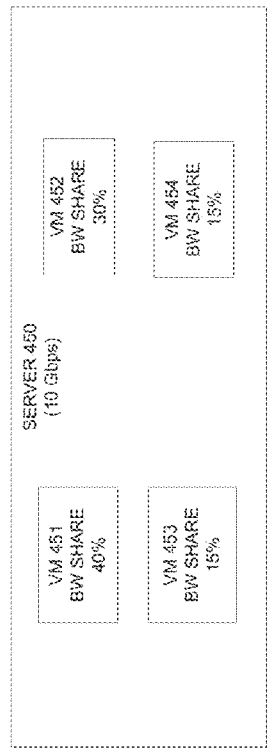
FIG. 4C illustrates a block diagram of a server with bandwidth resources allocated among multiple servers.
Figure 4D:
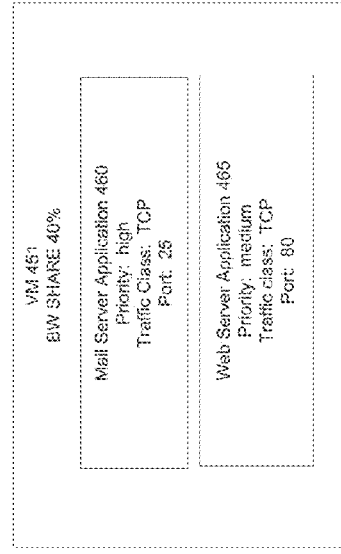
FIG. 4D illustrates a block diagram of a VM having its bandwidth share used by two applications, according to an example embodiment.

The root node 601, corresponding to a server, is associated with a universal traffic class representing all the flows associated with a physical server. The other nodes and the leaf nodes in a HBT are each associated with a traffic class. Each traffic class is filtered by one or more criteria or parameters, typically configured by a user. The physical sever may be associated with one of the hosts in an end-to-end connection for multiple flows. For example, the host may represent a VM, docker or other similar objects. The guest operating systems within any of the VMs 411, 412, 413 or 414 may represent a TCP sender, a TCP receiver, or both. The TCP receiver may be referred to as the receiving host and the TCP sender may be referred to as the sending host in various embodiments. The flows may include both active and inactive sessions. The BW management system 125 may manage the bandwidth of a flow throughout the life of the session established between two hosts. Each of the flows is associated with an application running on the server 401. Referring to FIG. 4B, the server 401 may have multiple applications installed on it. For example, the server 401 may run an HTTP application 421, a SSH application 422, and a FTP application 423 with multiple flows associated with each of the applications 421, 422, 423.

Each node within a HBT represents a traffic class. With the exception of the root node, the nodes at different hierarchical levels may be filtered on different traffic classes.

Figure 6F:
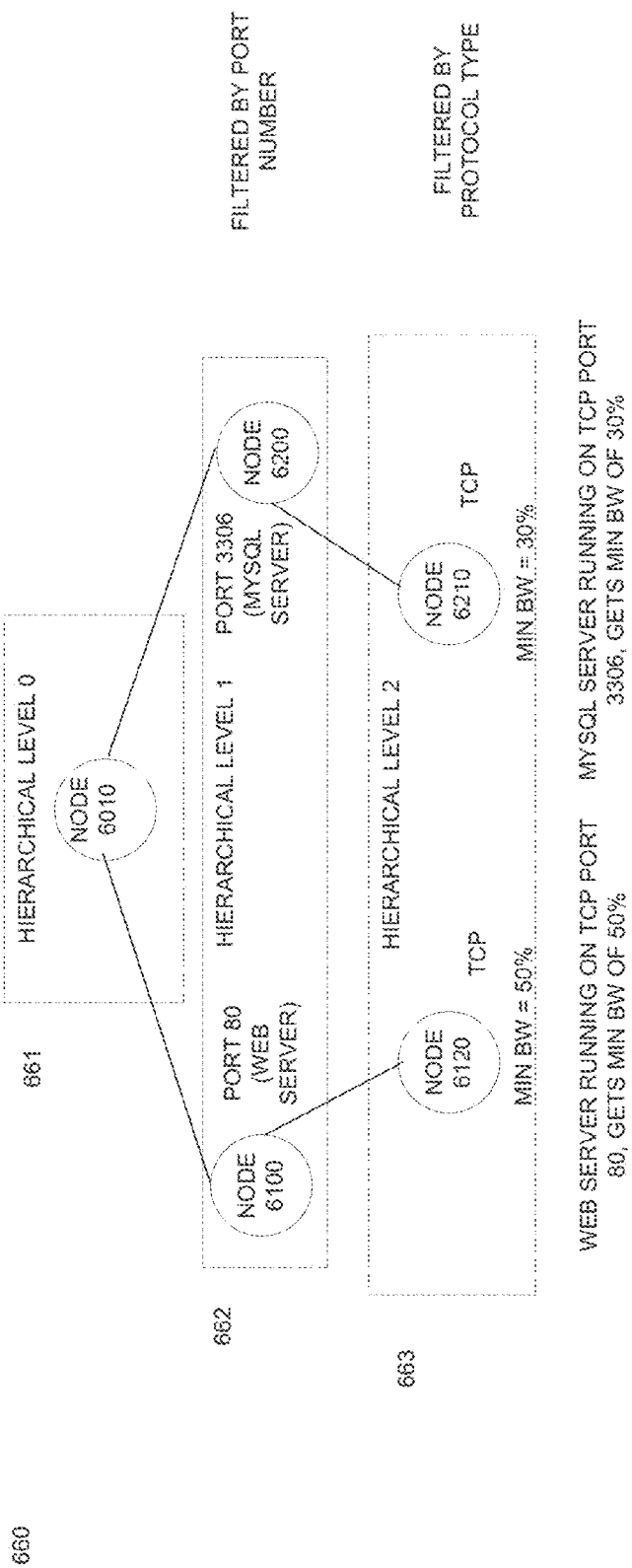
FIG. 6F illustrates the HBT filtered by various classification parameters, according to an example embodiment.
Figure 6G:
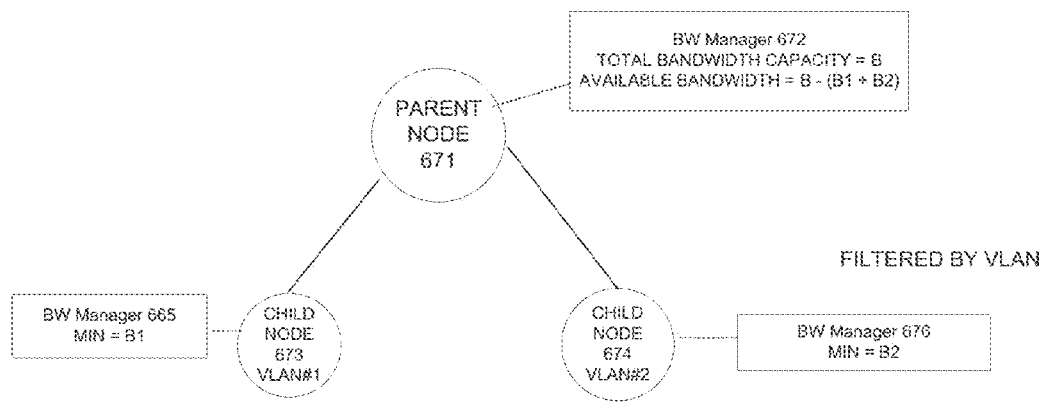
FIG. 6G illustrates an example of a sub-tree having a parent node and child nodes configured for a minimum guarantee, according to an example embodiment.

FIG. 6F illustrates an example of a HBT 660 filtered by traffic classes associated with an IP address (e.g., of a server) at a hierarchical level 0, ports associated with a hierarchical level 1, and then protocols at a hierarchical level 2. Other examples of parameters used to filter traffic classes are shown in FIG. 5B in the classification of traffic table 525.

The lowest nodes in the HBT are referred to as leaf nodes. Referring to FIG. 6A, the leaf nodes are represented by nodes 611, 612, 621 and 622. The BW manager module 320 within the BW management system 125 includes a plurality of BW managers, as shown in FIG. 3A. The BW manager module 320 may be used to manage the bandwidth for one or more trees with each tree having one root node. For example, FIG. 6B illustrates a BW manager module 607 corresponding to a single HBT 600. The BW manager module 607 includes a plurality of BW managers, where each of the BW managers 602, 615, 616, 617, 625, 626, and 627 corresponds to a node in the HBT 600. In other embodiments, the BW manager module 320 may be used to manage the flows associated with multiple servers.

As discussed above, each node in a HBT may have a corresponding BW manager. Referring back to FIG. 3A, the BW managers 321, 322, and 323 represent a BW manager for a root node. The BW managers 324, 325, and 326 represent BW managers for other nodes (i.e., all nodes other than root and leaf nodes). The BW managers 327, 328 and 329 represent BW managers for leaf nodes. For alternative embodiments, the number of BW manager root nodes, BW manager other nodes, and BW manager leaf nodes may vary. The BW manager corresponding to a node is responsible for managing the bandwidth at that node, which includes managing the bandwidth of all virtual resources assigned to that node.

As described above, in various embodiments, the BW management system 125 creates a BW manager associated with each node in a hierarchical tree. The BW manager module 320 may include a node creation module (not shown) for creating nodes associated with subclasses for one or more trees. In some embodiments, every class of traffic has a corresponding node created for it. If a class of traffic has been configured with a minimum bandwidth reservation (MIN), the BW manager ensures that the aggregate bandwidth available to all flows in this class is greater than or equal to the reserved bandwidth. Similarly, if the traffic class is configured with a maximum allowed bandwidth or bandwidth cap (MAX), then it is the responsibility of the BW manager to ensure that the aggregate bandwidth of flows (in this class of traffic) does not exceed the bandwidth cap. The MIN and MAX values are referred to as bandwidth limits assigned to a node. The current utilization of bandwidth at a node is managed by the bandwidth manager module 320 to confirm to the assigned bandwidth limits.

The nodes within a hierarchical tree may have a minimum value (MIN) and/or a maximum value (MAX) configured by a user. In example embodiments, the MIN and MAX values are assigned while the BW management system 125 is configuring one or more HBTs, rather than when the BW management system 125 is actively managing the bandwidth of one or more traffic classes or sub-classes (also referred to as traffic subclasses) associated with one or more HBTs. For various embodiments, traffic classes and traffic subclasses may be used interchangeably throughout the specification, with the exception of traffic classes associated with root nodes, which are referred to as a universal traffic class and is not a traffic subclass.

The MIN refers to a reservation or a guaranteed amount of bandwidth for a particular node. The MAX refers to a cap for a particular node. If the MIN and MAX values for nodes are configured, then those values are assigned to the node. If the MIN value is not configured for a node, then the corresponding BW manager assigns a value of "0" in an example embodiment. If the MAX value is not configured for a node, then the corresponding BW manager assigns a value inherited from the parent of the node in an example embodiment. In some embodiments, the MIN value is always less than or equal to the MAX value such that configuring the MIN value>MAX value is not allowed. In some embodiments, the bandwidth manager associated with each node or a node creation module (not shown) is responsible for assigning MIN and MAX values as discussed above. Furthermore, the bandwidth manager associated with a parent node may reallocate bandwidth amongst its child nodes (if requested) and if certain criteria are met. The criteria may be defined by one or more rules.

In various embodiments, the BW management system 125 creates a BW manager for each node in a hierarchical tree. The BW manager module 320 may include a node creation module (not shown) for creating nodes associated with subclasses for one or more trees. In some embodiments, every class of traffic has a corresponding node created for it. If a class of traffic has been configured with a minimum bandwidth reservation (MIN), the BW manager ensures that the aggregate bandwidth available to all flows in this class is greater than or equal to the reserved bandwidth. Similarly, if the traffic class is configured with a maximum allowed bandwidth or bandwidth cap (MAX), then it is the responsibility of the BW manager to ensure that the aggregate bandwidth of flows (in this class of traffic) does not exceed the bandwidth cap.

In the following example, assume that the MIN value is equal to B (MIN=B) and the MAX value is equal to A (MAX=A). The minimum reservation (MIN value) and the maximum value (MAX value) can be independently configured, and may be different for each class of traffic. Configuration of a minimum reservation means that a class of traffic will always be guaranteed a bandwidth B. In some embodiments, no other traffic classes will get any share of this bandwidth. However, this class of traffic can always have the opportunity to get more bandwidth than B if spare bandwidth is available. Configuration of the maximum bandwidth restricts the maximum bandwidth that can be used by this class of traffic to A. The BW manager does not guarantee any bandwidth above B. It is possible that due to contention for network bandwidth, a traffic class may not receive the bandwidth A above bandwidth B.

In some embodiments, the MIN value for a given node may represent reserved bandwidth for the node that cannot be used by other nodes, even if the given node does not fully utilize the reserved bandwidth. In other embodiments, the bandwidth reserved for a given node is available to that node whenever it wants to use it, but may be shared with other nodes when the given node is not fully utilizing its reserved bandwidth. In some embodiments, when the reserved bandwidth is shared, and then returned, there may be a delay in the return.

As discussed above, a BW manager module 320 may be created for a universal class of traffic corresponding to a server. The root node is associated with a universal class of traffic for a server. All other nodes within a HBT 600 may be associated with a traffic class, filtered by one or more criteria or parameters. In some embodiments, the root node has a MAX value representing the maximum link capacity of its corresponding server. In the root node, the MIN value is also configured to be equal to the maximum link capacity.

As shown in FIG. 6C, each HBT 600 may be subdivided into multiple sub-trees. Each sub-tree includes a parent node and one or more child nodes. The HBT 600 includes three sub-trees. A sub-tree 603 includes the root node 601 and two child nodes 610 and 620. A sub-tree 604 includes a parent node 610 (which is a child node in sub-tree 603) and two child nodes 611 and 612. A sub-tree 605 includes a parent node 620 (which is a child node in sub-tree 603) and two child nodes 621 and 622.

The BW manager module 320 may use a number of rules to manage the bandwidth at the various nodes of the HBT 600 and its associated sub-trees 603, 604, 605. Some of the rules may be referred to configuration rules and other rules may be used during operation of the BW manager module 320 while the BW manager module 320 is actively managing the bandwidth from a collection of flows associated with one or more traffic classes or sub-classes. One or more of the modules shown in the BW manager 327 of FIG. 3D may be used to configure and implement the operation rules used by the BW manager 327. For example, the bandwidth assignment module 3202 may be used to configure the MIN and MAX values. The traffic class bandwidth utilization tracking module 3203 in combination with the rule management module 3204 may be used to implement the rules while the BW management system 125 is actively managing flows.

In some embodiments, the bandwidth assignment module 3202 during a configuration mode (shown in FIG. 3D) may provide functionality to configure an aggregate sum assigned a MIN value rule (also referred to as configuration rule 1) and a configured MAX value rule (also referred to as a configuration rule 2). One rule that the rule management module 3204 may be responsible for implementing, in combination with the traffic class bandwidth utilization tracking module 3203, while the BW management system 125 is actively managing the bandwidth associated with a collection of flows for a traffic class (or sub-class) is referred to as the current utilization rule.

The configuration rule 1 specifies that the aggregate sum of the assigned MIN values of the child nodes in a sub-tree should be less than or equal to the assigned MIN value of the parent node in the sub-tree The configuration rule 2 specifies that the MAX value configured at each node in a given sub-tree should be less than or equal to the MAX value configured at the parent node in a given sub-tree. In some embodiments, it is possible for the aggregate sum of the assigned MAX value of the child nodes in a given sub-tree to be greater than the MAX value of the parent node in the given sub-tree.

Another example of a configuration rule (referred to as configuration rule 3) is that for a node, the MIN value is less than or equal to the MAX value. The bandwidth assignment module 3202 may be used to implement this rule.

During active bandwidth management, the rule management module 3204 implements the current utilization rule which specifies that the current bandwidth utilization of all the child nodes in a sub-tree should be less than or equal to the MAX value of the parent node in the sub-tree.

Another example of a rule implemented during active bandwidth management is that a child node may not exceed its reserved bandwidth or MIN value without permission from its parent node in a sub-tree. In some situations, the parent node in the sub-tree may also represent a child node in another tree that may not exceed its reserved bandwidth or MIN value without permission from its parent node in another sub-tree.

During the active bandwidth management, the BW manager 327, while in communication with other BW managers associated with a traffic class (or sub-class) for a HBT, is responsible for determining the available bandwidth and how much to allocate in the BW COLLECTION RESPONSE 3302 for each QOS COLLECTION REQUEST 3301 while operating within the constraints of the various rules implemented by the BW manager module 320. The amount allocated in the BW COLLECTION RESPONSE 3302 may be referred to as the ALLOCATED BANDWIDTH (B). FIG. 6G provides an example of determining the available bandwidth at a parent node in a sub-tree.

FIG. 6G illustrates that the BW management system 125 may be configured to provide a minimum guaranteed reservation. As described above, if a node has not been configured to have a MIN value, then it is assigned a MIN value of 0 to that node. FIG. 6G illustrates a sub-tree 670 having a parent node 671 and two child nodes 673 and 674. Assume the total bandwidth capacity with the parent node 671 is B. For example embodiments, the value B may represent the ALLOCATED BANDWIDTH B indicated in a BW COLLECTION RESPONSE 3302 shown in FIG. 3B. The child node 673 is assigned a MIN value of B1 and the child node 674 is assigned a MIN value of B2. The available bandwidth of the parent node 671 is B−(B1+B2). When a given traffic class (associated with a node) is fully utilizing its reserved bandwidth (i.e., MIN value), its associated BW manager may request bandwidth to its parent node 671. The BW manager associated with the parent node 671 will grant the request if there is available bandwidth and the request will not exceed the maximum bandwidth (i.e., MAX value) of the parent node 671. For various embodiments, if the parent node 671 is a parent node of a sub-tree (and not the root node of a tree), then the parent node 671 requests permission from its parent node (not shown) for any amount requested above the MIN value of the parent node 671. The amount granted or allocated by the parent node 671 may be based on standard sharing algorithms (e.g., proportional share, weighted share, etc.) to distribute the available bandwidth among one or more child nodes requesting additional bandwidth from a parent node. The parent node 671 tracks the amount of bandwidth it allocates to its various child nodes 673 and 674, for example by the traffic class bandwidth utilization tracking module 3203. The formula for available bandwidth may be modified if the parent node 671 has previously allocated bandwidth to any of its child nodes 673 and 674.

The BW management system 125 is responsible for tracking the total bandwidth usage at each node or (of each traffic class) to ensure that it does not exceed the max.

FIG. 6A illustrates the HBT 600 with each of the BW managers assigned a MIN value. Following the rule stated above, the aggregate sum of the assigned MIN values of the child nodes in a sub-tree should be less than or equal to the assigned MIN value of the parent node in the sub-tree. Referring to sub-tree 603 of FIG. 6C, the aggregate sum of the MIN of the child nodes 610 and 620 is 10 Gbps, which is equal to the MIN value of the root node 601. Referring to sub-tree 604, the aggregate sum of the child nodes 611 and 612 is 5 Gbps, which is equal to the MIN value of the parent node 610. Referring to sub-tree 605, the aggregate sum of the child nodes 621 and 622 is 5 Gbps, which is equal to the MIN value of the parent node 620. The MIN values for the nodes shown in FIG. 6C are the same as the MIN values shown in FIG. 6A.

FIG. 6D illustrates an alternative view of the HBT 600. The HBT 600 show in FIG. 6D has its nodes arranged in different hierarchical levels. The hierarchical level 0 (606) is referred to as the highest level, the hierarchical level 1 (607)

is referred to as the second highest level, and the hierarchical level 2 (608) is referred to as the lowest hierarchical level. The hierarchical level 0 (606) includes the root node 601 and has an assigned MIN value of 10 Gbps. The hierarchical level 1 (607) includes nodes 610 and 620 and has an aggregate MIN value of 10 Gbps. The hierarchical level 2 (608) includes leaf nodes 611, 612, 621, and 622, and has an aggregate MIN value of 10 Gbps. For the embodiment shown in FIG. 6D, the HBT 600 is symmetrical (at level 1 and level 2) and therefore the aggregate MIN values assigned to the nodes at level 1 is equal to the MIN value assigned to level 0, and the aggregate MIN values assigned to the nodes at level 2 are equal to the MIN value assigned to level 0.

FIG. 6E illustrates an example of a HBT 600 having MIN and MAX values assigned to each of the nodes. As a leaf node (e.g., nodes 611, 612, 621 or 622) determines that its current utilization of bandwidth resources is approaching its MIN value, the BW manager associated with the leaf node may send a request to the BW manager associated with its parent node for additional bandwidth resources. The current utilization of bandwidth resources at a leaf node includes the bandwidth resources currently being utilized by all flows associated with the leaf node. For example, if the leaf node 611 determines that the current utilization of all its flows is approaching its MIN value of 3 Gbps, then the BW manager 616 sends a request to the BW manager 615 associated with the parent node 610. The BW manager 615 associated with the parent node 610 evaluates whether or not to grant the request for additional resources requested by the BW manager 616 associated with its child node 611. If the BW manager 615 grants the request to the BW manager 616, the granted additional resources may be the same as the requested additional resources, more than the requested additional resources, or less than the requested additional resources.

As stated above, the current bandwidth utilization of all the child nodes in a sub-tree should be less than or equal to the MAX value of the parent node in the sub-tree. Referring to the sub-tree 603, the current utilization of the child nodes 610 and 620 should be less than or equal to 10 Gbps, which is the MAX value assigned to the root node 601. Referring to the sub-tree 604, the current utilization of the child nodes 611 and 612 should be less than or equal to 8 Gbps, which is the MAX value assigned to the parent node 610. Referring to the sub-tree 605, the current utilization of the child nodes 621 and 622 should be less than or equal to 7 Gbps, which is the MAX value assigned to the parent node 620.

As stated above, the MAX value configured at each node in a given sub-tree should be less than the MAX value configured (or assigned) at the parent node in a given sub-tree. Referring to sub-tree 603, the MAX values assigned to the child nodes 610 and 620 are less than 10 Gbps, which is the MAX value, assigned to the parent node 601. Referring to sub-tree 604, the MAX values assigned to the child nodes 611 and 612 are less than 8 Gbps, which is the MAX value assigned to the parent node 610. Referring to sub-tree 605, the MAX values assigned to the child nodes 621 and 622 are less than 7 Gbps, which is the MAX value assigned to the parent node 620.

As mentioned above, it is possible for the aggregate sum of the assigned MAX value of the child nodes in a given sub-tree to be greater than the MAX value of the parent node in the given sub-tree. For example, the sub-tree 603 has an aggregate sum of the assigned MAX value of the child nodes 610 and 620 equal to 15 Gbps, which is greater than the assigned MAX value of 10 Gbps assigned to the root node 601. In another example, the sub-tree 604 has an aggregate sum of the assigned MAX value of the child nodes 611 and 612 equal to 9 Gbps, which is greater than the assigned MAX value of 8 Gbps assigned to the parent node 610.

Referring back to FIG. 3A, the BW management system 125 includes a BW manager module 320 with multiple BW managers. In various embodiments, a BW manager is associated with a node in a HBT. The BW managers are responsible for assigning MIN and MAX values at each node and then monitoring the bandwidth utilization at the nodes. If the current utilization at a child node is below the MIN value (i.e., under-utilizing bandwidth reserved for the given node), then it is possible for the BW manager associated with its parent node to re-allocate some of the reserved bandwidth to other child nodes in its sub-tree, if additional bandwidth is requested by one or more other child nodes. A child node in a sub-tree may not have its current bandwidth utilization exceed its MIN value (i.e., over-utilizing bandwidth reserved for the given node), unless it receives permission by its parent node in the sub-tree with a specified amount of additional bandwidth allocated. In some embodiments, once MIN and MAX values are assigned to a node, those values are not changed. In other embodiments, the MIN and MAX values can be changed, provided that they are changed under the constraints described by the various configuration rules described above. However, the BW managers track additional bandwidth the node has allocated to other child nodes within its sub-tree, to ensure that the current utilization of the parent node associated with the BW manager does not exceed the MAX value assigned to the BW manager of the parent node.

In various embodiments, multiple VMs share a server. When a server is being shared by many different VMs, it may become important to reserve bandwidth on a per VM basis so that there is performance isolation between the VMs. For example, if the server is being shared by four VMs, then the user may set the minimum reservation bandwidth and the maximum capacity by configuring the MIN and MAX values. One example of a policy is to allocate 25% of the bandwidth resources of the server to each of the four VMs. In this example, each VM has an equal share of the server's bandwidth resources.

In other examples, a user may choose to give one or more VMs a bigger or smaller bandwidth share. Referring to FIG. 4C, a server 450, corresponding to a root node in a hierarchical tree (not shown), has its bandwidth of 10 Gbps allocated amongst four VMs. A VM 451 is allocated a share of 40%, a VM 452 is allocated a share of 30%, a VM 453 is allocated a share of 15%, and a VM 454 is allocated a share of 15%. The VMs 451, 452, 453, and 454 may represent a pool of virtual resources.

FIG. 4D illustrates an example of how the resources allocated to VM 451, shown in FIG. 4C, may prioritize its allocated resources among different applications. In this example, a user may selectively make one application running within a VM perform better than other applications running on the same VM. In this example, at least two applications are running on VM 451, a mail server application 460 and a web server application 465. The mail server application 460 represents a high priority application and the web server application 465 represents a medium priority application. The priorities are pre-determined and based on bandwidth priority. In other words, flows from the mail server application 460 are considered a higher priority than flows from the web server application 465 and may get a larger share of the 40% bandwidth allocated to the VM 451. FIG. 4D also illustrates that the flows associated with the mail server application 460 and the web server application 465 may belong to a traffic class TCP. The TCP traffic class may be further filtered by port. The mail server application 460 is associated with a port 25 and the web server application 465 is associated with a port 80. In this example, the VM 451 is allocated a 40% share of the server's bandwidth resources (or total link capacity). The mail server application 460, which has a higher priority over the web server application 465, would get a larger share of the bandwidth allocated to the VM 451.

FIG. 6F further illustrates bandwidth management amongst many applications sharing a server. The HBT 660 includes a root node 6010, other nodes 6100 and 6200, and leaf nodes 6120 and 6210. The HBT 660 includes three hierarchical levels (level 0 shown by box 661, level 1 shown by box 662, and level 2 shown by box 663). In this example, a user can set the minimum bandwidth reservation and maximum capacity by configuring the MIN and MAX values. The MIN and MAX values may be configured on a per application basis, creating classes of traffic filtered by IP address, port, and protocol. For example, a web server running on the TCP port 80 gets a minimum bandwidth reservation of 50%, and the MySQL server on the TCP port 3306 gets a minimum bandwidth reservation of 30%. As shown in FIG. 6F, the hierarchical level1 is filtered by port number and the hierarchical level 2 is filtered by protocol type (e.g., TCP).

For an example embodiment, the BW management system 125 includes a BW manager module 320 configured to assign bandwidth reservations to traffic classes represented by nodes in a HBT. The HBT includes a root node which is the highest node in the HBT and one or more sub-trees with each sub-tree having a parent node and one or more child nodes. The root node represents a universal traffic class including a collection flows for a server machine associated with virtual resources. The root node is included within a single sub-tree as the parent node of the single sub-tree. One or more child nodes included within a single sub-tree as a child node in the single sub-tree are referred to as leaf nodes. The nodes below the root node in the HBT are each associated with one of the traffic classes (also referred to as traffic subclasses). Each of the traffic classes represents a collection of flows from the universal traffic class filtered by at least one traffic classification parameter. The BW manager module 320, in this example embodiment, is further configured to ensure, for each of the sub-trees in the HBT, that a sum of the assigned bandwidth reservations of the one or more child nodes in a sub-tree does not exceed the assigned bandwidth reservation of the parent node in the sub-tree without an allocation of bandwidth from the parent node in the sub-tree.

In a further embodiment, the root node has an assigned bandwidth reservation equal to a total link capacity of the server. In another embodiment, the assigned bandwidth reservation of the nodes in the HBT represents bandwidth guaranteed to the node in the HBT. In other embodiments, the allocation of bandwidth from the parent node in the sub-tree represents a reallocation of bandwidth among child nodes within the sub-tree based on available bandwidth.

In other example embodiments, the BW manager module 320 includes a plurality of bandwidth managers (BW managers) 327. Each of the BW managers 327 is associated with one of the nodes in the HBT to manage the bandwidth of the traffic class associated with the node. The plurality of BW managers 327 includes a leaf BW manager for a leaf node in a first sub-tree, a parent node BW manager for a parent node in the first sub-tree, and one or more other child node BW managers. In some embodiments, the leaf node BW manager is configured to: determine when the traffic class associated with the leaf node is utilizing bandwidth approaching the assigned bandwidth reservation of the leaf node of the first sub-tree; and send a request to the parent node BW manager for additional bandwidth, the request including a first requested bandwidth amount. In other embodiments, the parent node BW manager of the first sub-tree is configured to: determine whether the parent node of the first sub-tree has available bandwidth to allocate additional bandwidth to the leaf node in the first sub-tree; and allocate at least a portion of the available bandwidth to the leaf node. In further embodiments, the parent node BW manager of the parent node of the first sub-tree is configured to: determine when a sum of assigned bandwidth reservations of the child nodes within the first sub-tree is less than or equal to the assigned bandwidth reservation of the parent node in the first sub-tree; and allocate at least a portion of the unassigned bandwidth to the leaf node. In yet further embodiments, the parent node BW manager of the first sub-tree is configured to: determine when a sum of a current utilization of the assigned bandwidth reservations of the child nodes within the first sub-tree is less than or equal to the assigned MAX value or bandwidth cap of the parent node in the first sub-tree; allocate at least a portion of the assigned bandwidth not utilized to the leaf node; and send a response to the BW manager of the leaf node of the first sub-tree that a first specified amount of bandwidth has been allocated to the leaf node.

In another example embodiment, the parent node BW manager of the first sub-tree is configured to: determine when a sum of a current utilization of the assigned bandwidth reservation of the child nodes within the first sub-tree is approaching the assigned bandwidth reservation of the parent node; and send a request to BW manager of a parent node of a second sub-tree for additional bandwidth, the request including a second requested bandwidth amount, the parent node of the first sub-tree representing a child node in the second sub-tree. In some embodiments, the parent node BW manager of the parent node of the second sub-tree is configured to: determine when a sum of a current utilization of the assigned bandwidth reservations of the child nodes within the second sub-tree is less than or equal to the assigned bandwidth reservation of the parent node in the second sub-tree; allocate at least a portion of the assigned bandwidth not utilized to the parent node of the first sub-tree; and send a response to the BW manager of the parent node of the first sub-tree that a second specified amount of bandwidth has been allocated to BW manager of the parent node of the first sub-tree. In other examples, the parent node BW manager of the first sub-tree is configured to send a response to the leaf node BW manager that a third specified amount of bandwidth has been allocated to the leaf node. In another example, the first specified amount is equal to, less than, or greater than the first requested bandwidth amount. In other embodiments, the third specified amount is equal to, less than, or greater than the first requested bandwidth amount.

In various example embodiments, the nodes in the HBT which are not root nodes or leaf nodes may be included within multiple sub-trees as either parent nodes or child nodes. In further embodiments, the nodes below the root node in the HBT are each associated with a different traffic class. In another example, the parent nodes at the same level in the HBT use the same traffic classification parameter(s) to filter flows associated with the universal traffic class. In other examples, the leaf nodes are filtered by multiple classification parameters by more than one parent node from multiple sub-trees.

In other example embodiments, the BW manager module 320 is configured to: assign user configured bandwidth values to the bandwidth reservation of nodes configured by a user; and assign zero to bandwidth reservations of nodes not configured by a user.

In some embodiments, the BW manager module 320 is configured to: assign maximum capacity to the traffic classes represented by the nodes in the HBT. In other embodiments, the BW manager module 320 is configured to assign a maximum capacity equal to an entire link capacity of the server to the universal traffic class represented by the root node. In some examples, the assigned maximum capacity of each child node in a sub-tree in the HBT is less than or equal to the assigned maximum capacity of the parent node in the sub-tree. In other examples, the BW manager module 320 is configured to: ensure, for each of the sub-trees in the HBT, that the current utilization of bandwidth of all the child nodes in a sub-tree is less than or equal to the assigned maximum capacity of the parent node in the sub-tree. In further examples, the BW manager module 320 is configured to: assign user-configured bandwidth values to the maximum capacity of nodes configured by a user; and assign a maximum capacity assigned to a parent node to the maximum capacity of nodes not configured by a user.

Referring to FIG. 3A, the QOS manager module 330 includes multiple QOS managers 331, 332, and 333. Leaf nodes within a HBT have associated QOS managers. The QOS managers 331, 332, and 333 are responsible for allocating shares (e.g., priority application class share and flow shares) of bandwidth assigned to a leaf node by the BW manager associated with the leaf node. The shares of bandwidth are assigned based on priorities assigned to applications running on the server. The WM module 340 includes multiple WM sub-modules 341, 344, and 347. Each of the sub-modules 341, 344, and 347 corresponds to a particular application (or application priority) running on the server. Within each of the sub-modules 341, 344, and 347 are multiple WMs 342, 343, 345, 346, 348, 349. All flows for a server which are associated with the root node have a corresponding WM. A WM manages the bandwidth for a single flow (e.g., TCP flow) and makes requests to a QOS manager for bandwidth. FIG. 3F illustrates an example embodiment of a WM 342. FIGS. 10A-10F illustrate examples of how a WM adjusts the window size of a particular flow between two hosts.

FIG. 7A illustrates a portion of a HBT 700 associated with a leaf node 701, according to an example embodiment. The leaf node 701 has an associated BW manager 327. The BW manager 327 is associated with the leaf node 701 and allocates 2 Gbps to the QOS manager 331. The QOS manager 331 is responsible for allocating bandwidth among the flows in a collection of flows associated with a traffic class based on application priority class information. The leaf node 701 may represent one of the nodes in the HBT 600, shown in FIG. 6A. Associated with the leaf node 701 is a QOS manager 331 and a WM sub-module 341. The WM sub-module 341 includes WMs for high priority applications 730 (including WMs 731-734), WMs for medium priority applications 740 (including WMs 741-744) and WMs for low priority applications 750 (including WMs 751-754). Each of the WMs is associated with one of the flows 735-738, 745-748, and 755-758.

The QOS manager 331 is responsible for allocating shares of the 2 Gbps bandwidth reservation among the flows based on user-configured application priority class information. As shown in FIG. 4B, a server 401 may run multiple applications (such as an HTTP application 421, an SSH application 422, and an FTP application 423). In various embodiments, a user may prioritize one or more of these applications as high priority, medium priority or low priority. These applications 421, 422, 423 may be referred to as priority application classes. Higher priority applications generally get a bigger share of the bandwidth assigned to the leaf node (e.g., the 2 Gbps assigned to the node 612). In other embodiments, a user may provide the percentage (%) of the total share of the bandwidth assigned to the leaf node that gets allocated to the collection of high priority flows, medium priority flows and low priority flows. In some embodiments, the bandwidth manager system 125 may automatically assign the share allocated to each of the high, medium, and low priority collections of flows.

The state tracking module 3303 (shown in FIG. 3E) may be implemented, at least in part, with the state tracking modules 711, 712, and 713 of FIG. 7A. The state tracking module 711 is associated with applications from a high application priority class P1, the state tracking module 712 is associated with applications from a medium application priority class P2, and the state tracking module 713 is associated with applications from a low application priority class P3 in the example shown in FIG. 7A. In various embodiments, the state tracking module 3303 interacts with the various components within the QOS logic module 3610 to allocate bandwidth, also referred to as % shares of the allocated bandwidth B based on application priority classes (associated with a traffic class), and the flow shares (associated with the % shares of the allocated bandwidth B).

The QOS manager 331 tracks state tracking information for the various applications based on application priority classes. In some embodiments, the state tracking information includes total_request_size ($R_{PX}$), scale_factor (a), and % share of B for an application priority class (PX), where X represents a priority application class number. For example, if there are three priority application classes, the aggregate total_request_size R across all application priority classes (associated with a traffic class for a given node) equals $R_{P1}+R_{P2}+R_{P3}$, and the allocated bandwidth B across all application priority classes (associated with a traffic class for a given node) is divided into percentage (%) shares PX of B referred to as % share P1, % share P2 and % share P3. The % share assigned to the application priority classes may be configured by a user in various embodiments. In some embodiments the sum of % share for P1+% share for P2 and % share for P3 equals 100% of B. For example, % share P1=60%, % share P2=30% and % share P3 equals 10%.

In an example embodiment, the state tracking module 711 tracks the state for high priority applications (referred to as P1). The state tracking module 712 tracks the state for medium priority applications (referred to as P2). The state tracking module 713 tracks the state for the low priority applications (referred to as P3). The flows associated with a high priority application are referred to as high priority flows (P1 flows), the flows associated with a medium priority application are referred to as medium priority flows (P2 flows), and the flows associated with a low priority application are referred to as low priority flows (P3 flows). P1, P2 and P3 may be referred to as high, medium, and low application priority classes or application priority levels.

The state tracking module 715 illustrates modules (e.g., 711, 712 and 713) for the different application priority classes (P1, P2 and P3). The application priority P1 represents high priority applications, the application priority P2 represents medium priority applications, and the application priority P3 represents low priority applications in this example. The state tracking module 711 tracks the state for the flows associated with P1 (e.g., flows 735-738). The state tracking module 712 tracks the state for the flows associated with P2 (e.g., flows 745-748). The state tracking module 713 tracks the state for the flows associated with P3 (e.g., flows 755-758). It is understood that the number of priority application classes may vary and the number of flows associated with each priority application class may vary. In alternative embodiments, the state for the flows associated with P1, P2 and P3 are tracked by a single state tracking module rather than separate modules 711, 712, and 713. In various embodiments, the state tracking data is stored in one or more storage devices accessible by the QOS manager 331. In various embodiments, the state tracking data includes total_request_size ($R_{PX}$), scale_factor (a), and % share of B for an application priority class (PX), where X represents a priority application class number, as well as the values used to compute these three values.

Each of the state tracking modules 711, 712, and 713 tracks the following information: (1) the total_request_size ($R_{PX}$) for tracking the sum of the requests (in terms of bandwidth) from all the active flows which belong to a priority class of applications; (2) the scale_factor (a) for providing the bandwidth multiplier by which to accelerate (or decelerate) a flow in a priority class of applications (e.g., if a flow is receiving a bandwidth of b Mbps and the acceleration factor is a, then the bandwidth of that flow is increased by a*b); and (3) % share of B for an application priority class (PX) for the sum of bandwidth achieved by all the flows in a priority class of applications. X represents a priority class application number in example embodiments. One or more of the following modules may be used to implement, at least in part, the state tracking modules 711, 712, and 713, or used in combination with the state tracking modules 711, 712, and 713: the flow utilization tracking module 3406, state tracking module 3303, and the traffic class bandwidth utilization tracking module 3203.

In various embodiments, the percentage share may be different for different priority classes and is determined by the percentage share (or fraction) of total bandwidth allocated by the BW manager 327 to the QOS manager 331. The bandwidth allocated B by the BW manager 327 may be provided in the BW COLLECTION RESPONSE 3302 as the ALLOCATED BANDWIDTH (B). The ALLOCATED BANDWIDTH (B) is associated with a collection of flows associated with a traffic class, for example a collection of flows associated with a leaf traffic class. In some embodiments, the percentage share (or fraction) can be configured by a user or by the QOS manager 331. In the example shown in FIG. 7A, for the priority application class P1, the percentage share may be 60% of B, for the priority application class P2, the percentage share may be 30% of B, and for the priority application class P3, the percentage share may be 10% of B.

In some embodiments, if one of the application priority classes is not using its entire percentage share, then the unused portion of the share may be allocated to flows belonging to other application priority classes. For example, assume the percentage share for the application priority class P1 is utilizing only 50%, rather than 60%. In this case, the unused 10% may be allocated to the application priority class P2.

The high, medium, and low priority flows vary in terms of the values assigned to the scale_factor (a) and percentage share (% share of PX) for a priority application class (PX, e.g., P1, P2, P3), and may be referred to as configurable parameters.

In various embodiments, the high and the medium priority flows have a percentage share for a priority application class equal to the total bandwidth (i.e., the allocated bandwidth B in some embodiments) managed by the QOS manager 331. The low priority flows are restricted to a fraction of the total bandwidth (i.e., the allocated bandwidth B in some embodiments) available to the QOS manager 331 in other embodiments.

The high and medium flows may differ in the values assigned to the scale_factor (a) in some embodiments. The high priority flows may have a larger scale_factor (a) than medium flows. In various embodiments, these configurable parameters are received by the configuration interface module 356 shown in FIG. 3C. In other embodiments, the BW management system 125 may automatically assign values for these configurable parameters.

The QOS manager 331 operates in two modes for every application priority class (e.g., high, medium, or low) of applications in various embodiments. These two modes of operation (i.e., NoPressure mode and UnderPressure mode) are used by the QOS manager 331 to allocate flow shares associated with an application priority class (e.g., P1, P2, or P3). The mode selection module 3306 may be configured to provide functionality to select either the NoPressure mode or the UnderPressure mode based on a threshold value.

Figure 8A:
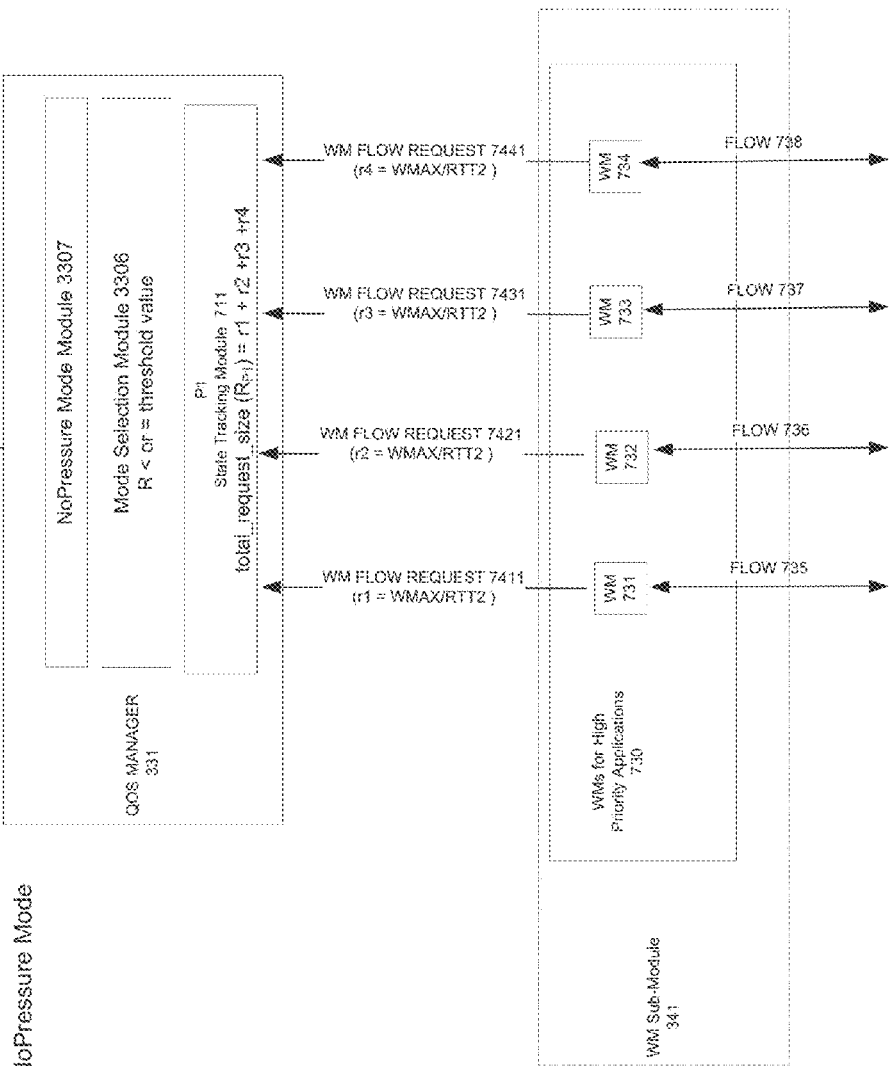
FIG. 8A illustrates an example of a QOS manager operating in a NoPressure mode with a WM FLOW REQUEST, according to an example embodiment.
Figure 8B:
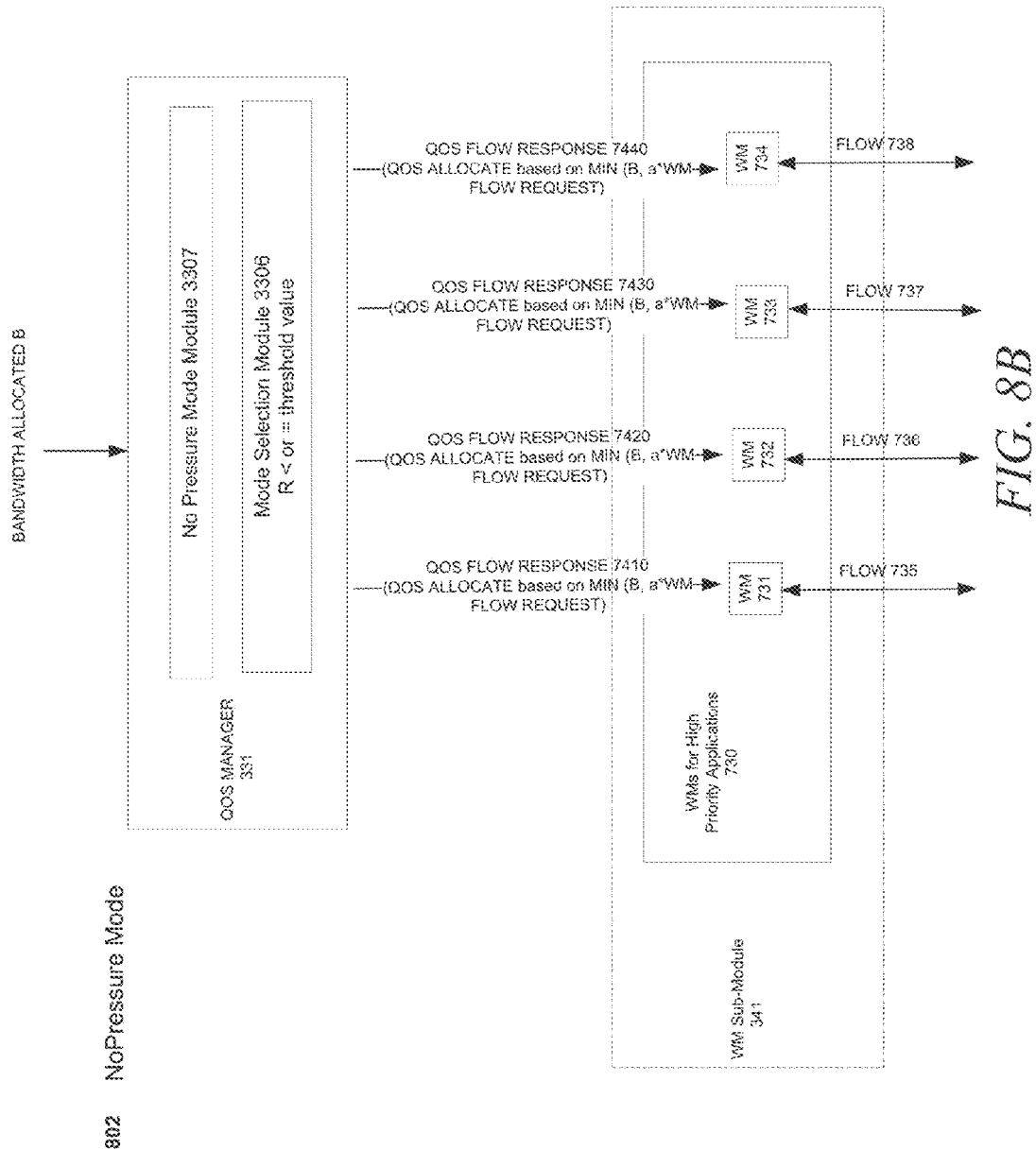
FIG. 8B illustrates an example of a QOS manager operating in a NoPressure mode with a QOS FLOW RESPONSE, according to an example embodiment.
Figure 9A:
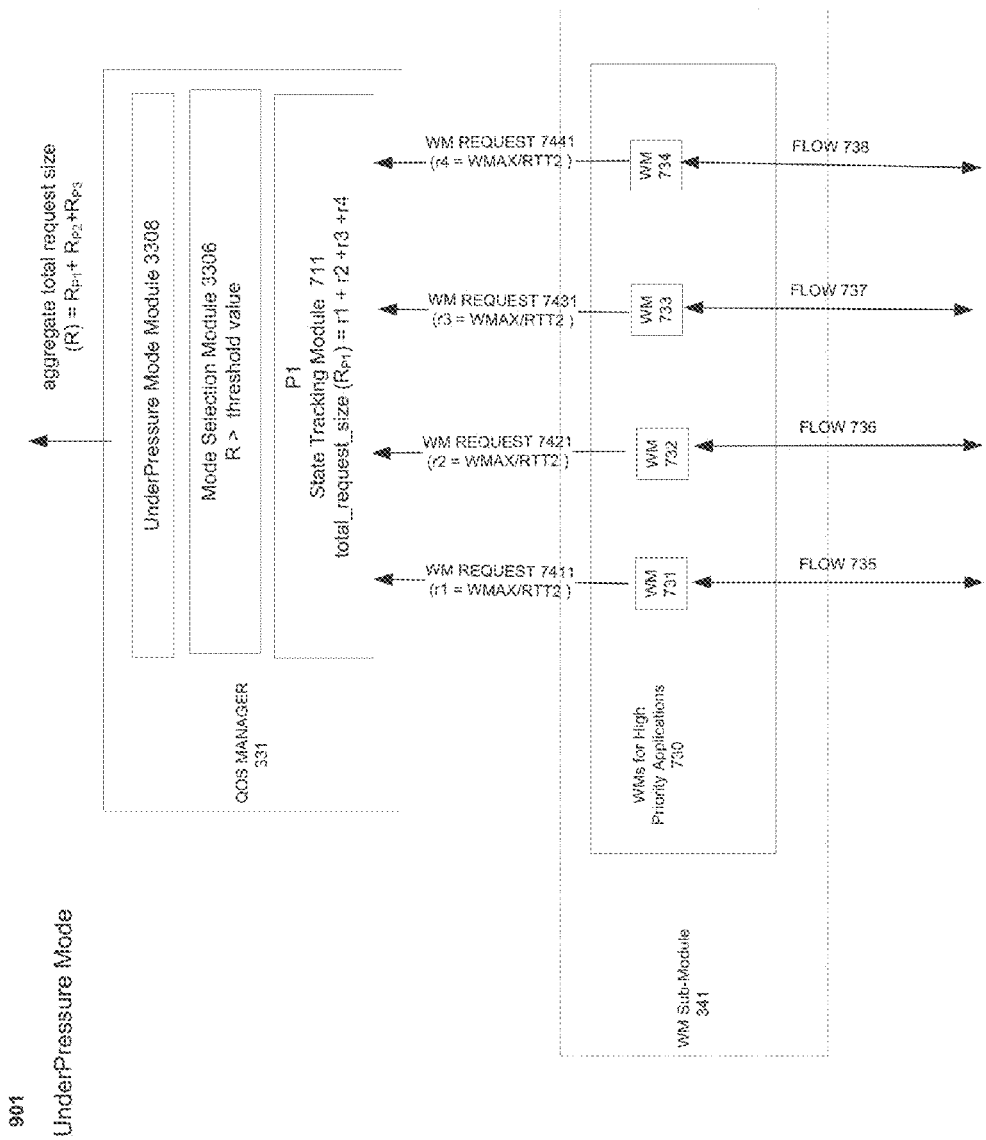
FIG. 9A illustrates an example of a QOS manager operating in an UnderPressure mode with WM FLOW REQUESTs, according to an example embodiment.

The QOS manager 331 defines a threshold value which determines which mode should be active. The predefined threshold represents a percentage of the allocated bandwidth B. In various embodiments, the percentage may be different for the various application priority classes. The threshold value may be a configurable parameter. In some embodiments, the NoPressure mode is active when the aggregate total request size (R) is less than or equal to the predefined threshold. The UnderPressure mode is active when the aggregate total request size (R) is larger than the predefined threshold. The QOS manager 331 provides the flow shares for the individual flows (for a collection of flows associated with a traffic class) in the flow responses (e.g., QOS FLOW RESPONSES 3402) provided to the WM sub-module 341. FIGS. 8A-8B illustrate a portion of the BW management system 125 operating in a NoPressure mode, and FIGS. 9A-9 illustrate a portion of the BW management system 125 operating in an UnderPressure mode.

When the QOS manager 331 is operating in the NoPressure mode, it tries to accelerate (or decelerate) bandwidth requests for an individual flow (e.g., WM FLOW REQUEST 3401) when allocating flow shares based on a first set of operation mode rules. An example of a first set of operation mode rules, relates to a NoPressure mode, is described below. If operating in the NoPressure mode, the QOS RESPONSE=minimum of the bandwidth request B or a * WM FLOW REQUEST, where B represents the ALLOCATED BANDWIDTH B for a collection of flows associated with a traffic class which includes the individual flow, and a represents the scale_factor associated with the application priority class of the individual flow. The QOS RESPONSE represents the flow share allocated to the individual share, which is then used to compute the window size $W_A$.

When the QOS manager 331 is operating in the UnderPressure mode, it tries to allocate bandwidth among all the flows (associated with a traffic class) in a given application priority class based on a second set of mode operation rules. The second set of mode operation rules may be used for the distribution types referred to as proportional_share and equal_share. An example of a second set of operation mode rules is described below.

For example, suppose there are n flows in a given priority class, an aggregate total request size of R, and a percentage share for a priority application class (e.g., % share for P1) of B (which represents the allocated bandwidth). For a flow with a request size r (r represents the received amount from a WM FLOW REQUEST 3401), the QOS manager 331 computes:

equal_share=$B/n$ proportional_share=$(r/R)*B$

The QOS manager 331 uses the following algorithm for allocating a flow share to the individual flow (i.e., bandwidth to the requesting flow):

If ($r$<equal_share) then allocate $r$ else if (proportional_share<equal_share) then allocate equal_share else allocate MIN($r$, proportional_share)

FIG. 8A illustrates a portion 801 of a BW management system 125 operating in a NoPressure mode with WM FLOW REQUESTS 7411-7441. FIG. 8A illustrates WM FLOW REQUESTS 7411-7441 for bandwidth request r1-r4, respectively. The r1 bandwidth request is associated with flow 735, the r2 bandwidth request is associated with flow 736, the r3 bandwidth request is associated with flow 737 and the r4 bandwidth request is associated with flow 738. The user interface module 3304 (shown in FIG. 3E) is used to provide the WM FLOW REQUESTS 7411-7441 from the WMs 731-734 to the QOS manager 331 in example embodiments.

The QOS manager 331 includes a NoPressure mode module 3307, a mode selection module 3306 and a state tracking module 711 for P1. In some embodiments, the modules 3307 and 3306 may be included within the QOS logic module 361. The NoPressure mode module 3307 indicates that the NoPressure mode has been selected because R is less than or equal to a threshold value. In various embodiments, the threshold value may vary for the different application priority classes. The state tracking module 711 for P1 tracks the total_request_size ($R_{P1}$). The aggregate total request size (R) represents the aggregate $R_{P1}+R_{P2}+R_{P3}$, for a bandwidth manager module 125 having 3 application priority classes in an example embodiment. The QOS COLLECTION REQUEST (e.g., 3301 shown in FIG. 3B) represents the aggregate total request R across all the application priority classes in example embodiments.

FIG. 8B illustrates a portion 802 of a BW management system 125 operating in a NoPressure mode with QOS flow responses. FIG. 8B illustrates the response from the QOS manager 331 to the WM FLOW REQUESTS 7411-7441. The user interface module 3304 (shown in FIG. 3E) is used to provide the QOS FLOW RESPONSES 7410-7440 from the QOS manager 331 to the WMs 731-734 in example embodiments. In the portion 802 of the BW management system 125 shown in FIG. 8B, the QOS FLOW RESPONSES 7410-7440 illustrate an allocated bandwidth amount referred to as QOS ALLOCATE. The NoPressure mode module 3307 computes the QOS FLOW REQUESTS (e.g., 3301) in the NoPressure mode based on the minimum value of the ALLOCATED BANDWIDTH B or by multiplying the bandwidth request (r) for an individual flow by a scale factor (a) for flows in the various application priority classes. In various embodiments, the scale factor (a) may be different for the various priority classes. The user interface module 3304 provides communications between WMs and QOS managers on a per flow basis and the QOS managers and the BW managers for a collection of flows associated with a traffic class (or traffic subclass).

FIG. 9A illustrates a portion 901 of a bandwidth management tree 125 operating in an UnderPressure mode in an example embodiment. FIG. 9A illustrates an example of the QOS manager 331 operating in the UnderPressure mode, in which the QOS manager 331 tries to share the bandwidth among all the flows in a given application priority class. FIG. 9A illustrates WM FLOW REQUESTS 7411-7441 for r1 bandwidth associated with flow 735, r2 bandwidth associated with flow 736, r3 bandwidth associated with flow 737 and r4 bandwidth associated with flow 738. The user interface module 3304 (shown in FIG. 3E) is used to provide the WM FLOW REQUESTs 7411-7441 from the WMs 731-734 to the QOS manager 331 in example embodiments. The values for r1, r2, r3, and r4 represent the estimated current bandwidth for a flow at a specific time (t).

In FIG. 9A, the QOS manager 331, includes an UnderPressure mode module 3308, a mode selection module 3306 and a P1 state tracking module 711. In some embodiments, the modules 3308 and 3306 may be implemented in the QOS logic module 361. In various embodiments, the P1 state tracking module 711 tracks the total_request_size ($R_{P1}$) which is equal to r1+r2+r3+r4 in the embodiments shown in FIG. 9A-9B. The WM REQUESTS 7411-7441 represent the bandwidth requests for r1-r4, respectively. In example embodiments, bandwidth requests for r1-r4 are based on the equation $W_{MAX}/RTT_2$. The QOS logic module 361 aggregates the request $R_{P1}$ with other total_request_sizes from the other application priority classes, for example $R_{P2}$ and $R_{P3}$, if there are 3 application priority classes to compute the aggregate total request size R.

Figure 9B:
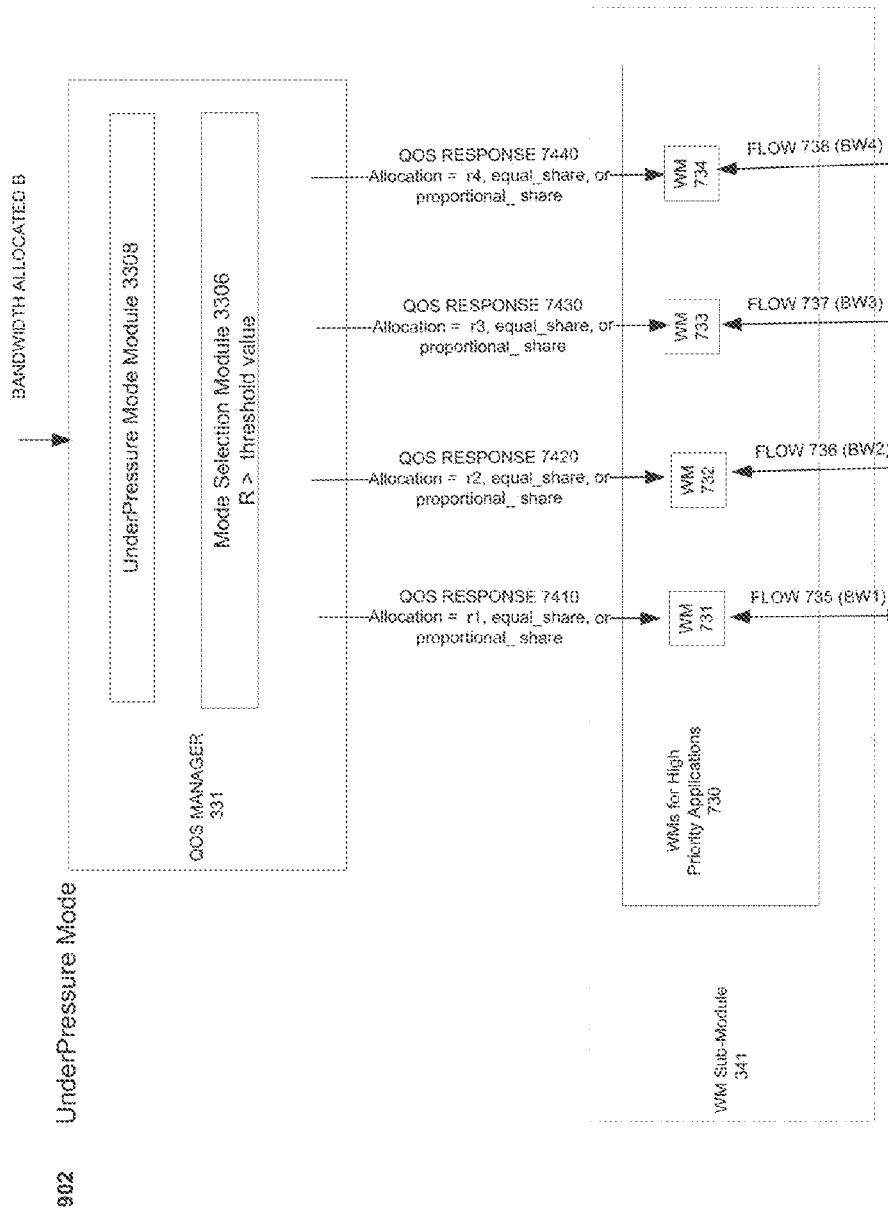
FIG. 9B illustrates an example of a QOS manager operating in an UnderPressure mode with QOS FLOW RESPONSEs, according to an example embodiment.

FIG. 9B illustrates the response from the QOS manager 331 to the WM FLOW REQUESTS 7411-7441, after processing by the bandwidth manager module (e.g., 327) The user interface module 3304 (shown in FIG. 3E) is used to provide the QOS FLOW RESPONSES 7410-7440 from the QOS manager 331 to the WMs 731-734 in example embodiments. Once the bandwidth allocated B is received by the QOS manager 331, the QOS manager 331 allocates percentage shares to the various application priority classes before allocating flow shares. The UnderPressure mode applies to the allocation of flow shares for the various % shares. In example embodiments, the UnderPressure mode module 3308 computes the QOS RESPONSES 7410-7440 based on one of the distribute types—proportional_share or equal_share. The QOS RESPONSES 7410-7440 are based on the distribute type of proportional_share or equal_share. The QOS RESPONSES 7410-7440 indicate the QOS ALLOCATE for the flows 735-738.

In the portion 902 of the BW management system 125 shown in FIG. 9B, the QOS FLOW RESPONSES 7410-7440 illustrate an allocated bandwidth per flow also referred to as a QOS ALLOCATE. The request that is sent by the QOS manager 331 to its associated BW manager 327 (shown in FIG. 7A) includes an aggregate total request size (R) for priority application classes P1, P2 and P3, which were computed by the P1 state tracking module 711, P2 state tracking module 712 and the P3 state tracking module 713, respectively.

Once the bandwidth has been allocated for a flow, referred to a flow share, this information needs to be communicated between the protocol sender and the protocol receiver, also referred to as the sending host and the receiving host, respectively. In various embodiments, the information is communicated to the protocol sender and the protocol receiver by manipulating the TCP window (e.g., the advertised window $W_A$) as described in further detail with the description of FIGS. 10A-10F.

Referring back to FIG. 7A, the WM sub-module 341 includes three groups of WMs. The group of WMs for high priority applications 730 includes WMs 731-734. The group of WMs for medium priority applications 740 includes WMs 741-744. The group of WMs for low priority applications 750 includes WMs 751-754. The flows 735-738 represent P1 flows. The flows 745-748 represent P2 flows. The flows 755-758 represent P3 flows.

Figure 7B:
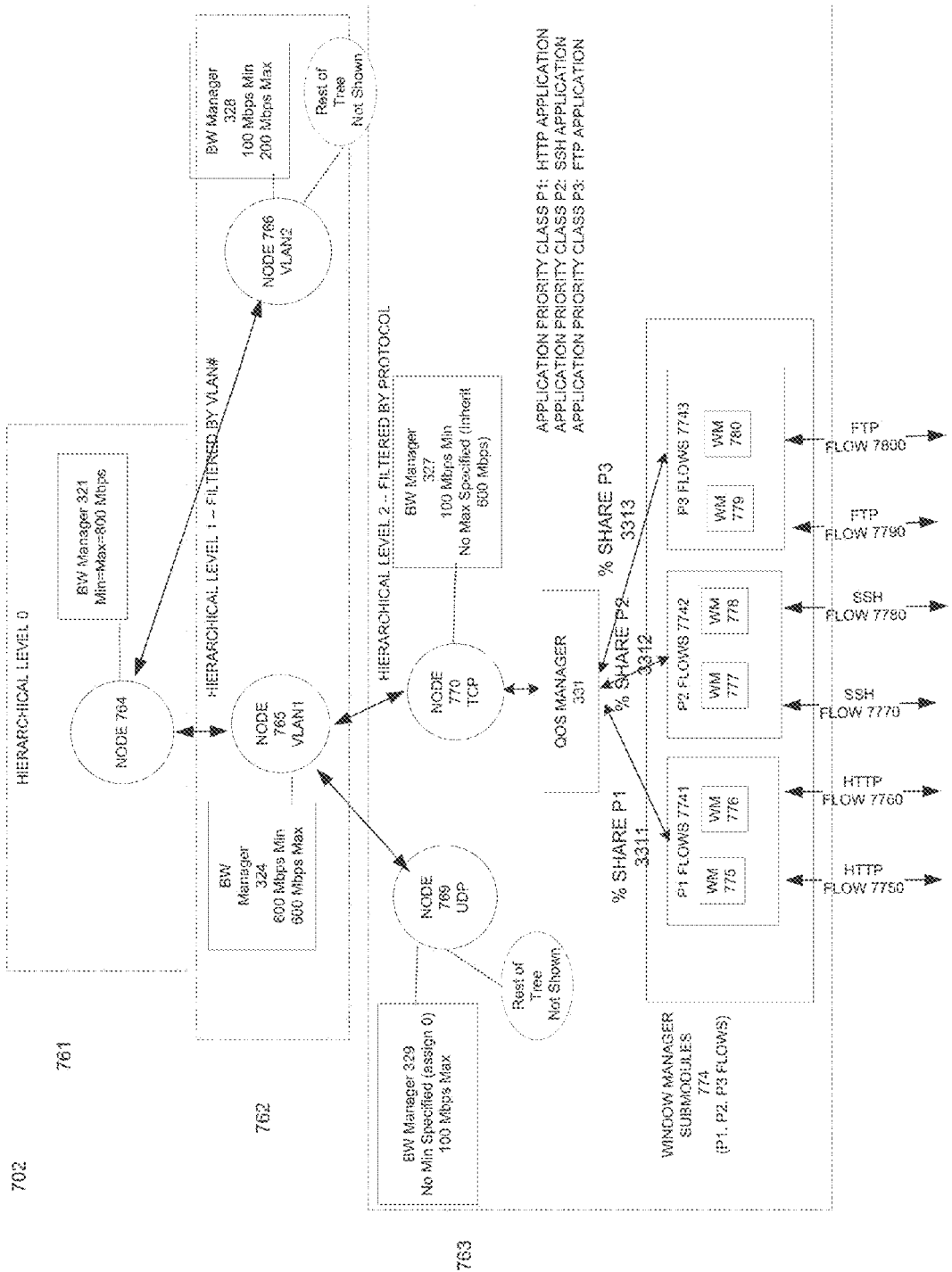
FIG. 7B illustrates a HBT having bandwidth shares allocated and prioritized by a QOS manager, according to example embodiments.
Figure 7C:
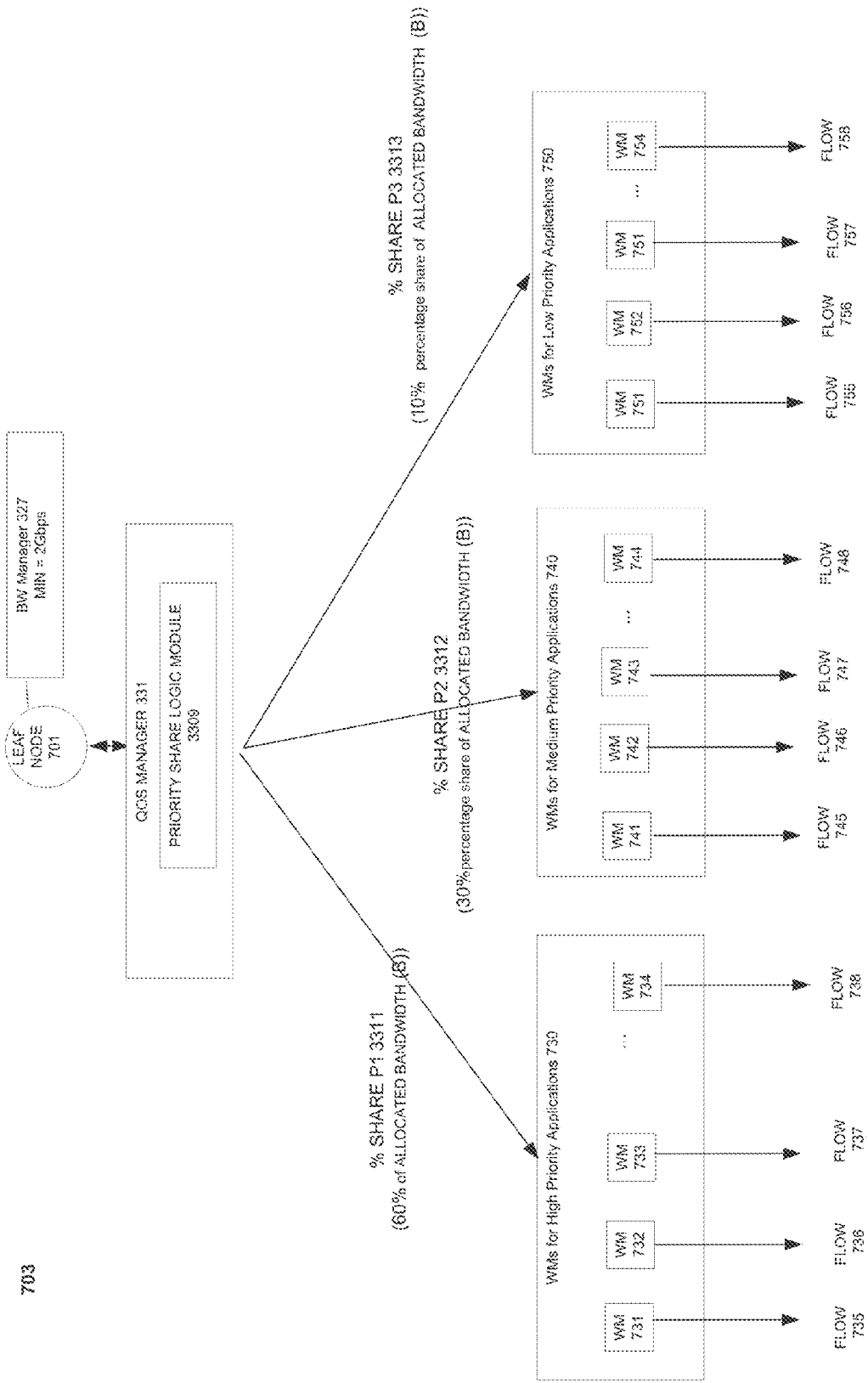
FIG. 7C illustrates a portion of a BW management system associated with a leaf node with allocated application priority shares, according to example embodiments.
Figure 7D:
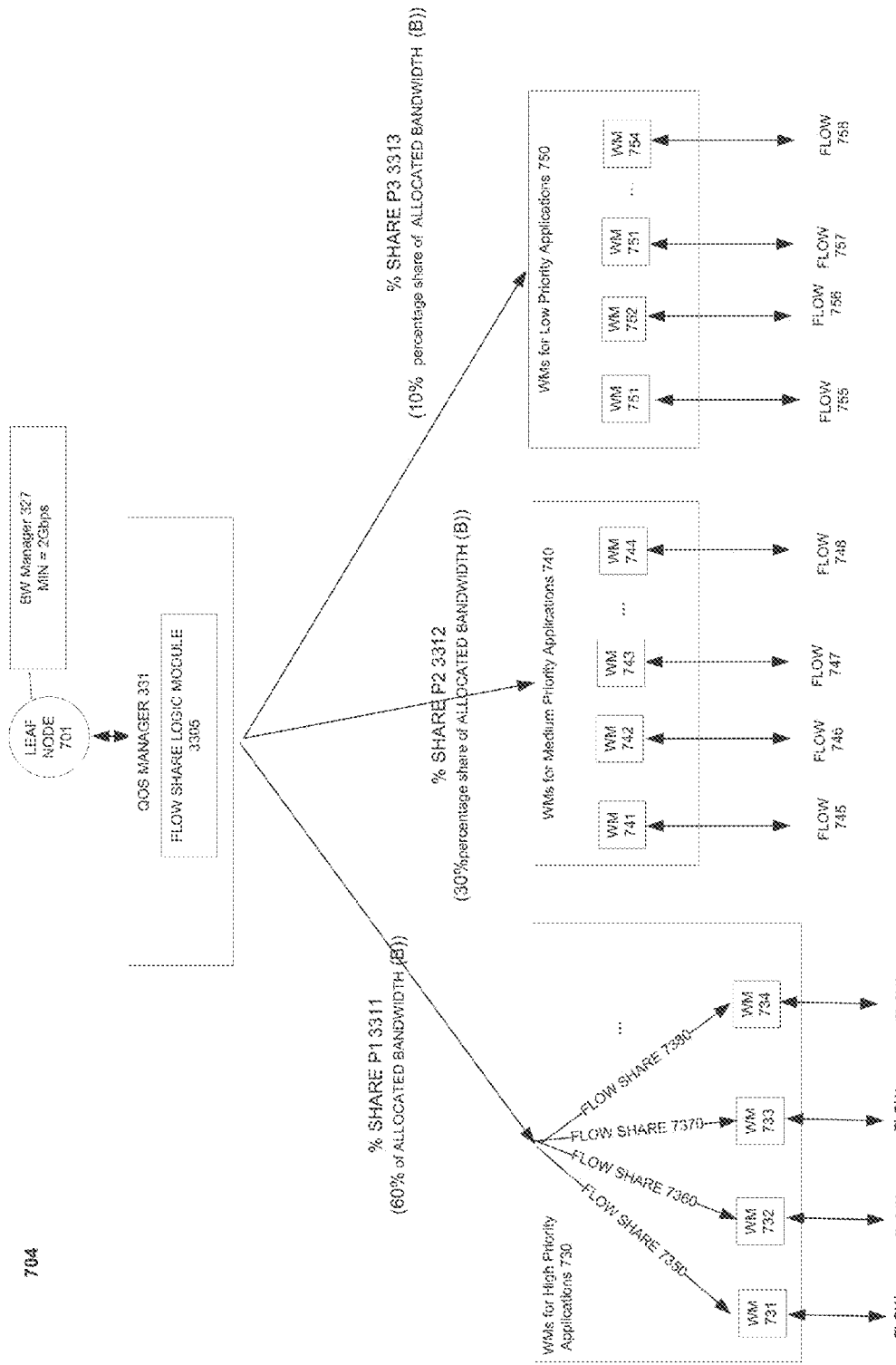
FIG. 7D illustrates a portion of a BW management system associated with a leaf node with allocated flow shares for one of the allocated priority shares, according to an example embodiment.

FIG. 7B illustrates an example of a portion of a HBT 702 having three hierarchical levels, according to an example embodiment. The first level represents a root node 764. The root node 764 corresponds to a traffic class containing all the flows for a server and is configured to have a MAX value of the entire link capacity of the server's network interface. In some embodiments, the MIN value for the root node 764 is also set to the entire link capacity of the server's network interface. The hierarchical level 1 includes nodes 765 and 766, which represent two traffic classes filtered by VLAN#. The node 765 corresponds to the class of traffic defined by VLAN1 and the node 766 corresponds to the class of traffic defined by VLAN2.

The node 765 is configured with a MIN value of 600 Mbps and MAX value of 600 Mbps. The node 766 is configured to have a MIN value of 100 Mbps and a MAX value of 200 Mbps. The bandwidth managers 324 and 328 are responsible for maintaining the appropriate bandwidth usage by all the flows belonging to the traffic classes defined by VLAN 1 and VLAN2.

The hierarchical level 2 represents a third level of the hierarchy. For VLAN1, a traffic class filtered by protocol is represented by nodes 770 and 769. The traffic class for the node 770 is defined by the VLAN1 and TCP protocol. The traffic class for the node 769 is defined by VLAN1 and the UDP protocol. The TCP traffic class corresponding to the node 770 is configured with a MIN value of 100 Mbps. The UDP traffic class corresponding to node 769 is configured with a MAX value of 100 Mbps. This particular configuration results in VLAN1 TCP traffic receiving at least 100 Mbps, and up to 600 Mbps. The VLAN1 UDP traffic receives at most 100 Mbps. For VLAN 2, TCP traffic and UDP traffic receive in aggregate at least 100 Mbps and at most 200 Mbps. For the example shown in FIG. 7B, since node 769 was not configured with a MIN value, a MIN value of 0 (not shown) is assigned by the BW manager 329 to node 769. Additionally, since no MAX value was configured for the node 770, the BW manager 327 assigned a value of 600 Mbps, which was inherited from the parent node of node 770.

Each of the leaf nodes in the FIG. 7B is associated with BW manager, which is associated with a QOS manager. The nodes 769, 766 and 770 represent leaf nodes. The QOS managers associated with the BW managers 328 and 329 are not shown. The QOS manager 331 is associated with the BW manager 327 representing the TCP flows for VLAN1. The QOS manager 331 can be configured to divide the bandwidth assigned to the traffic class (associated with node 770) among different priority classes of applications. For example, the QOS manager 331 for VLAN1 TCP may be configured to treat HTTP traffic as high priority traffic (or P1), SSH traffic as medium priority traffic (P2) and FTP traffic as low priority traffic (P3). The QOS manager 331 allocates a priority application share referred to as a P1 share 3311 to the P1 flows 7741, a priority application share referred to as a P2 share 3312 to the P2 flows 7742, and a priority application share referred to as a P3 share 3313 to the P3 flows 7743. The P1 flows 7741 include two HTTP flows 7750 and 7760 and associated WM 775 and 776, respectively. The P2 flows 7742 include two SSH flows 7770 and 7780 and associated WM 777 and 778, respectively. The P3 flows 7743 include two FTP flows 7790 and 7800 and associated WMs 779 and 780, respectively.

FIG. 7C illustrates a portion 703 of BW management system 125 associated with a leaf node 701, according to an example embodiment. The QOS manager 331 includes a priority share logic module 3309 (also shown in FIG. 3E). The priority share logic module 3309 allocates the bandwidth (assigned by the BW manager 327 to the leaf node 701) among the priority application classes P1, P2, and P3. The bandwidth (B) assigned by the BW manager 327 may be referred to as ALLOCATED BANDWIDTH (B). For the embodiment shown in FIG. 7C, the total ALLOCATED BANDWIDTH (B) is divided into 3 shares by the QOS manager 311 with 60% of B is allocated to the P1 share 3311, 30% of B is allocated to the P2 share 3312, and 10% of B is allocated to the P3 share 3313.

FIG. 7D illustrates a portion of a HBT 704 associated with a leaf node 701, according to an example embodiment. The flow share logic module 3305 (also shown in FIG. 3E) allocates the P1 share of B 3311 among flows 735-738, the P2 share 3312 of B among flows 745-748 of B, and the P3 share 3313 of B among flows 755-758. The P1 share 3311 is divided among the flow shares 7350-7380. The amount of bandwidth allocated to each flow (also referred to as flow share) from the P1, P2, and P3 shares is determined by the mode of operation of the flows associated with the collection of flows associated with a traffic class, and in some embodiments, based on the application priority class (or classification) for P1, P2 or P3. The application priority classes may also be referred to as application priority levels in some embodiments. Examples of modes of operation include NoPressure mode and UnderPressure mode.

In an example embodiment, the QOS manager module 330 includes a plurality of QOS managers each associated with a BW manager 327 for a leaf traffic subclass. The leaf traffic subclass refers to a traffic class of flows associated with a leaf node in a HBT. The plurality of QOS managers 331 may each include a priority share logic module 3309 (shown in FIG. 3E) configured to determine a number of application priority levels associated with the BW manager 327 of the leaf traffic subclass. The number of application priority levels includes at least a first priority level and a second priority level. In some embodiments, an application priority class of flows associated with the first priority level may represent a first application priority class (also referred to as P1), and an application priority class of flows associated with the second priority level may represent a second application priority class (also referred to as P2 ). The priority share logic module 3309 (shown in FIG. 3E) may be configured to allocate a first portion of the bandwidth assigned to the BW manager 327 of the leaf traffic subclass to the first application priority class (P1) of flows and a second portion of the bandwidth assigned to the BW manager 327 of the leaf traffic subclass to the second application priority class (P2) of flows.

Referring to FIG. 3E, in a further embodiment, each QOS manager 331 of the plurality of QOS managers may further include a mode selection module 3306 configured to determine a first mode of operation or a second mode of operation for the flows associated with the first application priority class and the second application priority class, respectively. In another embodiment, the plurality of QOS managers 331 may each further include a flow share logic module 3305 configured to allocate flow shares for the first application priority class based on a mode of operation associated with the application priority class. Examples of modes of operation include a NoPressure mode and an UnderPressure mode. The first application priority class and the second application priority class may be associated with the same or different modes of operation. Different sets of mode operation rules may apply to the different modes of operation.

In some embodiments, the plurality of QOS managers 331 may each include a state tracking module 3303 configured to track a set of priority level values for each of the priority groups. The set of priority level values used by the mode selection module 3306 and the flow share logic module 3305 may to determine the allocated flow shares for the flows from each of the priority groups. In other embodiments, the plurality of QOS managers 331 may each include an interface module 3304 configured to communicate with the WM module 340 and the BW manager module 320.

The TCP protocol uses an end-to-end flow control protocol to prevent having the TCP sender send data too fast for the TCP receiver to receive and process. In other words, flow control is used to limit the rate of flow traffic from a server. The TCP protocol often implements a sliding window flow control protocol, where the TCP receiver specifies (for each TCP segment) in a receive window field the amount of additionally received data (in bytes) that it is willing to buffer for a connection between a TCP sender and TCP receiver. The TCP sender can send only up to that amount of data before it waits for an acknowledgment and window update from the TCP receiver. The receive window shifts each time the TCP receiver receives and acknowledges a new segment of data. Once the TCP receiver runs out of sequence numbers, the sequence number loops back to 0.

The TCP header fields are shown in FIG. 5A and includes an acknowledgement number field 571 (for storing the acknowledgment number), an ACK field 572 (for storing the ACK flag), a window size field 573 (for storing the window size), and a sequence number field 574 (for storing the sequence number). These fields are used when sending a window acknowledgement packet (e.g., 1019 shown in FIG. 10B).

The acknowledgment number (32 bits) represents the next sequence number that the TCP receiver is expecting, if the ACK flag is set. The ACK flag indicates that the acknowledgment number is significant. The acknowledgment number acknowledges receipt of all prior bytes (if any). The first acknowledgement number sent by each end (in an end-to-end connection) acknowledges the other end's initial sequence number itself, but no data. The Transmission Control Protocol (TCP) window size refers to the maximum amount of received data, in bytes, that can be buffered at one time on the receiving side of a connection. The TCP sender can send only that amount of data before waiting for an acknowledgment and window update from the TCP receiver. When a TCP receiver advertises a window size of 0, the TCP sender cannot send more data until receiving a new window size update from the TCP receiver. Various embodiments may implement protocols other than the TCP protocols, and may use other fields and parameters to implement a sliding window to control the rate at which the sending host is transmitting data packets.

FIG. 10A illustrates a diagram 1000 with a host 1001, referred to as a TCP sender, sending a data packet 1005 to a host 1002, referred to as the TCP receiver in an example embodiment. The host 1002 sends a window acknowledgement packet 1006 to advertise the window size of the TCP receiver. The RTT 1003 refers to the estimated round trip time between host 1001 and host 1002.

FIG. 10B illustrates a data packet 1011 being transmitted from the host 1001 to the host 1002 with a vTCP module 109 positioned between the two hosts 1001, 1002. In various embodiments, the vTCP module 109, including the BW management system 125, may be located as shown in FIGS. 2A-2E. The diagram 1010 illustrates the vTCP module 109 deployed between the two hosts (i.e., hosts 1001 and 1002) such that the BW management system 125 accepts data packets on behalf of the host 1002 (TCP receiver) and advertises a window (also referred to as $W_A$) to the host 1001 (TCP sender) indicating the amount of data it is willing to accept in the future. The RTT sender 1014 (also referred to as $RTT_1$) represents the estimated round trip time between the host 1001 and the vTCP module 109 (or the BW management system 125). The RTT receiver 1015 (also referred to as $RTT_2$) represents the estimated round trip time between the vTCP module 109 (or the BW management system 125) and the host 1002.

The size of the advertised window $W_A$ is computed by the BW management system 125 and plays an important role in controlling the rate at which the host (TCP sender) can send data to the hierarchical BW management system 125. As discussed above, the window size generation module 3405 associated with a WM 342, shown in FIG. 3F, may be used to compute the size of the advertised window $W_A$ in example embodiments. In various embodiments, there is a WM (e.g., WM 342) is created for each flow that is responsible for computing how much bandwidth to request (also referred to as WM FLOW REQUEST 3401) from an associated QOS manager (e.g., QOS Manager 331). The amount of bandwidth requested in the flow request (e.g., WM flow request 3401) is described below.

In various embodiments, a WM governs the window size $W_A$ advertised by the BW management system 125 for each flow in an end-to-end connection between a TCP sender (e.g., host 1001) and a TCP receiver (e.g., host 1002). In various embodiments, the WM associated with the flow between the sending host 1001 and the receiving host 1002 computes the size of the window (also referred to as $W_A$) to be advertised to the TCP sender (e.g., host 1001). In further embodiments, the WM also computes how much bandwidth to request from the QOS manager. The amount of bandwidth requested is represented by a WM may be represented by the formula $W_{MAX}/RTT_2$. The amount of bandwidth requested is based on the estimated rate at which the TCP receiver (e.g., host 1002) is receiving the data packets (e.g., data packet 1011'). In various embodiments, the flow logic module 3620 (shown in FIG. 3F) computes $W_A$ and $W_{MAX}/RTT_2$. These computations will be described in further detail below.

Referring to FIG. 10B, the BW management system 125 sends a window acknowledgment packet 1019 to the host 1001, which includes the TCP header fields and payload (or data). The TCP header fields are shown in FIG. 5A, and include an acknowledgement number field 571, an ACK field 572, a window size field 573, and a sequence number field 574. The window acknowledgement packet 1019 (also referred to as the vTCP window acknowledgement packet 1019) includes values in these fields that are used to advertise the available window size ($W_A$) of the vTCP module 109 or the BW management system 125. The window acknowledgement packet 1016 (also referred to as the receive window acknowledgement packet 1016) includes values in these fields that are used to advertise the available window size ($W_A$) of the receiving host 1002.

The data packet 1011 and 1011' also includes window sizes. The window size in data packet 1011' may be different from the window size in data packet 1011. The window size in the data packet 1011' is determined by the BW management system 125 based on the amount of window size the BW management system 125 wants to advertise to the host 1002. The data packet 1011 is temporarily stored in a flow buffer 354 (shown in FIG. 3C) before being forwarded to the receiving host 1002 as data packet 1011'. The BW management system 125 controls when a packet is ready to be forwarded to the receiving host 1002. In various embodiments, the data packet 1011' is forwarded to the receiving host 1002 based on the TCP protocol.

The advertised window size of the BW management system 125 sent to a sending host 1001 is referred to as $W_A$. The window advertised by the BW management system 125 is referred to as $W_A$ and may be calculated by the following equation:

$$W_A = \text{QOS ALLOCATE} * RTT_1$$

where QOS ALLOCATE is the amount of bandwidth allocated in the QOS FLOW RESPONSE 3402.

$W_{MAX}$=an estimated window size based on the minimum of (1) the congestion window ($W_C$) which the BW management system 125 is using to send packets (e.g., data packet 1011') to the receiving host 1002 and (2) the window ($W_R$) advertised by the receiving host 1002 (e.g., in packet 1016)

$RTT_1$=the round trip time between the sending host 1001 and the BW management system 125.

$RTT_2$=the round trip time between the BW management system 125 and the host 1002.

Once the advertised window ($W_A$) of the BW management system 125 is determined and transmitted to the sending host 1001, the sending host 1001 transmits packets to the receiving host 1002 at a rate at which data packets have very little likelihood of being dropped. The advertised window of the BW management system 125, provided in the window acknowledgment packet 1019, ensures that the buffer for this data flow (e.g., the flow buffer 354) is able to accept or buffer data packets 1011 and 1011' without having to drop packets. The size of the flow buffer (e.g., flow buffer 354) is a function of its advertised window size in the window acknowledgment packet 1019 from the BW management system 125.

As mentioned above, the window $W_A$ advertised to the sending host 1001 is represented by $W_A$=QOS ALLOCATE*$RTT_1$. The estimated rate at which the receiving host 1002 is receiving data packets is referred to as $W_{MAX}/RTT_2$. The WM requests bandwidth (referred to as WM FLOW REQUEST 3401 as shown in FIG. 3B) from the QOS manager associated with the flow, equal to the amount of $W_{MAX}/RTT_2$. In various embodiments, the QOS ALLOCATE is computed by the BW management system 125, as described above in further detail.

The WM sends a WM FLOW REQUEST 3401 to request a bandwidth amount of $W_{MAX}/RTT_2$. As described above, the amount of $W_{MAX}/RTT_2$ was computed by the WM. In response to the WM FLOW REQUESTS 3401, the QOS manager associated with the flow provides QOS FLOW RESPONSES 3402. The QOS FLOW RESPONSES 3402 may include an allocated bandwidth (e.g., QOS ALLOCATED) equal to the bandwidth requested in the WM FLOW REQUEST 3401, greater than the bandwidth requested in the WM FLOW REQUEST 3401, or less than the bandwidth requested in the WM FLOW REQUEST 3401. In various embodiments, depending on which mode the QOS manager is operating (e.g., NoPressure mode or UnderPressure mode), the QOS manager can allocate less than, equal to, or greater than the WM FLOW REQUESTS 3401 associated with the collection of flows associated with a traffic class. As described above, a first set of mode operation rules may be used with a first mode of operation (e.g., NoPressure mode) and a second set of mode operation rules may be used with a second mode of operation (e.g., UnderPressure mode). The amount of bandwidth allocated by the QOS manager 331 to a flow in a QOS FLOW RESPONSE 3402 to the WM module 340 is referred to as QOS ALLOCATE.

FIGS. 8A-D illustrate an example of WM FLOW REQUESTS 3401 for the NoPressure mode. FIGS. 9A-9D illustrate an example of QOS FLOW RESPONSES 3402 for the UnderPressure mode.

The WM associated with a flow computes the total window ($W_A$) which can be advertised back to the sending host 1001. In various embodiments, $W_A$=(QOS ALLOCATE)*($RTT_1$). In various embodiments, the QOS logic module 3610 from the QOS manager 331 computes QOS ALLOCATE based on the mode of operation, as discussed in FIGS. 8A-D and 9A-D. The computation of the QOS ALLOCATE is discussed in further detail with FIGS. 8A-8B for the NoPressure mode and FIGS. 9A-9D for the UnderPressure mode. For an example embodiment, the amount of bandwidth requested for a flow (e.g., WM FLOW REQUEST 3401) between the host 1001 and host 1002 is based on $W_{MAX}/RTT_2$. In various embodiments, $W_{MAX}/RTT_2$ represents the full amount of bandwidth requested by an individual flow. In various embodiments, the QOS managers track $W_{MAX}/RTT_2$ over time on a per flow basis as well as the sum of $W_{MAX}/RTT_2$ for all flows by priority level associated with an application priority classification. Once the QOS manager 331 aggregates $W_{MAX}/RTT_2$ for the flows for the various application priority classes, the QOS manager 331 generates an aggregate bandwidth amount (e.g., referred to as the aggregate total request size (R)) that is sent by the QOS manager 331 in a QOS COLLECTION REQUEST 3301 to its associated bandwidth manager.

FIGS. 10C-10F provide an example of tracking the current utilization of flows 1 and 2 based on $W/RTT_2$ to determine the amount of additional bandwidth to request. In the table 1060 shown in FIG. 10E, W in the formula $W/RTT_2$ is equal to $W_{MAX}$.

Referring to FIG. 10F, a leaf node 1070 is associated with two flows, flow 1 and flow 2. It is understood that the number of flows associated with a leaf node may vary. Each of the flows 1 and 2 is associated with a WM 107. Associated with the leaf node 1070 is the BW manager 1071, which has an assigned MIN value of 1 Gbps and a MAX value of 2 Gbps. The window size of flow 1 is managed by WM 1073 and the window size of flow 2 is managed by WM 1074. The WM 1073 tracks the estimated current utilization of flow 1 and the WM 1074 tracks the estimated current utilization of flow 2. For an example embodiment, the bandwidth utilization tracking module 357 may track the estimated current utilization of flows 1 and 2. The QOS manager 1072 allocates the assigned bandwidth of 1 Gbps (e.g., MIN value) for node 1070 among the two flows. The BW manager 1071 monitors the estimated current utilization of bandwidth of the traffic class associated with the leaf node 1070. In this example, the current utilization of bandwidth at the leaf node 1070 equals the sum of the $W_{MAX}/RTT_2$ for flow 1 and flow 2.

FIG. 10C illustrates a diagram 105 showing the input rate 1032 of data packets from flow 1 accepted by the BW management system 125 and the output rate 1042 of data packets from flow 1 from the BW management system 125. The output rate 1042 represents the rate at which the receiving host 1043 is receiving data packets from the BW management system 125 and may be represented by $W_{MAX}/RTT_2$. In FIG. 10C, data packets for flow 1 are sent from the sending host 1001 to the receiving host 1043.

FIG. 10D illustrates the a diagram 1051 showing the input rate 1033 of data packets from flow 2 accepted by the BW management system 125 and the output rate 1044 of data packets from flow 2 from the BW management system 125. In FIG. 10D, data packets are sent from the sending host 1001 to the receiving host 1044. The output rate 1043 represents the rate at which the receiving host 1044 is receiving data packets from the BW management system 125 and may be represented by $W_{MAX}/RTT_2$.

FIG. 10E illustrates a table 1060 that is used to track the estimated current utilization of bandwidth by flows 1 and 2 to determine when the QOS manager 1072 should request bandwidth. The header fields 1061, 1062, 1063, 1064, and 1065 represent the output rate ($W_{MAX}/RTT_2$) at a specified time, the estimated current utilization of flow 1, the estimated current utilization of flow 2, the sum (of the estimated current utilization) of flows 1 and 2, and a comparison of the sum with the MIN, respectively.

In this example, at t=1, the sum of flow 1 and flow 2 is below the MIN amount of 1 Gbps of the BW manager 1071. The BW manager 1071 allocates the requested bandwidth (e.g., in its BW COLLECTION RESPONSE 3302 with an amount referred to as the ALLOCATED BANDWIDTH (B)) to the QOS manager 1072. The QOS manager 1072 in turn allocates the amount of bandwidth it has been allocated to the WMs 1073 and 1074 for the flow 1 and flow 2, respectively.

According to the table 1060, the sum of flows 1 and 2 at t=2 is (1.4 Gbps) is above the MIN value of 1 Gbps. As a result, the QOS manager 1072 may request bandwidth to be allocated to flows 1 and 2. The amount of bandwidth requested is 1.4 Gbps according to an example embodiment. In one embodiment, the QOS manager 1072 sends this request for bandwidth to the BW manager 1071. The QOS manager 1072 is responsible for making sure the response to this bandwidth request from the WMs 1073 and 1074 is within the limits assigned to the leaf node 1070 (e.g., MIN and MAX values).

Although FIGS. 10A-10D illustrate the data packets flowing in one direction, alternative embodiments may include data packets flowing in a bidirectional manner such that each of the hosts is both sending and receiving packets.

In example embodiments, a system includes at least one processor configured to perform operations for processor-implemented modules including a BW management system 125 for allocating the bandwidth for a group of flows. The BW management system 125 is configured to accept data packets for a first individual flow at a flow rate on behalf of a receiving host, sent by a sending host, the group of flows including the first individual flow; compute a window size to be advertised to the sending host, the advertised window size based on an allocated flow share of the first individual flow; transmit an acknowledgment data packet to the sending host, the acknowledgement data packet including the computed window size; and receive data packets for the first individual flow at an adjusted flow rate based on the computed window size.

In some embodiments, the receiving host 1002 represents a TCP receiver and the sending host 1001 represents a TCP sender. In example embodiments, the first individual flow represents a data flow associated with a traffic class of flows from a collection of flows associated with one of the hosts, the traffic class of flows associated with multiple application priority classes.

In further embodiments, the BW management system 125 includes a plurality of WMs associated with the traffic class of flows. Each individual flow in the traffic class of flows has a corresponding WM from the plurality of WMs. The plurality of WMs is configured to compute the window size advertised to the sending host 1001 of an individual flow.

In other embodiments, the estimated rate at which the receiving host 1002 is receiving the data packets is based on a window size ($W_{MAX}$) and a round trip time ($RTT_2$) between the BW management system 125 and the receiving host 1002. The window size $W_{MAX}$ is based on the minimum of (1) a congestion window size of the BW management system 125 used to send the data packets to the receiving host 1002 and (2) the window size advertised by the receiving host 1002. In one example embodiment, the BW management system 125 includes a BW manager 327, a QOS manager 331, and a plurality of WMs associated with the traffic class of flows. The BW manager 327 is configured to manage the bandwidth assigned to the traffic class, the QOS manager 331 is configured to manage the traffic class of flows based on application priority classes, and the plurality of WMs is configured to compute the window size to be advertised to the sending host for the individual flows in the traffic class of flows. The estimated rate at which the receiving host 1002 is receiving the data packets for the first individual flow represents a WM flow request amount for the first individual flow. In this example embodiment, the BW management system 125 is further configured to: send a WM FLOW REQUEST 3401 from a WM associated with the first individual flow to the QOS manager 331 associated with the traffic class of flows; and receive a QOS FLOW RESPONSE 3402 from the QOS manager 331 associated with the traffic class of flows. The QOS FLOW RESPONSE 3402 includes an allocated bandwidth flow share (also referred to as QOS ALLOCATE) equal to, greater than, or less than the WM FLOW REQUEST 3401 amount.

In another example embodiment, the BW management system 125 includes a BW manager 327, a QOS manager 331, and a plurality of WMs associated with the traffic class of flows. The BW manager 327 is configured to manage the bandwidth assigned to the traffic class, the QOS manager 331 is configured to manage the traffic class of flows based on application priority classes, and the plurality of WMs is configured to compute the window size to be advertised to the sending host for the individual flows in the traffic class of flows. The estimated rate at which the receiving host 1002 is receiving the data packets for the first individual flow represents the bandwidth request in a WM FLOW REQUEST 3401 for the first individual flow. In this example embodiment, the BW management system 125 is further configured to: send a WM FLOW REQUEST 3401 from a WM associated with the first individual flow to the QOS manager 331 associated with the traffic class of flows; send a QOS COLLECTION REQUEST 3301 for the collection of flows to the BW manager 327 associated with the traffic class of flows; receive a BW COLLECTION RESPONSE 3302 for the collection of flows from the BW manager 327 associated with the traffic class of flows; and receive a QOS FLOW RESPONSE 3402 from the QOS manager 331 for individual flows associated with the traffic class of flows, the QOS FLOW RESPONSE 3402 including an allocated bandwidth flow share equal to, greater than, or less than the bandwidth indicated in the WM FLOW REQUEST 3401.

In further embodiments, the WM associated with the first individual flow is configured to compute a new window size to be advertised to the sending host 1001 based on the allocated bandwidth flow share (i.e., the QOS ALLOCATE) from the QOS FLOW RESPONSE 3402 and the round trip time ($RTT_1$) between the sending host 1001 and the BW management system 125; transmit a new acknowledgment data packet to the sending host 1001, the new acknowledgement data packet including the computed new window size; and receive data packets at a newly adjusted flow rate based on the computed new window size.

FIGS. 11A-11H illustrate flow diagrams for various embodiments. In various embodiments, additional operations may be added to each of the flow diagrams 1100-1170, or one or more operations may be deleted from each of the flow diagrams 1100-1170. In further embodiments, the operation of flow diagrams 1100-1170, or variants of these flow diagrams 1100-1170, may be combined. The operations performed in the flow diagrams 1100-1170 may be performed by one or more components or modules within the BW management system 125 or the vTCP module 109.

Figure 11A:
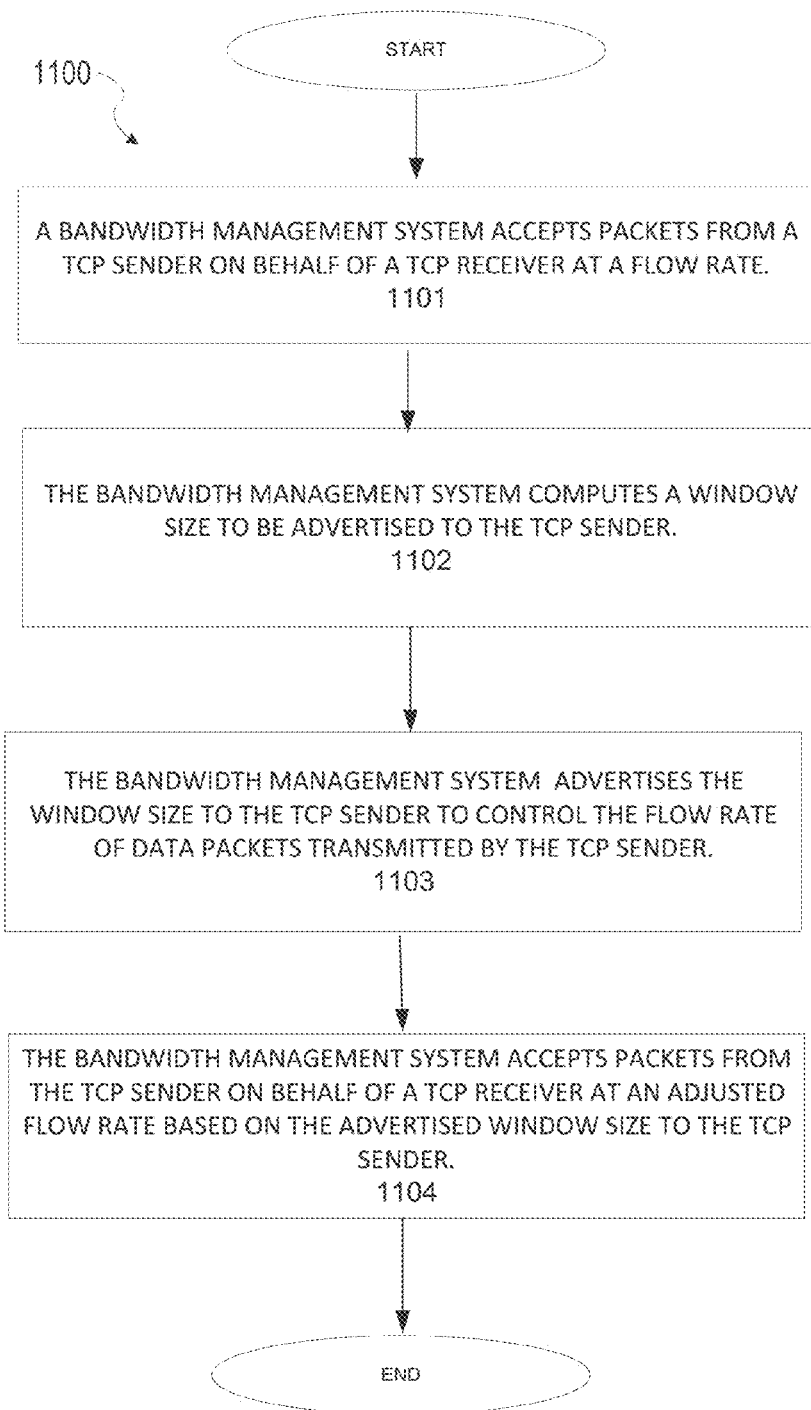
FIG. 11A illustrates an example flow diagram of a method of accepting packets from a TCP sender on behalf of a TCP receiver.

FIG. 11A is a flow diagram 1100 illustrating an example method for controlling the rate of data packets transmitted by a TCP sender (host 1001) to a TCP receiver, host 1002, according to an example embodiment. The flow diagram 1100 includes operations 1101-1104. At operation 1101, a BW management system 125 accepts packets from a TCP sender, host 1001, on behalf of a TCP receiver, host 1002, at a flow rate. At operation 1102, the BW management system 125 computes a window size to be advertised to the TCP sender, host 1001. At operation 1103, the BW management system 125 advertises the window size to the TCP sender, host 1001, to control the flow rate of data packets transmitted by the TCP sender, host 1001. At operation 1104, the BW management system 125 accepts packets from the TCP sender, host 1001, on behalf of a TCP receiver, host 1002, at an adjusted flow rate based on the advertised window size to the TCP sender, host 1001.

Figure 11B:
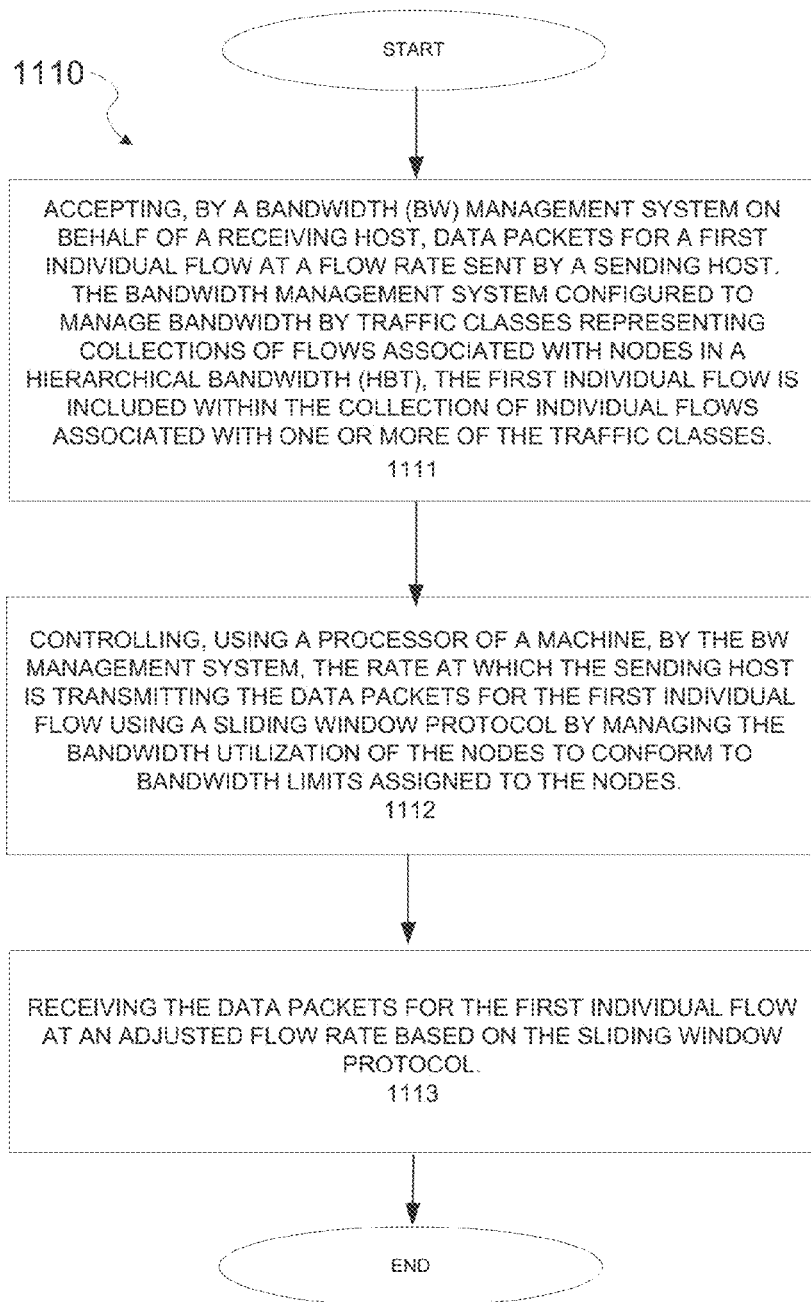
FIG. 11B illustrates an example flow diagram of a method for controlling the rate at which the sending host is transmitting the data packets using a sliding window protocol, according to one embodiment.

FIG. 11B is a flow diagram 1110 illustrating an example method for controlling the rate at which the sending host is transmitting the data packets using a sliding window protocol, according to one embodiment. The flow diagram 1110 includes operations 1111-1113. At operation 1111, accepting, by a BW management system on behalf of a receiving host, data packets for a first individual flow at a flow rate sent by a sending host, the bandwidth management system configured to manage bandwidth by traffic classes representing collections of flows associated with nodes in a HBT. The first individual flow is included within the collection of individual flows associated with one or more of the traffic classes. At operation 1112, controlling, using a processor of a machine, by the BW management system 125, the rate at which the sending host is transmitting the data packets for the first individual flow using a sliding window protocol by managing the bandwidth utilization of the nodes to conform to bandwidth limits assigned to the nodes. At operation 1113, receiving the data packets for the first individual flow at an adjusted flow rate based on the sliding window protocol. In an example embodiment, controlling by the BW management system 125 the rate at which the sending host is transmitting the data packets for the first individual flow using a sliding window protocol includes managing bandwidth allocation associated with the traffic classes based on application priority classifications assigned to the individual flows in the collection of individual flows associated with the traffic classes.

In other embodiments, the traffic classes include a plurality of traffic classes representing collections of individual flows associated with a plurality of nodes from the nodes in the HBT and a universal traffic class represents a root node from the nodes in the HBT. In further embodiments, the universal traffic class represents the root node having a collection of flows associated with a server machine. The universal traffic class is divided into the plurality of traffic classes represented by the plurality of nodes. The plurality of nodes representing subsets of the collection of individual flows associated with the universal traffic class.

In some embodiments, the receiving host represents a transmission control protocol (TCP) receiver and the sending host represents a TCP sender. In other embodiments, at least one of the sending host and the receiving host represents a virtualized resource associated with the server machine. In alternative embodiments, at least one of the sending host and the receiving host represents docker instances.

In example embodiments, controlling, by the BW management system 125, the rate at which the sending host is transmitting the data packets for the first individual flow using the sliding window protocol includes computing, by the BW management system 125, a window size $W_A$ to be advertised to the sending host. The advertised window size $W_A$ is based on a bandwidth response to a bandwidth request for the first individual flow. In other examples, computing, by the BW management system 125, a window size $W_A$ to be advertised to the sending host includes computing the bandwidth request (e.g., WM FLOW REQUEST 3401) for the first individual flow based on an estimated rate at which the receiving host is receiving the accepted data packets from the BW management system 125 for the first individual flow. In other examples, the estimated rate at which the receiving host is receiving the accepted data packets is based on the minimum of the congestion window $W_C$ which the BW management system 125 is using to send the accepted data packets to the receiving host and the window advertised by the receiving host $W_R$, and a round trip time $RTT_2$ between the BW management system 125 and the receiving host for the first individual flow.

In other example embodiments, determining a window size $W_A$ for an individual flow includes transmitting an acknowledgment data packet to the sending host, the acknowledgement data packet including the computed window size $W_A$ and receiving data packets for the first individual flow at an adjusted flow rate based on the computed window size $W_A$.

Figure 11C:
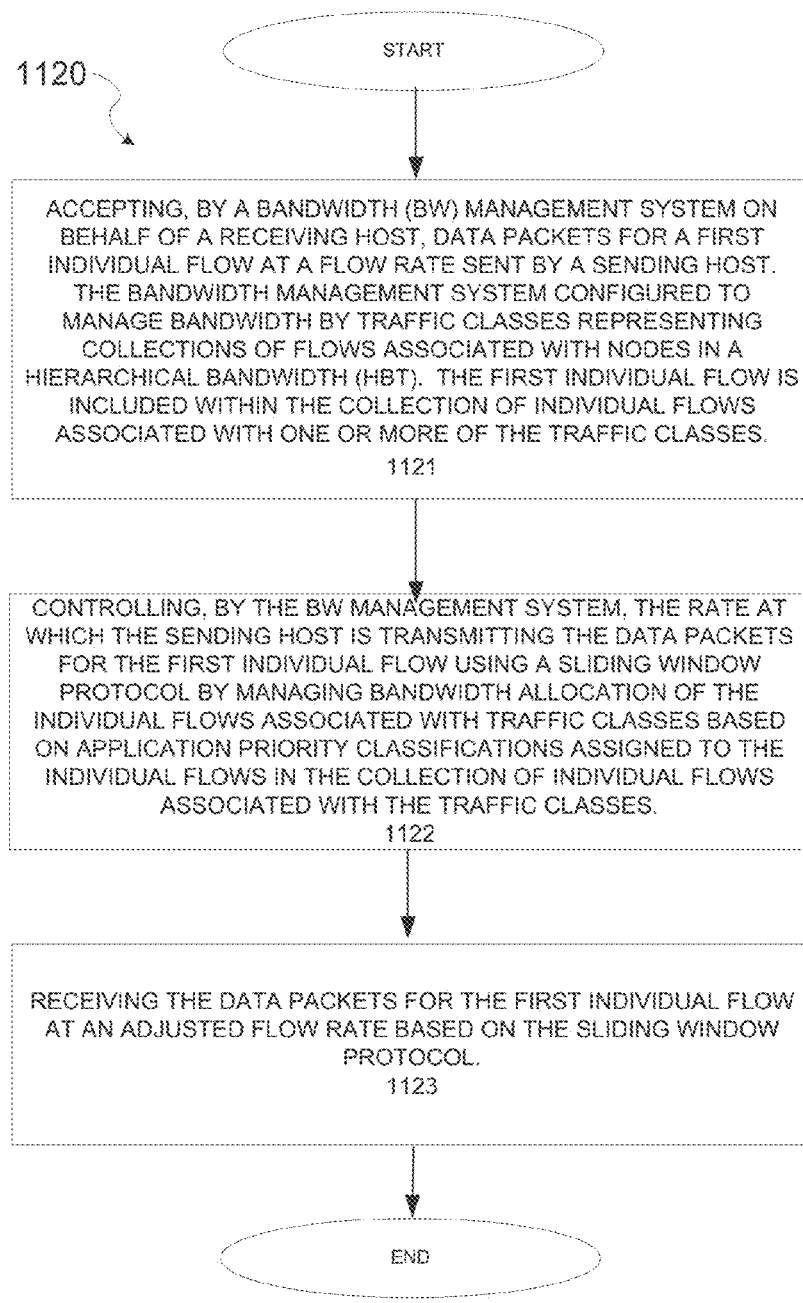
FIG. 11C illustrates an example flow diagram of a method for controlling the rate at which the sending host is transmitting the data packets using a sliding window protocol, according to another embodiment.

FIG. 11C is a flow diagram 1120 illustrating an example method for controlling the rate at which the sending host is transmitting the data packets using a sliding window protocol, according to another embodiment. The flow diagram 1120 includes operations 1121-1123. At operation 1121, accepting, by a BW management system 125 on behalf of a receiving host, data packets for a first individual flow at a flow rate sent by a sending host. The bandwidth management system 125 is configured to manage bandwidth by traffic classes representing collections of flows associated with nodes in a HBT. The first individual flow is included within the collection of individual flows associated with one or more of the traffic classes. At operation 1122, controlling, by the BW management system 125, the rate at which the sending host is transmitting the data packets for the first individual flow using a sliding window protocol by managing bandwidth allocation of the individual flows associated with traffic classes based on application priority classifications assigned to the individual flows in the collection of individual flows associated with the traffic classes. At operation 1123, receiving the data packets for the first individual flow at an adjusted flow rate based on the sliding window protocol.

In further example embodiments, controlling, by the BW management system 125, the rate at which the sending host is transmitting the data packets for the first individual flow using the sliding window protocol includes controlling, by the BW management system 125, the rate at which the sending host is transmitting the data packets for the first individual flow using a sliding window protocol by managing the bandwidth utilization of the nodes to conform to bandwidth limits assigned to the nodes. In other example embodiments, the traffic classes includes a plurality of traffic classes representing collections of individual flows associated with a plurality of nodes from the nodes in the HBT and a universal traffic class represents a root node from the nodes in the HBT. The universal traffic class represents the root node having a collection of flows associated with a server machine. The universal traffic class is divided into the plurality of traffic classes represented by the plurality of nodes. The plurality of nodes represent subsets of the collection of individual flows associated with the universal traffic class.

Figure 11D:
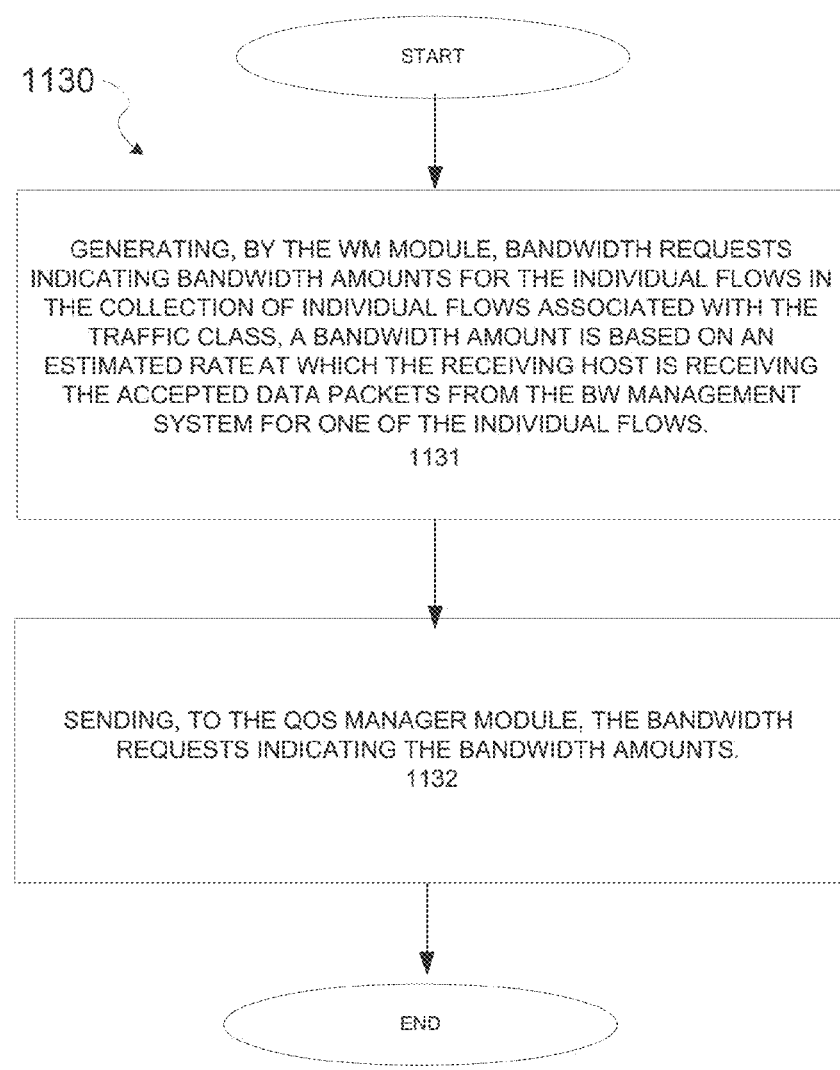
FIG. 11D illustrates an example flow diagram of a method for determining a bandwidth request per flow, according to one embodiment, according to one embodiment.

FIG. 11D is a flow diagram 1130 illustrating an example method for determining a bandwidth request per flow, according to one embodiment. The flow diagram 1130 includes operations 1131-1132. At operation 1131, generating, by the WM module 340, bandwidth requests indicating bandwidth amounts for the individual flows in the collection of individual flows associated with the traffic class. In various embodiments, the WM FLOW REQUESTS 3401 represents the bandwidth requests. A bandwidth amount is based on an estimated rate at which the receiving host is receiving the accepted data packets from the BW management system 125 for one of the individual flows. At operation 1132, sending, to the QOS manager module 330, the bandwidth requests indicating the bandwidth amounts.

Figure 11E:
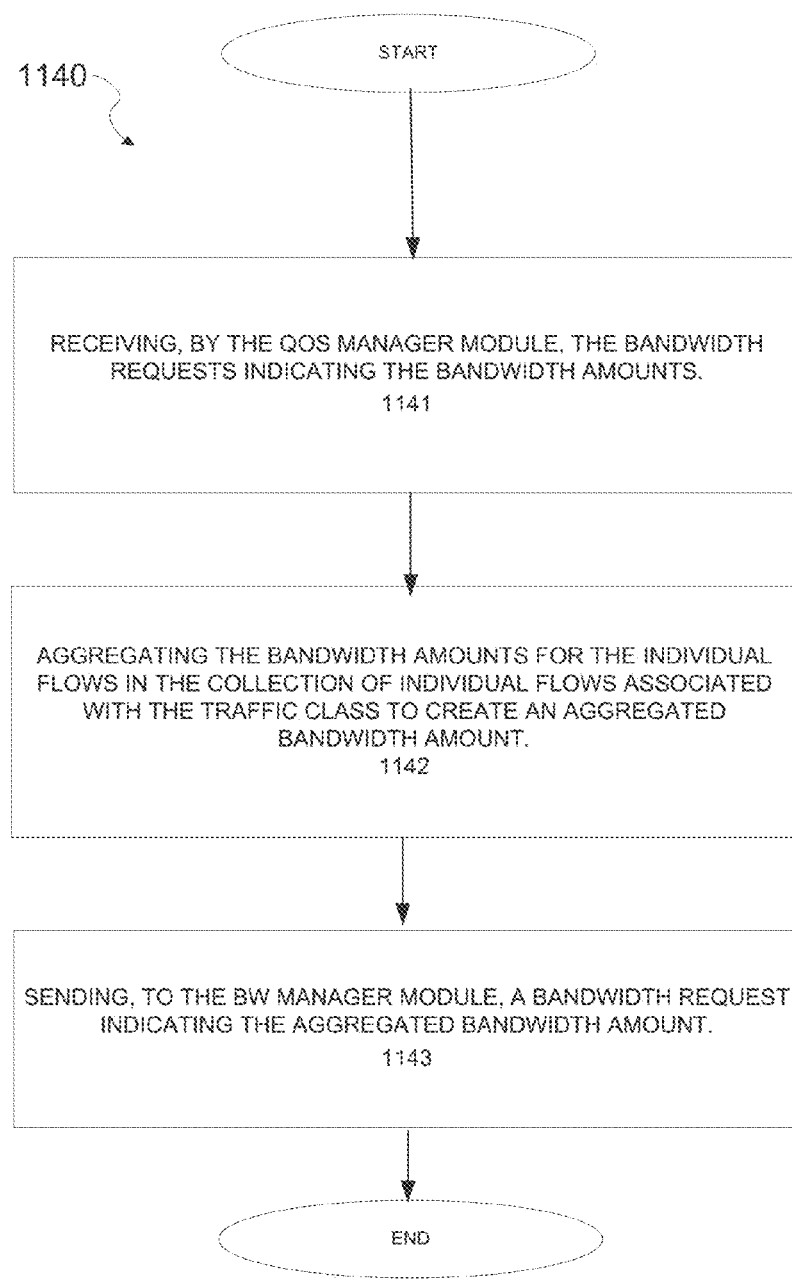
FIG. 11E illustrates an example flow diagram of a method for determining a bandwidth request for a collection of flows, according to one embodiment.

FIG. 11E is a flow diagram 1140 illustrating an example method for determining a bandwidth request for a collection of flows, according to one embodiment. The flow diagram 1140 includes operations 1141-1143. At operation 1141, receiving, by the QOS manager module 330, the bandwidth requests indicating the bandwidth amounts. In various embodiments, the WM FLOW REQUEST 3401 represents the bandwidth request. At operation 1142, aggregating the bandwidth amounts for the individual flows in the collection of individual flows associated with the traffic class to create an aggregated bandwidth amount. At operation 114, sending, to the BW manager module 320, a bandwidth request indicating the aggregated bandwidth amount. In various embodiments, the QOS COLLECTION REQUEST 3301 represents the bandwidth request indicating the aggregated bandwidth amount.

Figure 11F:
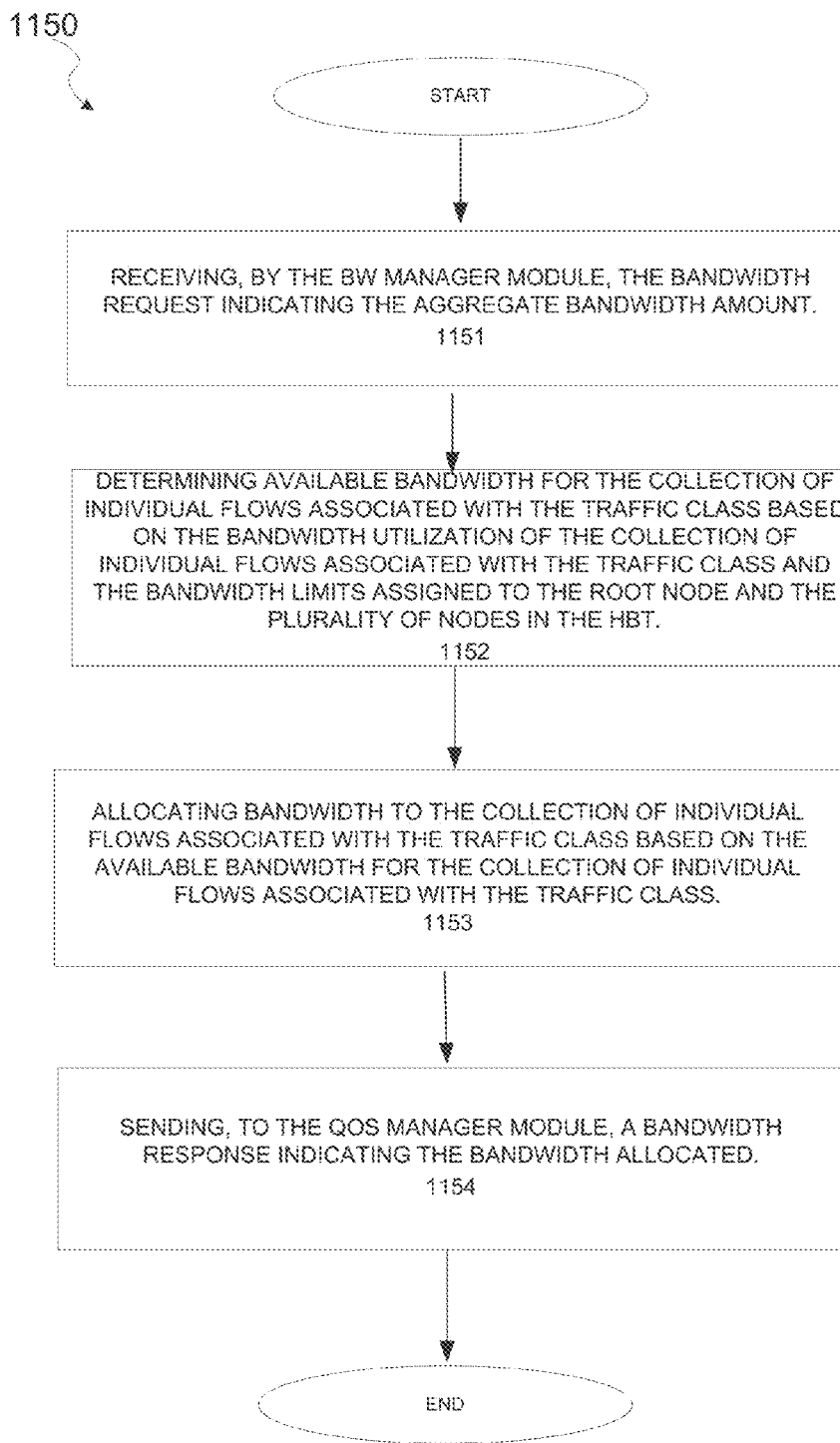
FIG. 11F illustrates an example flow diagram of a method for determining a bandwidth response per a collection of flows, according to one embodiment.

FIG. 11F is a flow diagram 1150 illustrating an example method for determining a bandwidth response per a collection of flows, according to one embodiment. The flow diagram 1150 includes operations 1151-1154. At operation 1151, receiving, by the BW manager module 320, the bandwidth request indicating the aggregate bandwidth amount. For various embodiments, the QOS COLLECTION REQUEST 3301 represents the bandwidth request indicating the aggregate bandwidth amount. At operation 1152, determining available bandwidth for the collection of individual flows associated with the traffic class based on the bandwidth utilization of the collection of individual flows associated with the traffic class and the bandwidth limits assigned to the root node and the plurality of nodes in the HBT. At operation 1153, allocating bandwidth to the collection of individual flows associated with the traffic class based on the available bandwidth for the collection of individual flows associated with the traffic class. At operation 1154, sending, to the QOS manager module 330, a bandwidth response indicating the bandwidth allocated. For various embodiments, the QOS FLOW RESPONSE 3402 represents the bandwidth response indicating the bandwidth allocated.

Figure 11G:
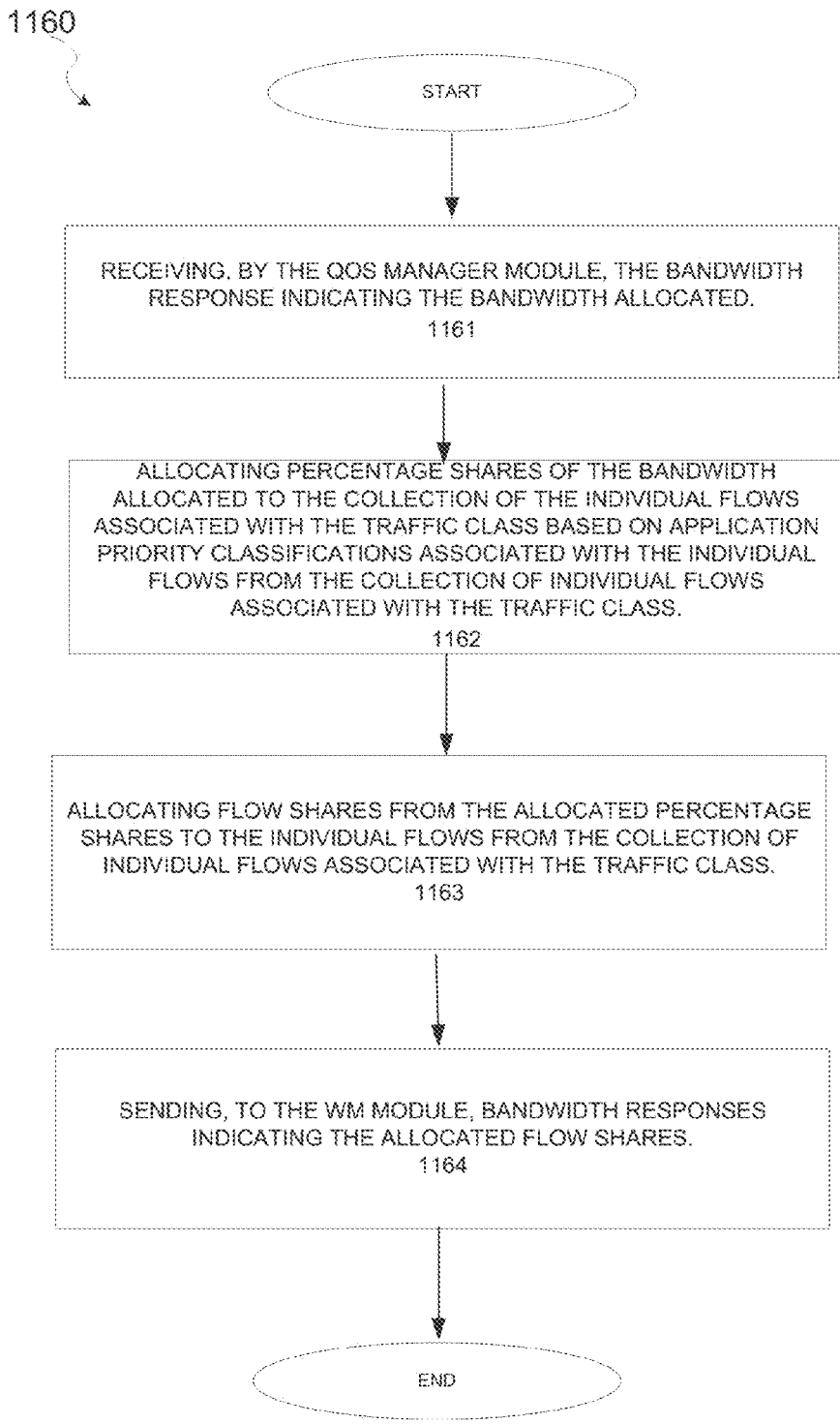
FIG. 11G illustrates an example flow diagram of a method for determining a bandwidth response per flow, according to one embodiment.

FIG. 11G is a flow diagram 1160 illustrating an example method for determining a bandwidth response per flow, according to one embodiment. The flow diagram 1130 includes operations 1161-1134. At operation 1161, receiving, by the QOS manager module 330, the bandwidth response indicating the bandwidth allocated. In various embodiments, the BW COLLECTION RESPONSE 3302 represents the bandwidth response indicating the bandwidth allocated. At operation 1162, allocating percentage shares of the bandwidth allocated to the collection of the individual flows associated with the traffic class based on application priority classifications associated with the individual flows from the collection of individual flows associated with the traffic class. At operation 1163, allocating flow shares from the allocated percentage shares to the individual flows from the collection of individual flows associated with the traffic class. At operation 1164, sending, to the WM module 340, bandwidth responses indicating the allocated flow shares. In various embodiments, the QOS FLOW RESPONSE 3402 represents the bandwidth responses indicating the allocated flow shares.

Figure 11H:
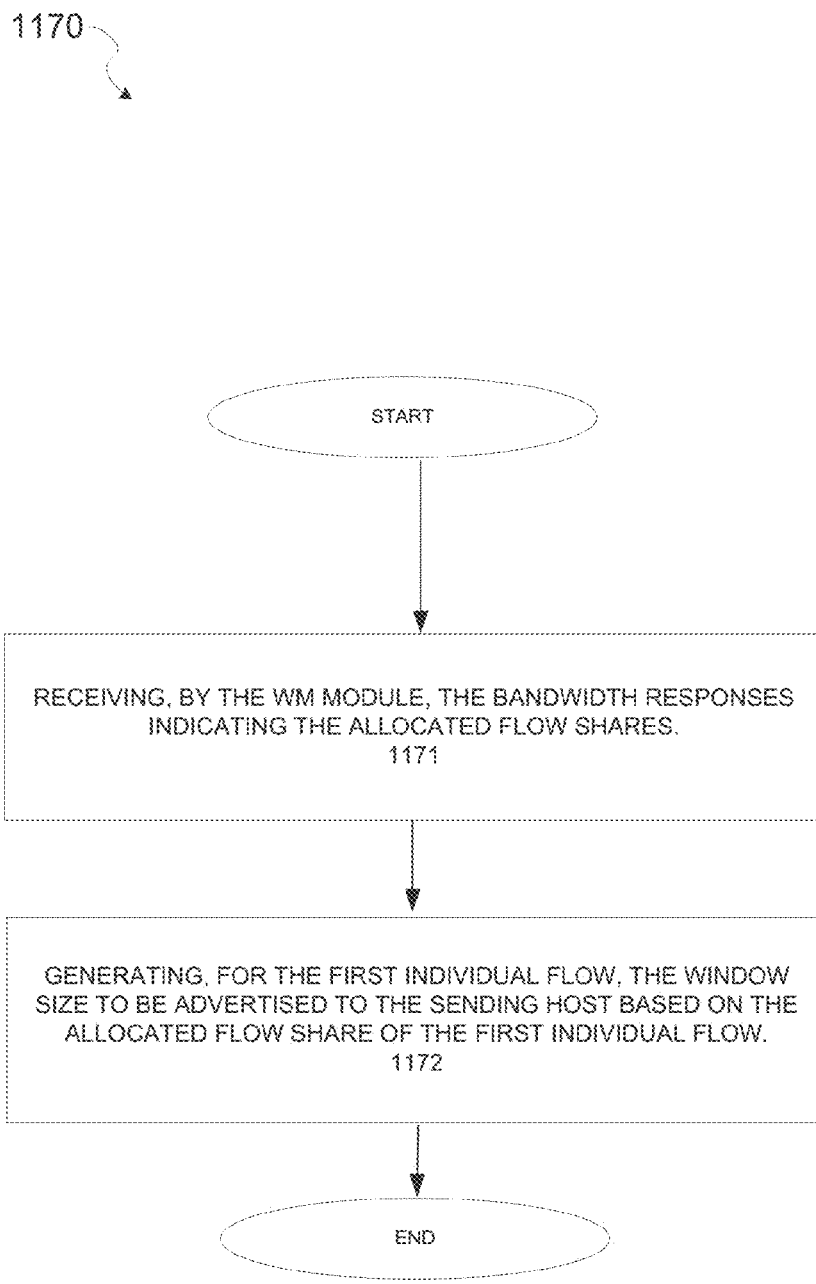
FIG. 11H illustrates an example flow diagram of a method for generating a window size for an individual flow, according to one embodiment.

FIG. 11H is a flow diagram 1170 illustrating an example method for generating a window size for an individual flow, according to one embodiment. The flow diagram 1130 includes operations 1171-1172. At operation 1171, receiving, by the WM module 340, the bandwidth responses indicating the allocated flow shares. In various embodiments, the QOS FLOW RESPONSE 3402 represents the bandwidth responses indicating the allocated flow shares. At operation 1172, generating, for the first individual flow, the window size $W_A$ to be advertised to the sending host. In various embodiments, $W_A$ represents the window size to be advertised to the sending host.

Figure 12:
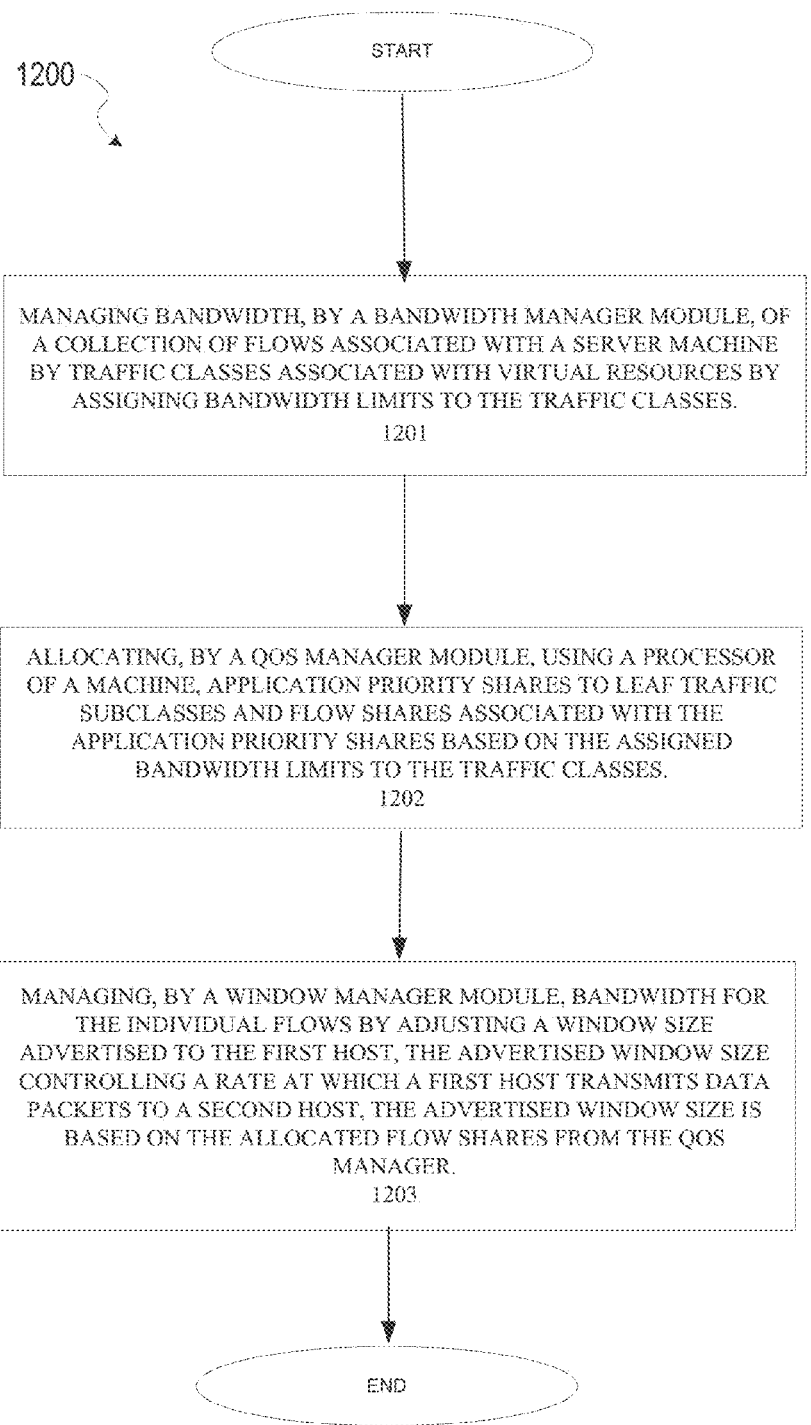
FIG. 12 illustrates an example flow diagram of a method for managing bandwidth for a collection of flows associated with a server machine, according to one embodiment.

FIG. 12 is a flow diagram 1200 illustrating an example method for managing bandwidth for a collection of flows associated with a server machine, according to one embodiment. The flow diagram 1200 includes operations 1201-1203.

Operation 1201 includes managing bandwidth, by a BW manager module, of a collection of flows associated with a server machine by traffic classes by assigning bandwidth limits to the traffic classes. In various embodiments, each of the flows represents an end-to-end connection between a first host and a second host. In further embodiments, the traffic classes include leaf traffic subclasses representing a traffic class at the lowest level of a HBT.

At operation 1202, a QOS manager module 330 allocates, using a processor of a machine, application priority shares to the leaf traffic subclasses and flow shares associated with the application priority shares based on the assigned bandwidth limits to the traffic classes.

At operation 1203, a WM module 340 manages bandwidth for the individual flows by adjusting a window size $W_A$ advertised to the first host, the advertised window size $W_A$ controlling a rate at which the first host transmits data packets to the second host, the advertised window size $W_A$ based on the allocated flow shares from the QOS manager module 330.

In example embodiments, managing bandwidth of the collection of flows, by the BW manager module 330, includes creating a plurality nodes, each of the nodes representing one of the traffic classes in a HBT; creating a BW manager associated with each of the plurality of nodes; assigning MIN values to the nodes, the MIN values representing bandwidth reservations assigned to the collection of flows associated with the traffic class at the nodes during configuration. In other embodiments, during operations, the BW manager module 330 compares current utilization of the collection of flows associated with the traffic class at the nodes with the MIN values assigned to the nodes; and identifying when the current utilization of the collection of flows associated with the traffic class at the nodes is expected to exceed the MIN values assigned to the nodes.

In another example embodiments, managing bandwidth of the collection of flows, by the BW manager module 330, includes receiving a bandwidth request (e.g., QOS COLLECTION REQUEST 3301) from a bandwidth manager associated with a first node associated with a first traffic class; determining available bandwidth from the assigned bandwidth limits associated with the first traffic class; and reallocating the available bandwidth from the first traffic class to the bandwidth manager associated with the first node.

Certain embodiments are described herein as including logic or a number of components, modules, or mechanisms. Modules may constitute either software modules (e.g., code embodied on a machine-readable medium or in a transmission signal) or hardware modules. In various embodiments, the modules described in FIGS. 1-10 for example, are specially configured to perform the operations described in the specification. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. Fr example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Figure 13:
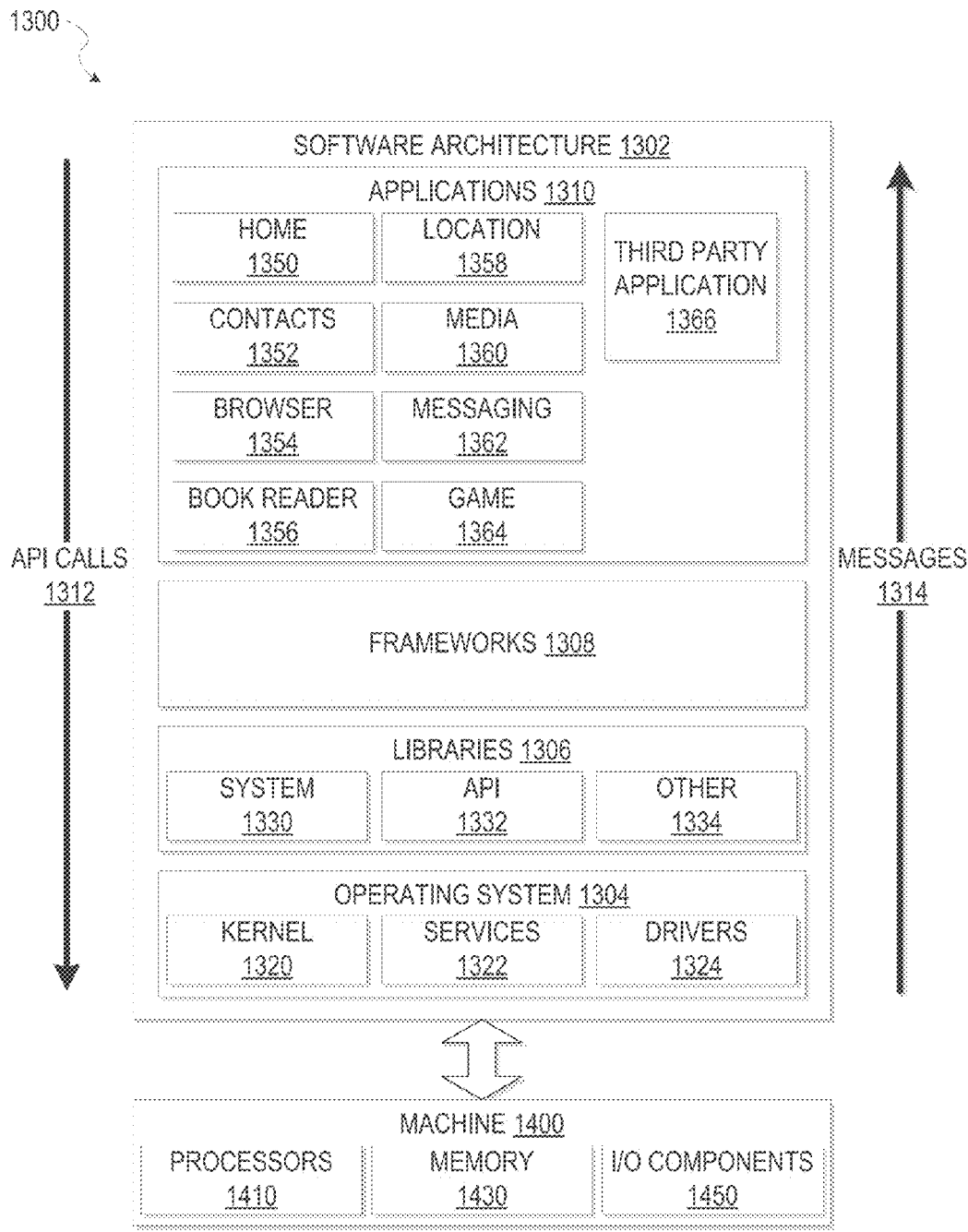
FIG. 13 is a block diagram illustrating an example of a software architecture that may be installed on a machine, according to some example embodiments.

FIG. 13 is a block diagram 1300 illustrating architecture of software 1302, which may be installed on any one or more of the devices described above. FIG. 13 is merely a non-limiting example of a software architecture and it will be appreciated that many other architectures may be implemented to facilitate the functionality described herein. The software 1302 may be executing on hardware such as machine 1400 of FIG. 14 that includes processors 1410, memory 1430, and I/O components 1450. In the example architecture of FIG. 13, the software 1302 may be conceptualized as a stack of layers where each layer may provide particular functionality. For example, the software 1302 may include layers such as an operating system 1304, libraries 1306, frameworks 1308, and applications 1310. Operationally, the applications 1310 may invoke API calls 1312 through the software stack and receive messages 1314 in response to the API calls 1312.

The operating system 1304 may manage hardware resources and provide common services. The operating system 1304 may include, for example, a kernel 1320, services 1322, and drivers 1324. The kernel 1320 may act as an abstraction layer between the hardware and the other software layers. For example, the kernel 1320 may be responsible for memory management, processor management (e.g., scheduling), component management, networking, security settings, and so on. The services 1322 may provide other common services for the other software layers. The drivers 1324 may be responsible for controlling or interfacing with the underlying hardware. For instance, the drivers 1324 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth.

The libraries 1306 may provide a low-level common infrastructure that may be utilized by the applications 1310. The libraries 1306 may include system libraries 1330 (e.g., C standard library) that may provide functions such as memory allocation functions, string manipulation functions, mathematic functions, and the like. In addition, the libraries 1306 may include API libraries 1332 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 1306 may also include a wide variety of other libraries 1334 to provide many other APIs to the applications 1310.

The frameworks 1308 may provide a high-level common infrastructure that may be utilized by the applications 1310. For example, the frameworks 1308 may provide various graphic user interface (GUI) functions, high-level resource management, high-level location services, and so forth. The frameworks 1308 may provide a broad spectrum of other APIs that may be utilized by the applications 1310, some of which may be specific to a particular operating system or platform.

The applications 1310 include a home application 1350, a contacts application 1352, a browser application 1354, a book reader application 1356, a location application 1358, a media application 1360, a messaging application 1362, a game application 1364, and a broad assortment of other applications such as third party application 1366. In a specific example, the third party application 1366 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third party application 1366 may invoke the API calls 1312 provided by the mobile operating system 1304 to facilitate functionality described herein.

Figure 14:
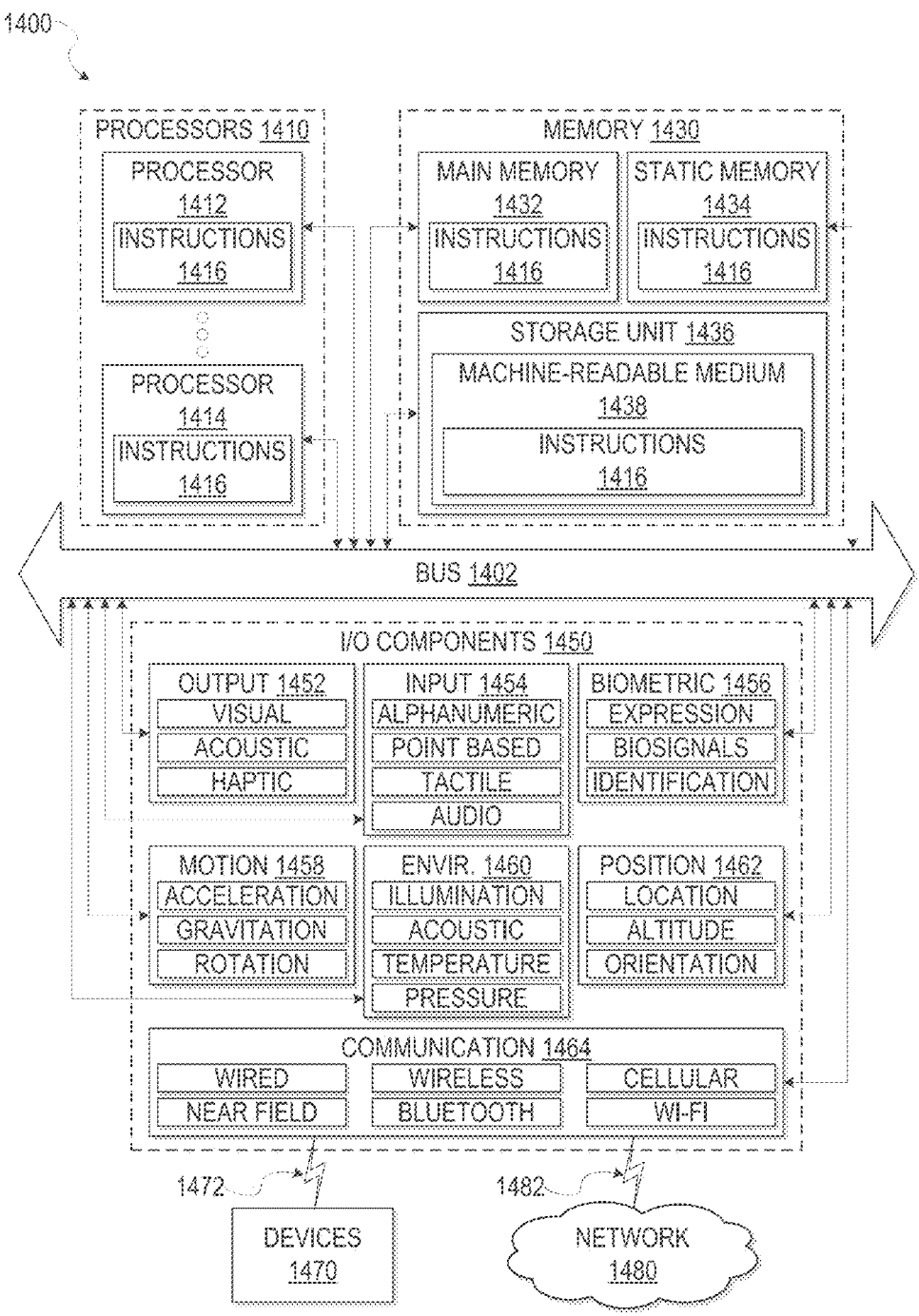
FIG. 14 illustrates a diagrammatic representation of a machine in the form of a computer system within which a set of instructions may be executed for causing the machine to perform any one or more of the methodologies discussed herein, according to an example embodiment.

FIG. 14 is a block diagram illustrating components of a machine 1400, according to some example embodiments, able to read instructions from a machine-readable medium (e.g., a machine-readable storage medium) and perform any one or more of the methodologies discussed herein. Specifically, FIG. 14 shows a diagrammatic representation of the machine 1400 in the example form of a computer system, within which instructions 1416 (e.g., software, a program, an application, an applet, an app, or other executable code) for causing the machine 1400 to perform any one or more of the methodologies discussed herein may be executed. In alternative embodiments, the machine 1400 operates as a standalone device or may be coupled (e.g., networked) to other machines. In a networked deployment, the machine 1400 may operate in the capacity of a server machine or a client machine in a server-client network environment, or as a peer machine in a peer-to-peer (or distributed) network environment. The machine 1400 may comprise, but not be limited to, a server computer, a client computer, a PC, a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1416, sequentially or otherwise, that specify actions to be taken by machine 1400. Further, while only a single machine 1400 is illustrated, the term "machine" shall also be taken to include a collection of machines 1400 that individually or jointly execute the instructions 1416 to perform any one or more of the methodologies discussed herein.

The machine 1400 may include processors 1410, memory 1430, and input/output (I/O) components 1450, which may be configured to communicate with each other via a bus 1402. In an example embodiment, the processors 1410 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, processor 1412 and processor 1414 that may execute instructions 1416. The term "processor" is intended to include multi-core processor that may comprise two or more independent processors (also referred to as "cores") that may execute instructions contemporaneously. Although FIG. 14 shows multiple processors 1410, the machine 1400 may include a single processor with a single core, a single processor with multiple cores (e.g., a multi-core process), multiple processors with a single core, multiple processors with multiples cores, or any combination thereof.

The memory 1430 may include a main memory 1432, a static memory 1434, and a storage unit 1436 accessible to the processors 1410 via a bus 1402. The storage unit 1436 may include a machine-readable medium 1438 on which is stored the instructions 1416 embodying any one or more of the methodologies or functions described herein. The instructions 1416 may also reside, completely or at least partially, within the main memory 1432, within the static memory 1434, within at least one of the processors 1410 (e.g., within the processor's cache memory), or any suitable combination thereof, during execution thereof by the machine 1400. Accordingly, the main memory 1432, static memory 1434, and the processors 1410 may be considered as machine-readable media 1438.

As used herein, the term "memory" refers to a machine-readable medium 1438 able to store data temporarily or permanently and may be taken to include, but not be limited to, random-access memory (RAM), read-only memory (ROM), buffer memory, flash memory, and cache memory. While the machine-readable medium 1438 is shown in an example embodiment to be a single medium, the term "machine-readable medium" should be taken to include a single medium or multiple media (e.g., a centralized or distributed database, or associated caches and servers) able to store instructions 1416. The term "machine-readable medium" shall also be taken to include any medium, or combination of multiple media, that is capable of storing instructions (e.g., instructions 1416) for execution by a machine (e.g., machine 1400), such that the instructions, when executed by one or more processors of the machine 1400 (e.g., processors 1410), cause the machine 1400 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., Erasable Programmable Read-Only Memory (EPROM)), or any suitable combination thereof. The term "machine-readable medium" specifically excludes non-statutory signals per se.

The I/O components 1450 may include a wide variety of components to receive input, provide output, produce output, transmit information, exchange information, capture measurements, and so on. It will be appreciated that the I/O components 1450 may include many other components that are not shown in FIG. 14. The I/O components 1450 are grouped according to functionality merely for simplifying the following discussion and the grouping is in no way limiting. In various example embodiments, the I/O components 1450 may include output components 1452 and input components 1454. The output components 1452 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 1454 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instrument), tactile input components (e.g., a physical button, a touch screen that provides location and force of touches or touch gestures, or other tactile input components), audio input components (e.g., a microphone), and the like.

In further example embodiments, the I/O components 1450 may include biometric components 1456, motion components 1458, environmental components 1460, or position components 1462 among a wide array of other components. For example, the biometric components 1456 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1458 may include acceleration sensor components (e.g., accelerometer), gravitation sensor components, rotation sensor components (e.g., gyroscope), and so forth. The environmental components 1460 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1462 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1450 may include communication components 1464 operable to couple the machine 1400 to a network 1480 or devices 1470 via coupling 1482 and coupling 1472, respectively. For example, the communication components 1464 may include a network interface component or other suitable device to interface with the network 1480. In further examples, communication components 1464 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1470 may be another machine or any of a wide variety of peripheral devices (e.g., a peripheral device coupled via a USB).

Moreover, the communication components 1464 may detect identifiers or include components operable to detect identifiers. For example, the communication components 1464 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, reduced space symbology (RSS)-2D bar code, and other optical codes), or acoustic detection components (e.g., microphones to identify tagged audio signals). In addition, a variety of information may be derived via the communication components 1464, such as location via Internet Protocol (IP) geo-location, location via Wi-Fi® signal triangulation, location via detecting a NFC beacon signal that may indicate a particular location, and so forth.

In various example embodiments, one or more portions of the network 1480 may be an ad hoc network, an intranet, an extranet, a VPN, a LAN, aWLAN, a WAN, a WWAN, a MAN, the Internet, a portion of the Internet, a portion of the PSTN, a POTS network, a cellular telephone network, a wireless network, a Wi-Fi® network, another type of network, or a combination of two or more such networks. For example, the network 1480 or a portion of the network 1480 may include a wireless or cellular network and the coupling 1482 may be a Code Division Multiple Access (CDMA) connection, a Global System for Mobile communications (GSM) connection, or other type of cellular or wireless coupling. In this example, the coupling 1482 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, Third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 1416 may be transmitted or received over the network 1480 using a transmission medium via a network interface device (e.g., a network interface component included in the communication components 1464) and utilizing any one of a number of well-known transfer protocols (e.g., HyperText Transfer Protocol (HTTP)). Similarly, the instructions 1416 may be transmitted or received using a transmission medium via the coupling 1472 (e.g., a peer-to-peer coupling) to devices 1470. The term "transmission medium" shall be taken to include any intangible medium that is capable of storing, encoding, or carrying instructions 1416 for execution by the machine 1400, and includes digital or analog communications signals or other intangible medium to facilitate communication of such software.

Furthermore, the machine-readable medium 1438 is non-transitory (in other words, not having any transitory signals) in that it does not embody a propagating signal. However, labeling the machine-readable medium 1438 as "non-transitory" should not be construed to mean that the medium 1438 is incapable of movement; the medium 1438 should be considered as being transportable from one physical location to another. Additionally, since the machine-readable medium 1438 is tangible, the medium 1438 may be considered to be a machine-readable device.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method, comprising:
   accepting, by a bandwidth (BW) management system on behalf of a receiving host, data packets for a first individual flow at a flow rate sent by a sending host, the bandwidth management system configured to manage bandwidth by traffic classes representing collections of individual flows associated with nodes in a hierarchical bandwidth tree (HBT), the first individual flow is included within the collections of individual flows associated with one or more of the traffic classes;
   controlling, using a processor of a machine, by the BW management system, the rate at which the sending host is transmitting the data packets for the first individual flow using a sliding window protocol by managing the bandwidth utilization of the nodes to conform to bandwidth limits assigned to the nodes, wherein controlling the rate includes computing a window size to be advertised to the sending host, and wherein the window size is based on a bandwidth response to a bandwidth request for the first individual flow; and
   receiving the data packets for the first individual flow at an adjusted flow rate based on the sliding window protocol.

2. The method of claim 1, wherein controlling by the BW management system the rate at which the sending host is transmitting the data packets for the first individual flow using a sliding window protocol further comprises:

managing bandwidth allocation associated with the traffic classes based on application priority classifications assigned to the individual flows in the collection of individual flows associated with the traffic classes.

3. The method of claim 1, wherein the traffic classes include a plurality of traffic classes representing collections of individual flows associated with a plurality of nodes from the nodes in the HBT and a universal traffic class represents a root node from the nodes in the HBT; and wherein the universal traffic class represents the root node having a collection of flows associated with a server machine, the universal traffic class is divided into the plurality of traffic classes represented by the plurality of nodes, the plurality of nodes representing subsets of the collection of individual flows associated with the universal traffic class.

4. The method of claim 1, wherein the receiving host represents a transmission control protocol (TCP) receiver and the sending host represents a TCP sender.

5. The method of claim 1, wherein computing, by the BW management system, the window size to be advertised to the sending host further comprises:

computing the bandwidth request for the first individual flow based on an estimated rate at which the receiving host is receiving the accepted data packets from the BW management system for the first individual flow.

6. The method of claim 5, wherein the estimated rate at which the receiving host is receiving the accepted data packets is based on the minimum of the congestion window which the BW management system is using to send the accepted data packets to the receiving host and the window advertised by the receiving host, and a round trip time between the BW management system and the receiving host for the first individual flow.

7. The method of claim 1, further comprising:

transmitting an acknowledgment data packet to the sending host, the acknowledgement data packet including the window size; and receiving data packets for the first individual flow at an adjusted flow rate based on the window size.

8. The method of claim 1, wherein the BW management system includes a window manager (WM) module, a quality of service (QOS) manager module, and a bandwidth (BW) manager module;

wherein controlling, by the BW management system, the rate at which the sending host is transmitting the data packets for the first individual flow using the sliding window protocol further comprises:

generating, by the WM module, bandwidth requests indicating bandwidth amounts for the individual flows in the collection of individual flows associated with the traffic class, a bandwidth amount is based on an estimated rate at which the receiving host is receiving the accepted data packets from the BW management system for one of the individual flows; and sending, to the QOS manager module, the bandwidth requests indicating the bandwidth amounts.

9. The method of claim 8, further comprising:

receiving, by the QOS manager module, the bandwidth requests indicating the bandwidth amounts;

aggregating the bandwidth amounts for the individual flows in the collection of individual flows associated with the traffic class to create an aggregated bandwidth amount; and sending, to the BW manager module, a bandwidth request indicating the aggregated bandwidth amount.

10. The method of claim 9, further comprising:

receiving, by the BW manager module, the bandwidth request indicating the aggregate bandwidth amount;

determining available bandwidth for the collection of individual flows associated with the traffic class based on the bandwidth utilization of the collection of individual flows associated with the traffic class and the bandwidth limits assigned to the root node and the plurality of nodes in the HBT; and allocating bandwidth to the collection of individual flows associated with the traffic class based on the available bandwidth for the collection of individual flows associated with the traffic class; and sending, to the QOS manager module, a bandwidth response indicating the bandwidth allocated.

11. The method of claim 10, further comprising:

receiving, by the QOS manager module, the bandwidth response indicating the bandwidth allocated;

allocating percentage shares of the bandwidth allocated to the collection of the individual flows associated with the traffic class based on application priority classifications associated with the individual flows from the collection of individual flows associated with the traffic class;

allocating flow shares from the allocated percentage shares to the individual flows from the collection of individual flows associated with the traffic class; and sending, to the WM module, bandwidth responses indicating the allocated flow shares.

12. The method of claim 11, wherein allocating the flow shares from the allocated percentage shares to the individual flows from the collection of individual flows associated with the traffic class further comprises:

determining a mode of operation of the individual flows in the collection of individual flows associated with the traffic class; and allocating the flow shares based on the mode of operation.

13. The method of claim 12, further comprising:

receiving, by the WM module, the bandwidth responses indicating the allocated flow shares; and generating, for the first individual flow, the window size to be advertised to the sending host based on the allocated flow share of the first individual flow.

14. The method of claim 13, wherein generating, for the first individual flow, the window size to be advertised to the sending host based on the allocated flow share of the first individual flow comprises:

generating, for the first individual flow, the window size based on the bandwidth response indicating the allocated flow share for the first individual flow and a round trip time between the sending host and the BW management system for the first individual flow.

15. The method of claim 1, wherein at least one of the sending host and the receiving host represents a virtualized resource associated with a server machine.

16. The method of claim 1, wherein at least one of the sending host and the receiving host represents a software container.

17. A method, comprising:

accepting, by a bandwidth (BW) management system on behalf of a receiving host, data packets for a first individual flow at a flow rate sent by a sending host, the bandwidth management system configured to manage bandwidth by traffic classes representing collections of individual flows associated with nodes in a hierarchical bandwidth tree (HBT), the first individual flow is included within the collections of individual flows associated with one or more of the traffic classes;

controlling, using a processor of a machine, by the BW management system, the rate at which the sending host is transmitting the data packets for the first individual flow using a sliding window protocol by managing bandwidth allocation of the individual flows associated with traffic classes based on application priority classifications assigned to the individual flows in the collection of individual flows associated with the traffic classes, wherein controlling the rate includes computing a window size to be advertised to the sending host, and wherein the window size is based on a bandwidth response to a bandwidth request for the first individual flow; and receiving the data packets for the first individual flow at an adjusted flow rate based on the sliding window protocol.

18. The method of claim 17, wherein controlling, by the BW management system the rate at which the sending host is transmitting the data packets for the first individual flow using the sliding window protocol further comprises:

controlling the rate at which the sending host is transmitting the data packets for the first individual flow using the sliding window protocol by managing the bandwidth utilization of the nodes to conform to bandwidth limits assigned to the nodes.

19. The method of claim 17, wherein the traffic classes include a plurality of traffic classes representing collections of individual flows associated with a plurality of nodes from the nodes in the HBT and a universal traffic class represents a root node from the nodes in the HBT; and wherein the universal traffic class represents the root node having a collection of flows associated with a server machine, the universal traffic class is divided into the plurality of traffic classes represented by the plurality of nodes, the plurality of nodes representing subsets of the collection of individual flows associated with the universal traffic class.

\* \* \* \* \*